US012712256B2

(12) United States Patent
Hu et al.

(10) Patent No.: US 12,712,256 B2
(45) Date of Patent: Aug. 18, 2026

(54) COMPACT AND WIDEBAND BEAM-SWITCHING ANTENNA ARRAY ARCHITECTURE

(71) Applicant: Intel Corporation, Santa Clara, CA (US)

(72) Inventors: Kexin Hu, Atlanta, GA (US); Tae Young Yang, Portland, OR (US); Seong-Youp John Suh, Portland, OR (US); Harry Skinner, Beaverton, OR (US); Ashoke Ravi, Portland, OR (US); Ofir Degani, Nes-Ammin (IL); Ronen Kronfeld, Shoham (IL)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 17/933,331

(22) Filed: Sep. 19, 2022

(65) Prior Publication Data

US 2024/0097325 A1 Mar. 21, 2024

(51) Int. Cl.

| | |
|---|---|
| ***H01Q 1/22*** | (2006.01) |
| ***H01Q 1/52*** | (2006.01) |
| ***H01Q 3/40*** | (2006.01) |
| ***H01Q 9/04*** | (2006.01) |
| ***H01Q 15/00*** | (2006.01) |

(Continued)

(52) U.S. Cl.

CPC ........... *H01Q 1/2283* (2013.01); *H01Q 1/523* (2013.01); *H01Q 3/40* (2013.01); *H01Q 9/0414* (2013.01); *H01Q 9/0457* (2013.01); *H01Q 15/006* (2013.01); *H01Q 19/005* (2013.01);

(Continued)

(58) Field of Classification Search

CPC ........ H01Q 1/2283; H01Q 1/52; H01Q 1/521; H01Q 1/523; H01Q 3/40; H01Q 5/378; H01Q 5/385; H01Q 5/392; H01Q 9/0407; H01Q 9/0414; H01Q 9/0435; H01Q 9/045; H01Q 9/0457; H01Q 15/0006; H01Q 15/006; H01Q 19/005; H01Q 21/0075; H01Q 21/06; H01Q 21/061; H01Q 21/065; H01Q 21/08; H01Q 21/24

See application file for complete search history.

(56) References Cited

U.S. PATENT DOCUMENTS

| | | | | |
|---|---|---|---|---|
| 2020/0358173 | A1* | 11/2020 | Jong ...................... | H01Q 1/243 |
| 2021/0168932 | A1* | 6/2021 | Woo .................... | H01Q 9/0457 |

OTHER PUBLICATIONS

Park, Yuntae, Jihoon Bang, and Jaehoon Choi. 2020. "Dual-Circularly Polarized 60 GHz Beam-Steerable Antenna Array with 8 x 8 Butler Matrix," Applied Sciences 10, No. 7: 2413, doi: https://doi.org/10.3390/app10072413 <https://protect-us.mimecast.com/s/FDuYCzpqmAU8Mo13i4DpVd>.

(Continued)

*Primary Examiner* — Robert Karacsony

(74) *Attorney, Agent, or Firm* — Banner & Witcoff, Ltd.

(57) ABSTRACT

An antenna array architecture is provided for beamforming applications. The antenna array architecture facilitates a compact and wideband dual-polarized beam-switching antenna array architecture, which may be implemented in a cost-effective multi-layer PCB or package. The antenna array architecture is implemented as part of a package substrate having a number of layers. Each of the layers comprises various conductive elements such as conductive segments and/or traces that are disposed thereon in accordance with the respective antenna components.

24 Claims, 37 Drawing Sheets

1500

(51) Int. Cl.
*H01Q 19/00* (2006.01)
*H01Q 21/00* (2006.01)
*H01Q 21/06* (2006.01)
*H01Q 21/08* (2006.01)
*H01Q 21/24* (2006.01)

(52) U.S. Cl.
CPC ....... *H01Q 21/0075* (2013.01); *H01Q 21/065* (2013.01); *H01Q 21/08* (2013.01); *H01Q 21/24* (2013.01)

(56) References Cited

OTHER PUBLICATIONS

K. Klionovski, M. S. Sharawi and A. Shamim, "A Dual-Polarization-Switched Beam Patch Antenna Array for Millimeter-Wave Applications," IEEE Transactions on Antennas and Propagation, vol. 67, No. 5, pp. 3510-3515, May 2019, doi: 10.1109/TAP.2019.2900438.

Zahra Mousavirazi, Vahid Rafiei, and Tayeb A. Denidni, "Beam-Switching antenna array with dual-circular-polarized operation for WiMAX applications," AEU—International Journal of Electronics and Communications, vol. 137, 2021, 153796, ISSN 1434-8411, doi: https://doi.org/10.1016/j.aeue.2021.153796 <https://protect-us.mimecast.com/s/NxNPCzpqmAU8Mo1qcXcqae>.

N. Ashraf, A. A. Kishk and A.-R. Sebak, "28-32 GHZ Dual-Polarized Single-Layer Microstrip Line Beamforming Network for 2×2 Beam Switching," 2019 IEEE MTT-S International Microwave Conference on Hardware and Systems for 5G and Beyond (IMC-5G), 2019, pp. 1-3, doi: 10.1109/IMC-5G47857.2019.9160357.

L. H. He, Y. L. Ban, F. Q. Yan and G. Wu, "Dual-Polarized Two-Dimensional Multibeam Antenna Array With Hybrid Beamforming and its Planarization," IEEE Access, vol. 9, pp. 54951-54961, 2021, doi: 10.1109/Access.2021.3071645.

S. A. Babale, S. K. Abdul Rahim, O. A. Barro, M. Himdi and M. Khalily, "Single Layered $4\times4$ Butler Matrix Without Phase-Shifters and Crossovers," IEEE Access, vol. 6, pp. 77289-77298, 2018, doi: 10.1109/Access.2018.2881605.

J. M. Wen, C. K. Wang, W. Hong, Y. M. Pan and S. Y. Zheng, "A Wideband Switched-Beam Antenna Array Fed by Compact Single-Layer Butler Matrix," IEEE Transactions on Antennas and Propagation, vol. 69, No. 8, pp. 5130-5135, Aug. 2021, doi: 10.1109/TAP.2021.3060040.

G. Tian, J. Yang and W. Wu, "A Novel Compact Butler Matrix Without Phase Shifter," IEEE Microwave and Wireless Components Letters, vol. 24, No. 5, pp. 306-308, May 2014, doi: 10.1109/LMWC.2014.2306898.

P. Bhowmik and T. Moyra, "Modelling and Validation of a Compact Planar Butler Matrix by Removing Crossover," Wireless Personal Communications 95, 5121-5132 (2017), doi: https://doi.org/10.1007/s11277-017-4158-7 <https://protect-us.mimecast.com/s/BcJDCZ6Z4gHP59vQtKe29z>.

I. M. Mohamed and A. Sebak, "60 GHz 2-D Scanning Multibeam Cavity-Backed Patch Array Fed by Compact SIW Beamforming Network for 5G Applications," IEEE Transactions on Antennas and Propagation, vol. 67, No. 4, pp. 2320-2331, Apr. 2019, doi: 10.1109/TAP.2019.2891450.

D. Singh, M. G. Madhan, A. Kamalaveni and S. Kotapti, "A compact passive beam forming network for base station antenna," 2017 International conference on Microelectronic Devices, Circuits and Systems (ICMDCS), 2017, pp. 1-6, doi: 10.1109/ICMDCS.2017.8211574.

Expósito-Dominguez, G. et al.: "Mutual Coupling Reduction Using EBG in Steering Antennas", IEEE Antennas and Wireless Propagation Letters, vol. 11, Jan. 1, 2012, pp. 1265-1268, ISSN: 1536-1225, DOI: 10.1109/LAWP.2012.2226013.

Jan. 25, 2024 (EPO) Search Report—App. 23190051.5.

* cited by examiner

100

| Material | Thickness (um) | |
|---|---|---|
| L1 | 15.00 | Secondary conductive sheet 108 and parasitic elements 110 |
| Prepreg | 60.00 | |
| L2 | 15.00 | EBG conductive segments 112A |
| Prepreg | 60.00 | |
| L3 | 15.00 | Primary conductive sheet 104 and EBG conductive segments 112B |
| Core | 60.00 | |
| L4 | 15.00 | Signal routing network |
| Prepreg | 60.00 | |
| L5 | 15.00 | Ground plane |
| Prepreg | 60.00 | |
| L6 | 15.00 | Butler matrix blocks 114A/114B |

200

200

300

400

Theta / Degree vs. dBi

400

500

600

850

900

1000

1100

1100

1100

1100

1200

1200

1200

1200

1200

1200

1300

1400

1400

1500

1500

COMPACT AND WIDEBAND BEAM-SWITCHING ANTENNA ARRAY ARCHITECTURE

TECHNICAL FIELD

The disclosure described herein generally relates to antennas and, more particularly, to a compact and wideband beam-switching antenna that utilizes one or more modified Butler matrix blocks.

BACKGROUND

Conventional beamforming operations are achieved by a phased antenna array architecture, which offers the most flexible beam control, but with an extremely high cost and power consumption due to the demanding multiple RF chains. This has resulted in low adoption rates in consumer products. Full passive, switched-beam designs can address this challenge by implementing cost-effective lens or beamformer circuits. However, lens designs often have a narrow field-of-view and bandwidth, and are limited when focal distance is reduced (<1 mm).

On the other hand, a traditional Butler matrix (a type of passive beamforming network) has lower insertion loss, good angular coverage, and adequate bandwidth compared to other types of beamforming networks, such as the Blass matrix and the Rotman lens (a beamforming transmission-line network based on optical lens principles). However, the traditional Butler matrix demands a very large electrical size that requires more area and/or a larger number of layers in a package substrate. Further complicating this issue, when dual-polarization support is considered, the size and/or number of substrate layers of the traditional Butler matrix further increase, and such designs become impractical for most portable client platforms such as laptops.

The generation of surface-waves is another challenge in antenna array design, which becomes an issue when supporting a wide scan-angle range. That is, when a focused beam is tilted at large angle, surface waves are generated on the surface of the PCB or package top layer. Such surface waves interact with the antenna elements, distort beam patterns, generate unwanted high-grating lobes, and reduce the gain in the main beam.

As a result, current antenna array designs are inadequate to meet industry and consumer demands.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

The present disclosure will be described with reference to the accompanying drawings. The drawing in which an element first appears is typically indicated by the leftmost digit(s) in the corresponding reference number.

DETAILED DESCRIPTION

Figure 1:
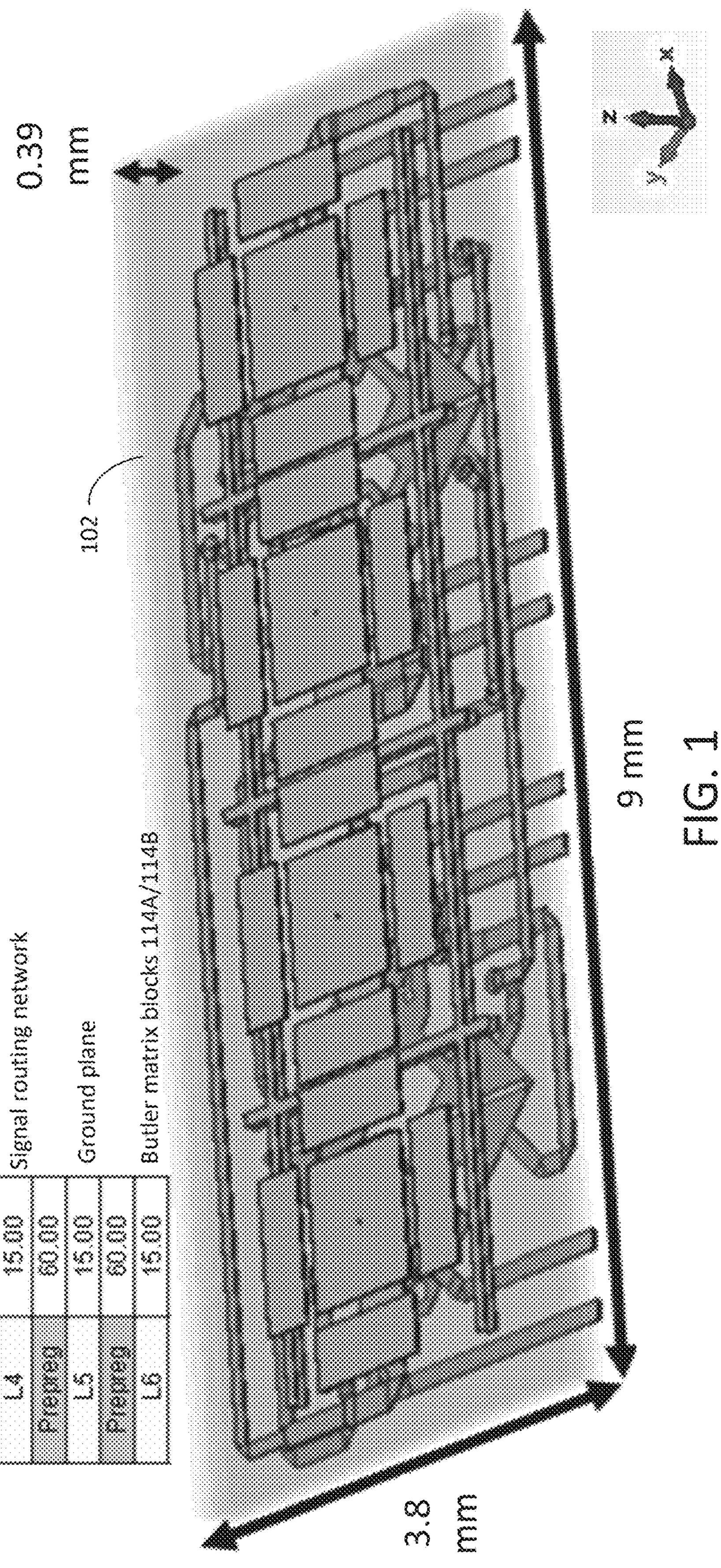
FIG. 1 illustrates an antenna array architecture, in accordance with the disclosure.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

I. Conventional Solutions

Again, a conventional approach to realize beam steering is via a phased array in a package with a beamforming IC. The amplitude and phase of each antenna element can be configured separately through multiple RF chains in the beamforming IC, which provides very flexible beam control. However, such phased array approaches are expensive, and have a high power consumption due to the multiple RF chains, particularly when implemented to support a dual polarized array. It is also difficult to implement digital pre-distortion (DPD) in such implementations due to the variance over the RF chains.

An alternative approach comprises using a lens above antenna array, as noted above. By selecting each antenna element in the array, a beam can be tilted through the lens. But such lenses are generally bulky because these need to be located at the far-field distance of the antennas, i.e. at a large focal distance (>wavelength and >2*D^2/wavelength, where D is the maximum dimension of antenna). The size of such structures makes them very challenging to be integrated with mm-wave antenna array designs, and the bandwidth and field-of-view become narrow when the focal distance is reduced (<1 mm).

Antenna arrays used for beam steering applications may also implement a conventional Butler matrix, also referred to herein as a Butler matrix block. A Butler matrix is a type of passive beamforming network, which uses 4 quadrature hybrid branch line couplers and 2 crossovers. A dual Butler matrix uses many crossovers and/or substrate layers to support a dual-polarized array. A summary of the use of some conventional dual Butler matrix designs, which are implemented to support dual circular polarization (DCP) or dual linear polarization (DLP) antenna arrays, and their corresponding performance metrics, are provided below in Error! Reference source not found. It is noted that the first column denotes the reference number in which each corresponding design is described, with each reference being listed by number at the end of this disclosure.

Thus, and as illustrated in Table 1, Butler matrix designs have a large electrical size and limited bandwidth. The signal routing from a dual Butler matrix to a dual-polarized array is also complex, and requires a significant number of crossover structures that further increase the total size and number of layers, and also contribute to additional insertion loss. Thus, conventional Butler matrix designs are not a practical solution for many client platforms, such as laptop computers.

Furthermore, and as noted above, surface waves may introduce interference during operation of antenna arrays to distort beam patterns, generate unwanted high-grating lobes, and reduce the gain in the main beam. Thus, EBG structures may be used to mitigate the propagation of surface waves. However, conventional EBG structures typically have a number of unit cells, with each unit cell having a dimension of ~1/10 wavelength or smaller, which is significantly smaller than the dimensions of the antenna elements. This is due to the EBG concept being originally modeled from homogeneous material property. As a result, the small EBG unit-cell structures are padded between antenna elements and work like a 2-D spatial filter, suppressing surface waves. However, the small size of conventional EBG results in a relatively narrow operational bandwidth (e.g. 1%). And because such conventional EBG structures are located close to the antenna elements, the EBG structures may also interfere with the feed structures and/or any bandwidth-enhancing parasitic elements that may be implemented as part of antenna array designs.

II. General Antenna Array Architecture and Advantages

The antenna array architecture as discussed herein is directed to overcoming the above-mentioned challenges with respect to the use of antenna arrays for beamforming applications. FIG. 1 illustrates an antenna array architecture, in accordance with the disclosure. The antenna array architecture 100 as shown in FIG. 1 facilitates a compact and wideband dual-polarized beam-switching antenna array architecture, which may be implemented in a cost-effective multi-layer PCB or other suitable package substrate. In the illustrative and non-limiting scenario as shown in FIG. 1, the antenna array architecture 100 is implemented as part of a package substrate 102 having 6 layers. Each of the 6 layers comprises various conductive elements (which may be comprised of copper or other suitable conductor), such as conductive segments and/or traces that are disposed thereon in accordance with their respective components, with each

TABLE 1

| Ref | Center Freq. | Polarization | Technology | BW | Insertion loss/phase error | Electrical Size | Layers | Array Config. |
|---|---|---|---|---|---|---|---|---|
| [1] | 60 GHz | DCP | Crossovers | 16% | 10.5 dB/29° | 5.1λ × 6.5 λ | 3 | 1 × 4 patch |
| [2] | 28.7 GHz | DLP | Separate feeding networks | 19% | 7.6 dB/5° | 12 λ × 7λ | 2 | 4 × 4 wideband patch |
| [3] | 3.75 GHz | DCP | Separate feeding networks | 16% | 6.8 dB/— | 2.6λ × 2.6 λ | 3 | 1 × 4 patch |
| [4] | 30 GHz | DLP | Rearranged crossovers | 13% | 6.5 dB/5° | >2.75λ × 2.75 λ | 4 | 2 × 2 |
| [5] | 3.45 GHz | DCP | 3D integrated | 10% | — | 3.73λ × 3.73λ | 3 | 4 × 4 coupled patch |

of the 6 layers being "sandwiched" between a dielectric material such as a PCB pre-preg or PCB core, as shown by the inset in FIG. 1.

Moreover, the antenna array architecture 100 as shown in FIG. 1 comprises four individual antenna elements, which together form a 1×4 dual-polarized array. Each antenna element comprises a primary conductive sheet (i.e. "primary patch" or "primary patch antenna") disposed on one of the layers of the package substrate, which is coupled to a dual-polarization antenna feed, thus enabling the antenna array architecture 100 to operate in accordance with a dual-polarization configuration. Each antenna element also comprises a secondary conductive sheet (i.e. "secondary" or "coupled" patch or patch antenna) disposed on another layer of the package substrate 102 together with any suitable number of parasitic elements.

The antenna array architecture 100 also comprises a high-order (HO) EBG structure disposed on two layers of the package substrate 102, which may alternatively be referred to herein as simply an EBG structure, which comprises any suitable number of unit cells. For the antenna array architecture 100 as shown in FIG. 1, there are a total of 4 EBG unit cells, one for each antenna element. In contrast with conventional usage of EBG structures, however, each EBG unit cell surrounds each corresponding antenna element, and thus has overall dimensions that are larger than the dimensions of the correspondingly surrounded primary and secondary conductive sheets (and parasitic elements).

Furthermore, the antenna array architecture 100 comprises two Butler matrix blocks, one dedicated to each of the two polarizations of the antenna feeds. The two Butler matrix blocks implement slotted patch couplers, and are disposed on one of the layers of the package substrate 102 to realize beam steering for the 1×4 dual-polarized array, with the antenna feeds and signal routing network being disposed on another layer of the package substrate 102. Each Butler matrix block is coupled to a respective set of input ports. Each Butler matrix block also includes a respective set of output ports, which are coupled to the antenna feed of each one of the antenna elements for that particular polarization. Thus, providing transmit signals to one or more of the input ports affects the beam angle and shape identified with the antenna array architecture 100. In contrast with the conventional Butler matrix block configurations, the Butler matrix blocks as discussed herein eliminate the need for a crossover section and thus are more compact. Additional details regarding the components disposed on each of the layers of the package substrate 102 and their respective operations are further discussed below.

It is noted that the antenna array architecture 100 as shown in FIG. 1 and further discussed herein provides, via the Butler matrix blocks, a passive switched-beam network. This configuration yields a wideband, dual-polarized, 1×4 beam-switching antenna array architecture that drastically reduces cost, complexity, and loss compared to conventional solutions. As one illustrative and non-limiting scenario, the antenna array architecture 100 may achieve 57-71 GHz wideband operation with more than 20 dB surface-wave suppression via the use of a HO EBG structure. Moreover, the total size of the antenna array architecture 100 as part of an antenna-in-package, which includes the dual Butler matrix blocks, is 3.8 mm×9 mm×0.39 mm for a 6-layer package stack-up as shown in FIG. 1, which is significantly compact. In particular, for a 57-71 GHz wideband operation as discussed herein, the 0.39 mm package substrate 102 represents approximately 0.012λ at the lowest operating frequency. Such a compact, low-profile, and low-cost architecture is well-suited to facilitate a distributed radio system (DRS) solution, and may be particularly advantageous for emerging 60-GHz Wi-Fi solutions and other applications supporting lower latency and larger capacity. Such architectures are also more attractive to customers, and may be implemented in a variety of different client platforms.

The antenna array architecture 100 as shown in FIG. 1 is provided and described herein in a non-limiting and illustrative manner. The antenna array architecture 100 may have any suitable number of design parameters that may be modified to adjust the operation and/or configuration of the antenna array for different applications and/or implementations. Such design parameters may include the number, type, size, and/or thickness of the layers of the package substrate 102, as well as the number, size, shape, and/or layout of the conductive segments and/or traces disposed on each of the layers. The design parameters may additionally or alternatively include the number and/or spacing of antenna elements, as well as the configuration, layout, and/or number of antenna feeds and conductive segments comprising the signal routing network, the arrangement of components on specific layers of the package substrate, the number and/or type of polarizations (i.e. linear, elliptical, circular, etc.), the operating frequency and/or bandwidth of the antenna array, the number of Butler matrix blocks, the structure, shape, and/or size of the Butler matrix blocks, the type of layers and/or dielectric constants of the layers of the package substrate 102, etc. Additional implementations of some of these alternative design parameters are discussed in further detail below, although the disclosure is not limited to these specific alternatives.

Furthermore, although described herein primarily in the context of operation within the 57-71 GHz band, the antenna array architecture 100 may transmit and receive signals in accordance with any suitable number of frequency bands, each having any suitable bandwidth. In various illustrative and non-limiting scenarios, the antenna array architecture 100 may be configured to transmit and receive wireless signals in accordance with the requirements of the 3GPP new radio (NR) and new radio unlicensed (NR-U) communication standards, the most recent at the time of this writing being Release 17, approved in December 2019. It is noted however that the techniques disclosed herein are not limited to a specific communication standard, and the antenna array architecture 100 instead may operate in accordance with any suitable communication standard, specification, and/or protocol. Such protocols may include cellular communications in accordance with the 3GPP standard, which may include both new radio (NR) and LTE communications, and may encompass mm-wave frequency bands in the range of 30-300 GHz. The techniques as discussed herein may be particularly useful for operation over the 57 to 71 GHz band, as well as the use of such bands to support any suitable type of application such as fixed wireless access (FWA) applications. Such protocols may additionally or alternatively utilize 60 GHz bands or other suitable frequency bands associated with any of the 802.xx Wi-Fi communication protocols, Wi-Gig, Global Navigation Satellite Systems (GNSS), etc.

III. The Structure and Operation of the Primary and Secondary Conductive Sheets

Figure 2A:
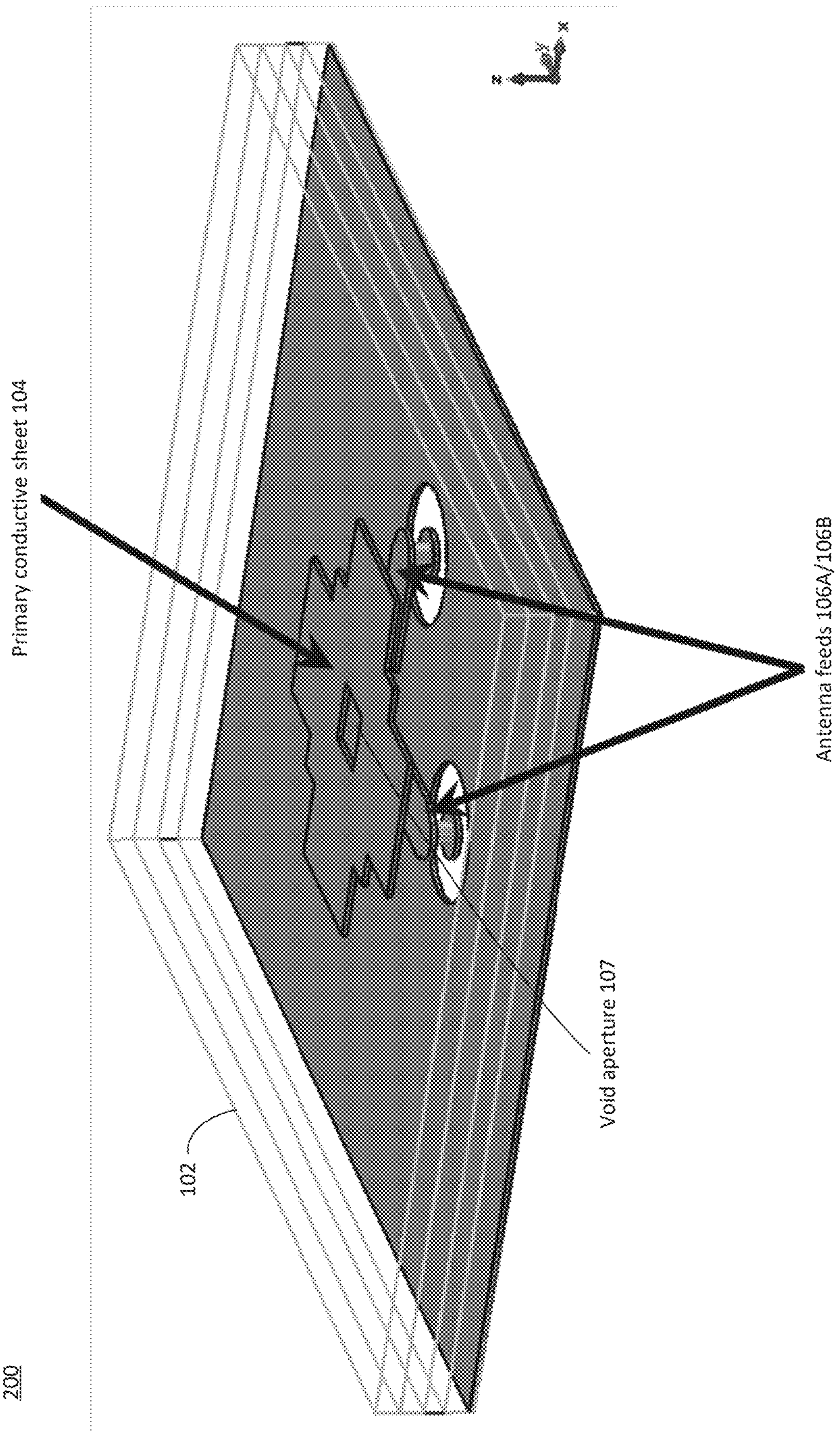
FIG. 2A illustrates an antenna element primary conductive sheet, in accordance with the disclosure.
Figure 2B:
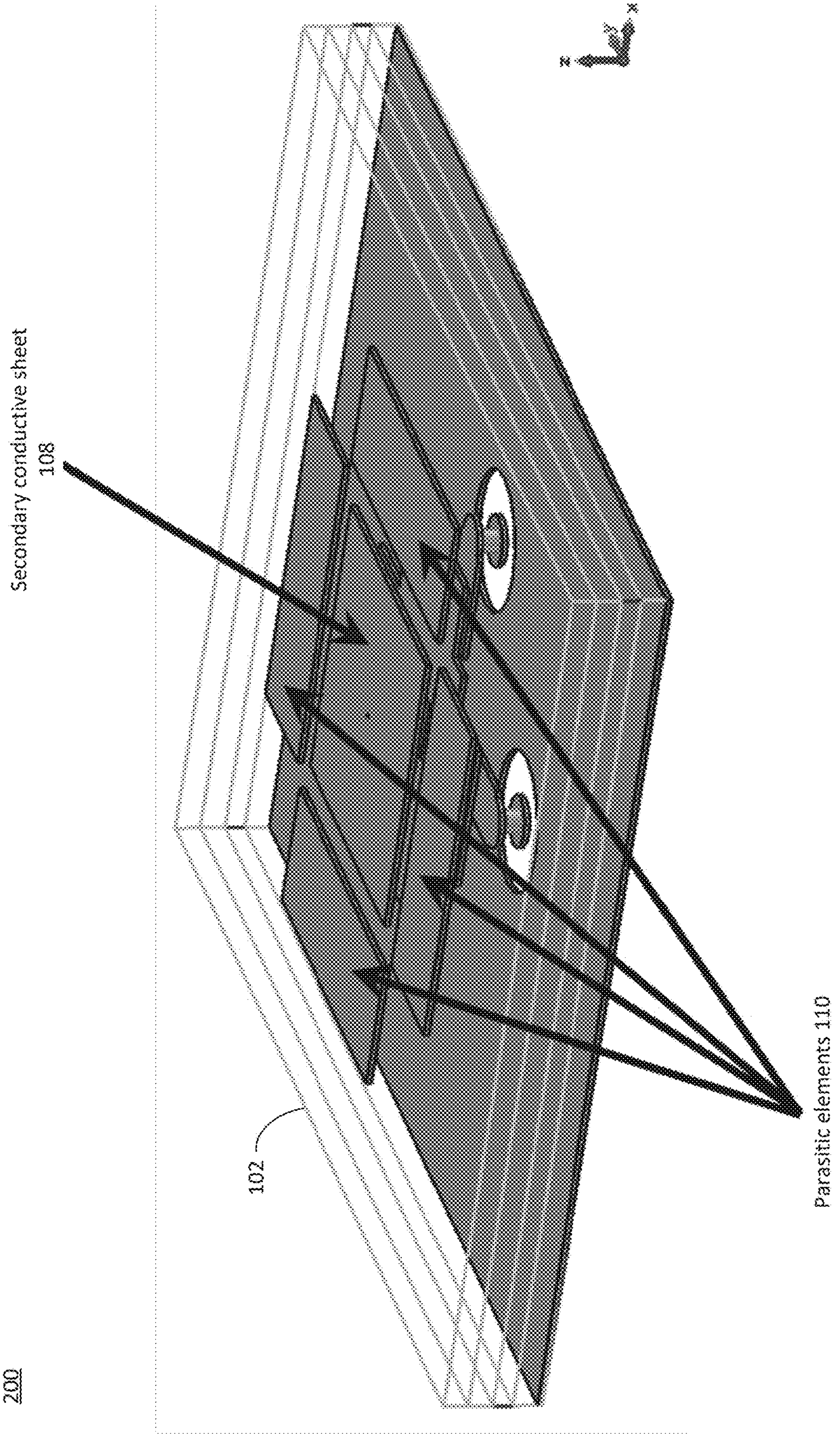
FIG. 2B illustrates an antenna element secondary conductive sheet and parasitic elements, in accordance with the disclosure.
Figure 2C:
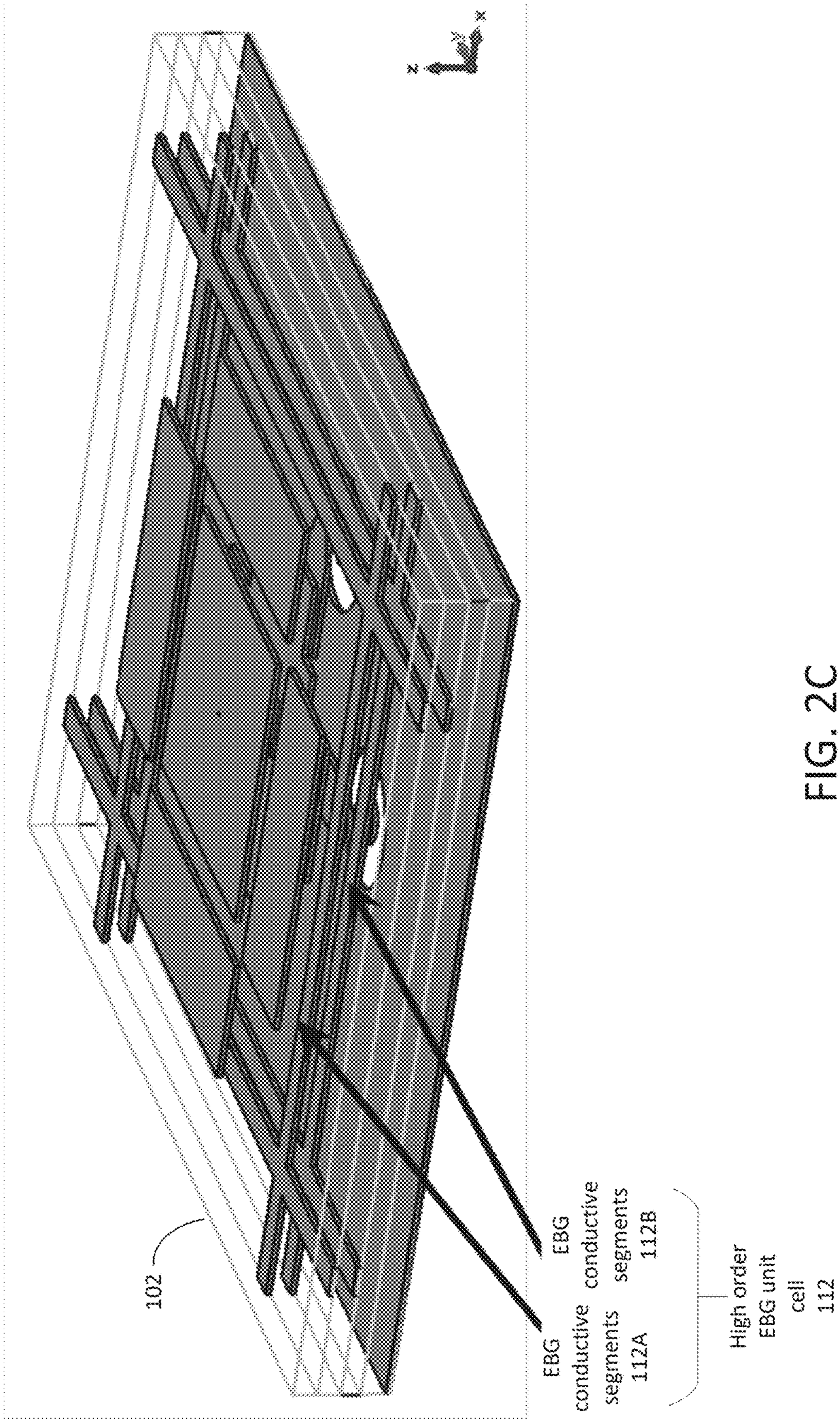
FIG. 2C illustrates a high-order electromagnetic band gap (EBG) unit cell structure, in accordance with the disclosure.

FIG. 2A illustrates an antenna element primary conductive sheet, in accordance with the disclosure In each of FIGS. 2A-2C, it is noted that a single antenna element 200 is illustrated, which is identified with one of the antenna elements 200 of the antenna array architecture 100 as shown in FIG. 1. Again, the antenna array architecture 100 as shown in FIG. 1 may comprise any suitable number N of such antenna elements 200, with each being referred to herein as an antenna element 200, or alternatively referred to as antenna elements 200.1-200.N (e.g. 200.1-200.4 when N=4). As shown in FIG. 2A, the antenna element 200 comprises a primary conductive sheet 104, which is disposed on one of the layers of the package substrate 102. Using the illustrative and non-limiting scenario as shown in FIG. 1, the primary conductive sheet 104 is disposed on one of the layers of the package substrate 102 beneath the top layer (L1), such as on layer 3 (L3) of the package substrate 102. The primary conductive sheet 104 may alternatively be referred to herein as a primary or main patch, or patch antenna.

The primary conductive sheet 104 may have any suitable size and/or shape, which may be a function of the operating frequency of the antenna array of which the antenna element 200 forms a part. The primary conductive sheet 104 may be symmetric about two bisecting and orthogonal axes, which may be particularly useful when a dual polarization configuration is implemented, as discussed above with reference to the antenna array architecture 100. Additional details of the layout of the primary conductive sheet for each one of the antenna elements 200 is further shown and discussed herein with reference to FIG. 7C.

The antenna element 200 further comprises any suitable number of antenna feeds 106, each having any suitable size and/or shape, and being configured to couple the primary conductive sheet 104 to a separate conductive trace that is part of the signal routing network, which in turn couples that respective antenna feed to a respective output port of a Butler matrix block. In other words, and as will be further discussed below, each conductive trace of the signal routing network is coupled to a respective output port of one of the Butler matrix blocks and to a respective antenna feed 106. The primary conductive sheet 104 may be coupled to each of the antenna feeds 106A, 106B, as well as to the conductive trace identified with each respective antenna feed 106A, 106B, in any suitable manner, which may include capacitive coupling, galvanic coupling, and combinations of these. This may include a direct (i.e. galvanic) coupling between each antenna feed 106A, 106B and the primary conductive sheet 104 (not shown), as well as a layer-to-layer interconnection galvanically coupling each antenna feed 106A, 106B to its respective conductive trace using any suitable techniques, including known techniques. Alternatively, the antenna feeds 106A, 106B may be capacitively coupled with the primary conductive sheet 104, with the direction of coupling being in-plane with the primary conductive patch 104 or, alternatively, through the layers of the package substrate 102 (i.e. vertically or out-of-plane, in the z-direction as shown in FIG. 2A). A galvanic layer-to-layer interconnection coupling each antenna feed 106A, 106B to its respective conductive trace may be implemented in accordance with such scenarios.

Figure 7A:
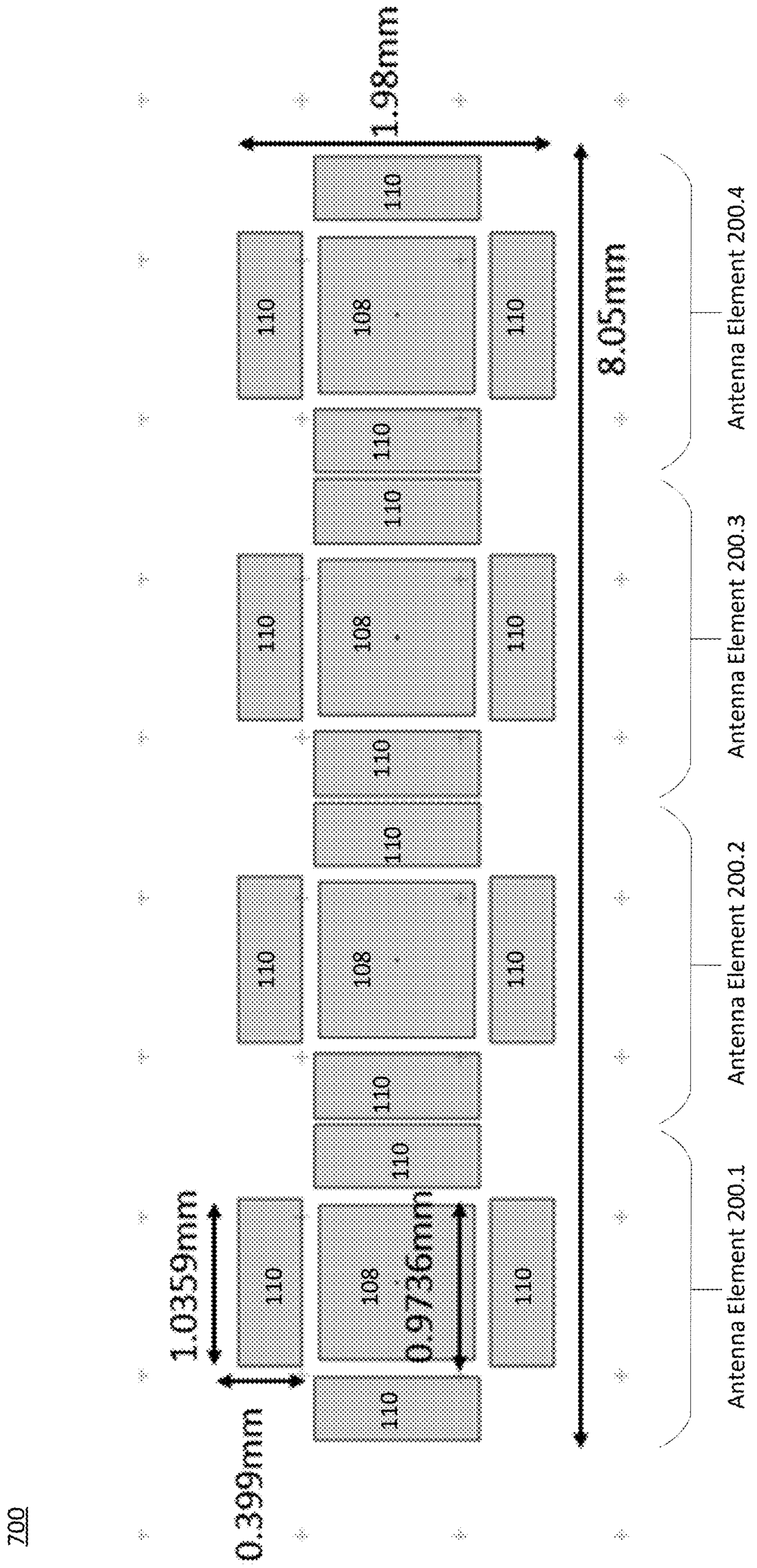
FIG. 7A illustrates a first layer of a substrate layer stack-up including the secondary conductive sheets and parasitic elements, in accordance with the disclosure.

It is noted that each of FIGS. 2A-2C illustrates an antenna feed structure for ease of explanation with respect to the antenna element 200, which provides the overall antenna structure and independent operation of the antenna element 200 in a clear manner. However, when implemented as part of an array, such as the 1×4 array as discussed herein, and the Butler matrix blocks 114A, 114B are implemented, the antenna feeds as shown in FIGS. 2A-2C are replaced with (i.e. integrated as part of) the signal routing network as shown in FIG. 7D, which includes the antenna feeds. Of course, alternative antenna feeds may also be implemented that are not shown in the Figures.

The number of the antenna feeds per antenna element 200 is a function of the number of polarizations that are implemented. That is, if two polarizations are used as shown in FIG. 2A, then the antenna array architecture 100 may comprise a total of 8 separate antenna feeds 106, i.e. two for each antenna element 200.1-200.4. As shown in FIG. 2A, each antenna feed 106 may be coupled to the primary conductive sheet 104 at any suitable number of different respective locations. In the illustrative and non-limiting scenario as shown in FIG. 2A, the primary conductive sheet 104 is coupled to two antenna feeds 106A and 106B, respectively, at locations that are orthogonal to one another, thereby enabling the excitation of the primary conductive sheet 104 in accordance with each respective polarization. In this way, the primary conductive sheet 104 may operate in accordance with a dual-polarized configuration.

The aggregation of all conductive traces for each of the antenna feeds 106 may be referred to herein as a signal routing network, which may be disposed on one of the layers of the package substrate 102. Thus, the conductive traces for each of the antenna feeds 106 may be disposed on the same layer of the package substrate 102 or on different layers, although it is particularly advantageous for all conductive traces (i.e. the signal routing network in its entirety) to be disposed on the same layer to provide a compact and low-profile package design. Using the illustrative and non-limiting scenario as shown in FIG. 1, the signal routing network is disposed on layer 4 (L4) of the package substrate 102 beneath the layer on which the primary conductive sheet 104 is disposed (L3), although other layers of the package substrate 102 may alternatively be used for this purpose. Additional details of the layout of the signal routing network is further shown and discussed herein with reference to FIG. 7D.

Turning now to FIG. 2B, the antenna element 200 further comprises a secondary conductive sheet 108 and any suitable number of parasitic elements 110, each of which is disposed on one of the layers of the package substrate 102. Moreover, the secondary conductive sheet 108 is surrounded by any suitable number of parasitic elements 110, which are likewise conductive sheets and function to effectively increase the bandwidth of the antenna element 200. Thus, the secondary conductive sheet 108 and the parasitic elements 110 are "floating" and not galvanically coupled to one another or to the primary conductive sheet 104, as shown in the Figures, although this is a non-limiting and illustrative scenario and other configurations are possible.

Similar to the primary conductive sheet 104, the secondary conductive sheet 108 and parasitic elements 110 may also be symmetric about two bisecting and orthogonal axes. Using the illustrative and non-limiting scenario as shown in FIG. 1, the secondary conductive sheet 108 and parasitic elements 110 are disposed on a top layer (L1) of the package substrate 102, above the primary conductive sheet 104. The secondary conductive sheet 108 may alternatively be referred to herein as a secondary or coupled patch or patch antenna. Thus, the secondary conductive sheet 108 is capacitively coupled to the primary conductive sheet 104, and together form a "stacked patch" architecture for each one of the antenna elements 200 of the antenna array architecture 100.

Referring back to FIG. 2A, the primary conductive sheet 104 may comprise a void aperture 107 at the center. The void aperture 107 may have any suitable shape (such as a slot) and is a design parameter having dimensions that further control the coupling between the primary and secondary conductive sheets 104, 108. This decreased coupling may, in turn, increase the operating bandwidth, particularly when the separation between the primary and secondary conductive sheets 104, 108 is relatively small. That is, in accordance with a non-limiting and illustrative scenario, the distance between the primary and secondary conductive sheets 104, 108 typically needs to be greater than 150 um to support operation in the 57-71 GHz frequency range, and the reduced coupling provided by the void aperture 107 enables such operational bandwidth to be achieved when this separating distance is less than 150 um.

The secondary conductive sheet 108, the parasitic elements 110, and the void aperture 107 in the primary conductive sheet 104 may have any suitable size and/or shape, which may be a function of the operating frequency of the antenna array of which the antenna element 200 forms a part. Furthermore, in the non-limiting and illustrative scenario as shown in the Figures and discussed herein, the primary and secondary conductive sheets 104, 108 are centered and aligned with one another, i.e. each share a common center about the z-axis. Thus, the dimensions of the secondary conductive sheet 108, the parasitic elements 110, the void aperture 107, the offset in the x-y plane between one another (i.e. when not centered with one another about the z-axis), as well as the distance between the primary and secondary conductive sheets 104, 108 in the z-direction, constitute design parameters of the antenna element 200. Thus, one or more of these design parameters may be modified based upon desired specifications such as operating frequency, bandwidth, etc. Additional details of the layout of the secondary conductive sheet 108 and parasitic elements 110 for each one of the antenna elements 200 is further shown and discussed herein with reference to FIG. 7A.

IV. The Structure and Operation of the High Order (HO) electromagnetic band gap (EBG) Structure FIG. 2C illustrates a high-order (HO) EBG unit cell, in accordance with the disclosure. High-order electromagnetic band gap structures are used to suppress surface waves. It is noted that a conventional EBG structure is one that creates a stopband to block the propagation of such waves in certain frequency bands by forming a set of units cells that together form a fine, periodic pattern of small metal patches on dielectric substrates. The term "EBG" thus refers to such a stopband as well as to substances (medium to transmit electromagnetic waves) that have such a structure. Conventional EBG structures are used to prevent the propagation of electromagnetic surface waves that may be induced in a package substrate due to a nearby source, which may be the case when a transmitted beam is steered at an angle close to parallel with the x-y plane of the antenna element 200.

The term "high" or "higher" order EBG structures refers to the blockage of the propagating surface waves in higher-order modes. That is, conventional EBG structures are driven below the frequency of the fundamental mode. In contrast, the EBG structures as discussed herein may represent high-order or higher-order EBG structures in that the EBG structures as discussed herein utilize any suitable higher-order harmonic, such as the $3^{rd}$ harmonic or higher mode harmonics, which enable such structures to be driven in accordance with a higher-mode from a mode theory perspective. In contrast, as a result of their operation in the fundamental mode, conventional EBG unit cell structures are much smaller than the components of the antenna elements in the antenna array in which they are implemented. However, the HO EBG structures described herein constitute a set of EBG unit cells, each surrounding and thus being larger than the size of the antenna components of the antenna element 200 with which each EBG unit cell is identified.

The EBG unit cell as shown in FIG. 2C includes two sets of conductive segment patterns, which are disposed on two separate layers of the package substrate 102. In the non-limiting and illustrative scenario as shown in the Figures and discussed herein, the conductive segment patterns 112A, 112B of each of EBG unit cell are also centered and aligned with one another, as well as with the primary and secondary conductive sheets 104, 108.

Figure 7B:
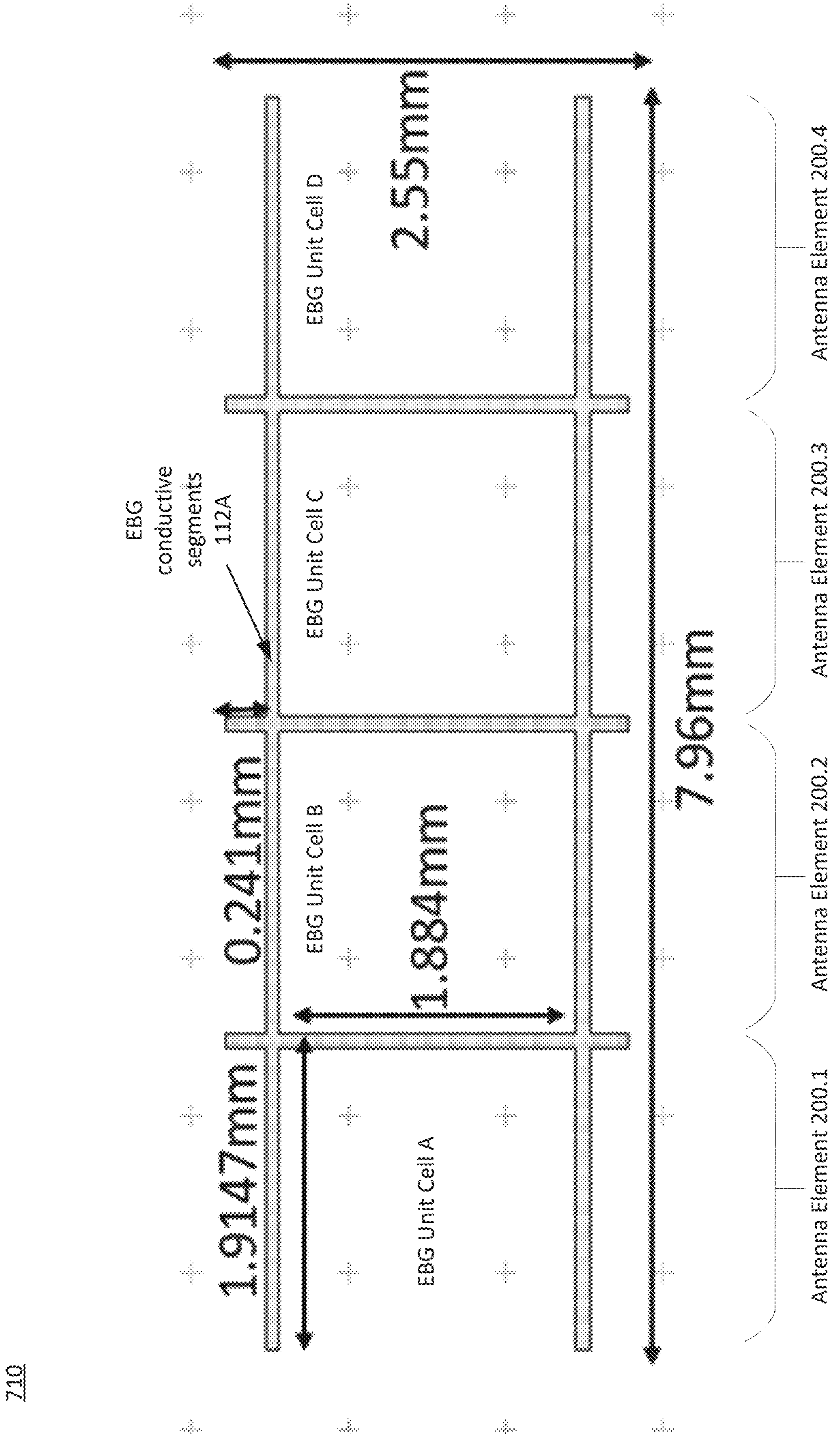
FIG. 7B illustrates a second layer of a substrate layer stack-up including a portion of the EBG structure, in accordance with the disclosure.
Figure 7C:
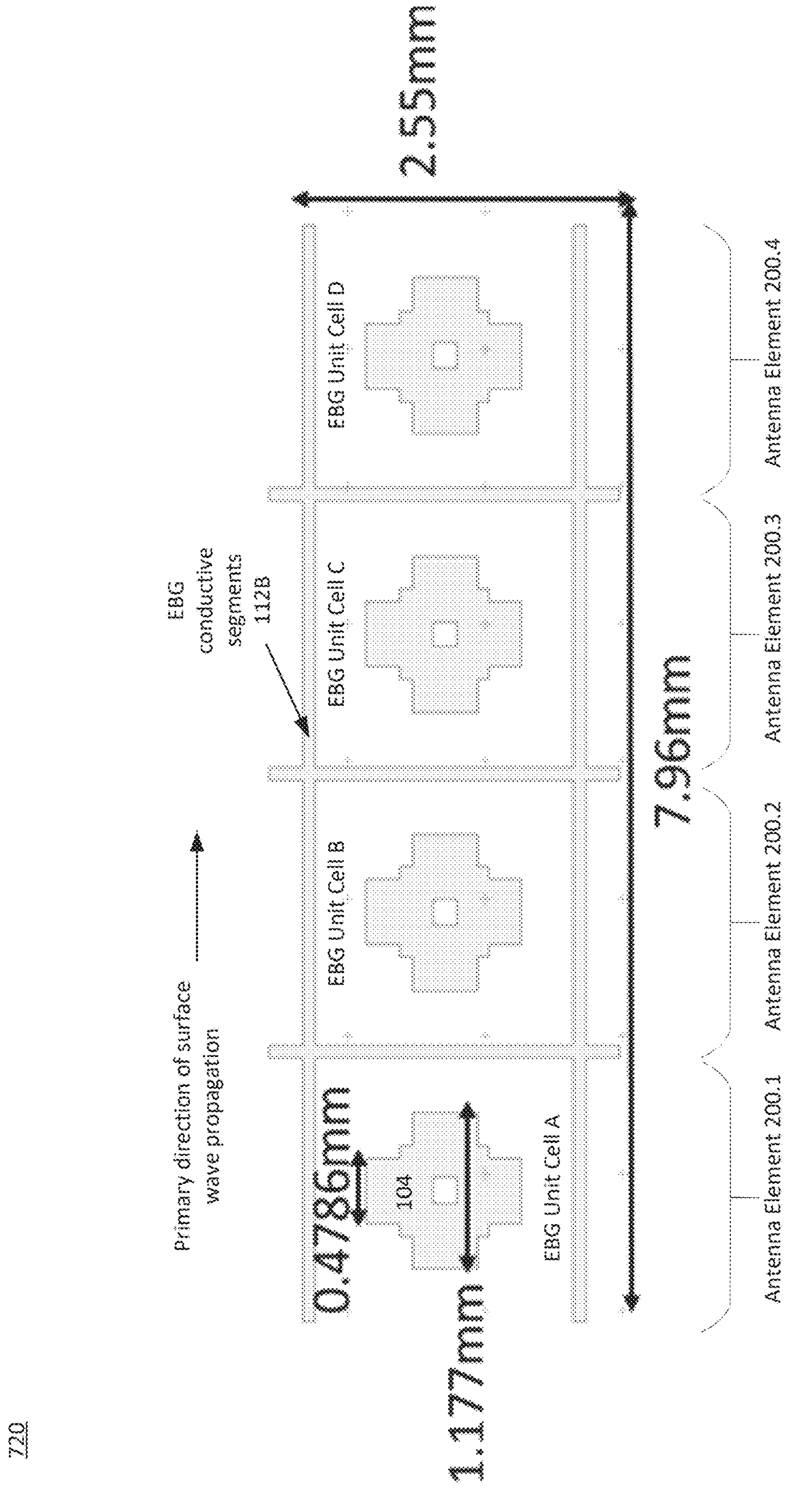
FIG. 7C illustrates a third layer of a substrate layer stack-up including another portion of the EBG structure and the primary conductive sheets, in accordance with the disclosure.
Figure 7D:
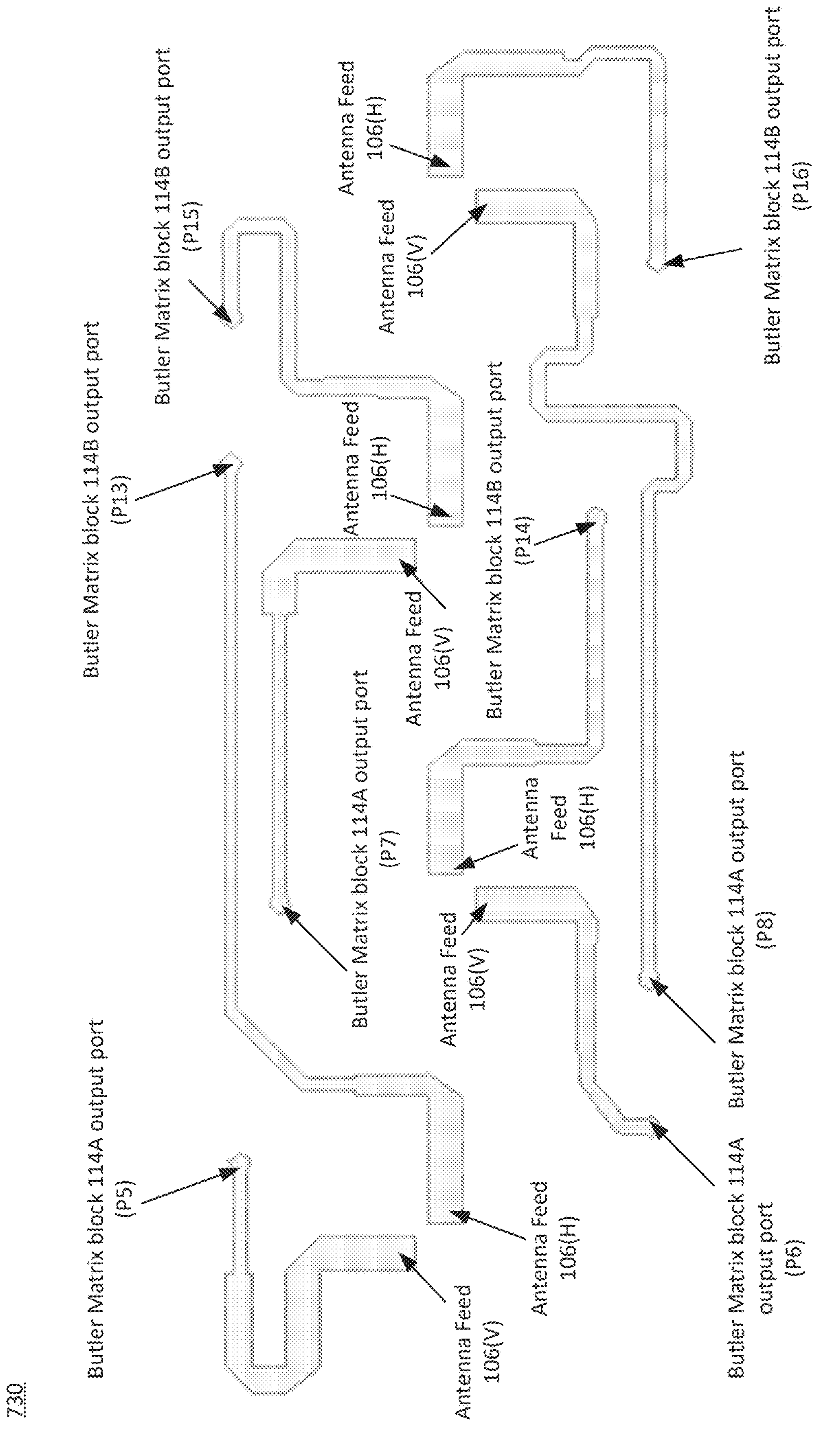
FIG. 7D illustrates a fourth layer of a substrate layer stack-up including conductive traces for the antenna feeds and signal routing network, in accordance with the disclosure.

Again, the high order (HO) EBG structure may alternatively be referred to herein simply as an EBG structure, and is a periodic structure comprising a pattern of conductive segments (also referred to herein as conductive "elements") such as rectangular grids, which are shown in further detail in FIGS. 7B and 7C. The periodic structure is formed via the pattern of repeating conductive segments 112A, 112B, which are coupled to one another within each respective layer of the package substrate 102 to form the pattern of rectangular grids, as further discussed herein. The antenna array architecture 102 may thus comprise any suitable number of EBG unit cells as part of a EBG structure, with one EBG unit cell being identified with a single rectangular shape (i.e. one of the "grids") for each antenna element 200. A single EBG unit cell 112 is shown in FIG. 2C, and comprises a set of conductive segment patterns 112A, 112B, which may be alternatively referred to herein simply as conductive segments. Again, the size of each EBG unit cell (i.e. each set of conductive segment patterns 112A, 112B for that unit cell) is larger than the size of the primary conductive sheet 104 as well as the secondary conductive sheet 108 and the surrounding parasitic elements 110.

The conductive segment patterns 112A, 112B of the overall EBG structure are disposed on separate layers of the package substrate 102, although one of the conductive segment patterns may be disposed on the same layer as the primary conductive sheet 104 to further reduce the overall profile. Using the illustrative and non-limiting scenario as shown in FIG. 1, the conductive segment patterns 112A are disposed on a second layer (L2) of the package substrate 102 above the primary conductive sheets 104 and below the secondary conductive sheets 108. Furthermore, the conductive segment patterns 112B are disposed on the third layer (L3) of the package substrate 102 with the primary conductive sheets 104. However, the conductive segments 112A, 112B may be disposed on alternative layers than those shown in the Figures and discussed herein. As one alternative scenario, the conductive segments 112A, 112B may be disposed on any two respective layers below the top layer (L1), such as the L3 and L4 layers of the package substrate 102 instead of the layers L2 and L3 as shown. In accordance with such scenarios, the signal routing network may be provided on an alternative layer, such as L2. Alternatively, the antenna feed(s) may be changed to a probe feeding configuration, and the signal routing further modified to support this design change.

Additional details of the layout of the conductive segment patterns 112A for the EBG structure of the antenna array architecture 100 are further shown and discussed herein with reference to FIG. 7B. Additional details of the layout of the conductive segment patterns 112B for the EBG structure of the antenna array architecture 102 are further shown and discussed herein with reference to FIG. 7C.

It is noted that the dimensions of the conductive segment patterns 112A, 112B, as well as the offset in the x-y plane between one another (i.e. when not aligned with one another), and the distance between the conductive segment patterns 112A, 112B in the z-direction, constitute design parameters of the antenna element 200. Thus, these design parameters may be modified based upon desired specifications such as operating frequency, bandwidth, desired attenuation of surface waves, etc.

Figure 3:
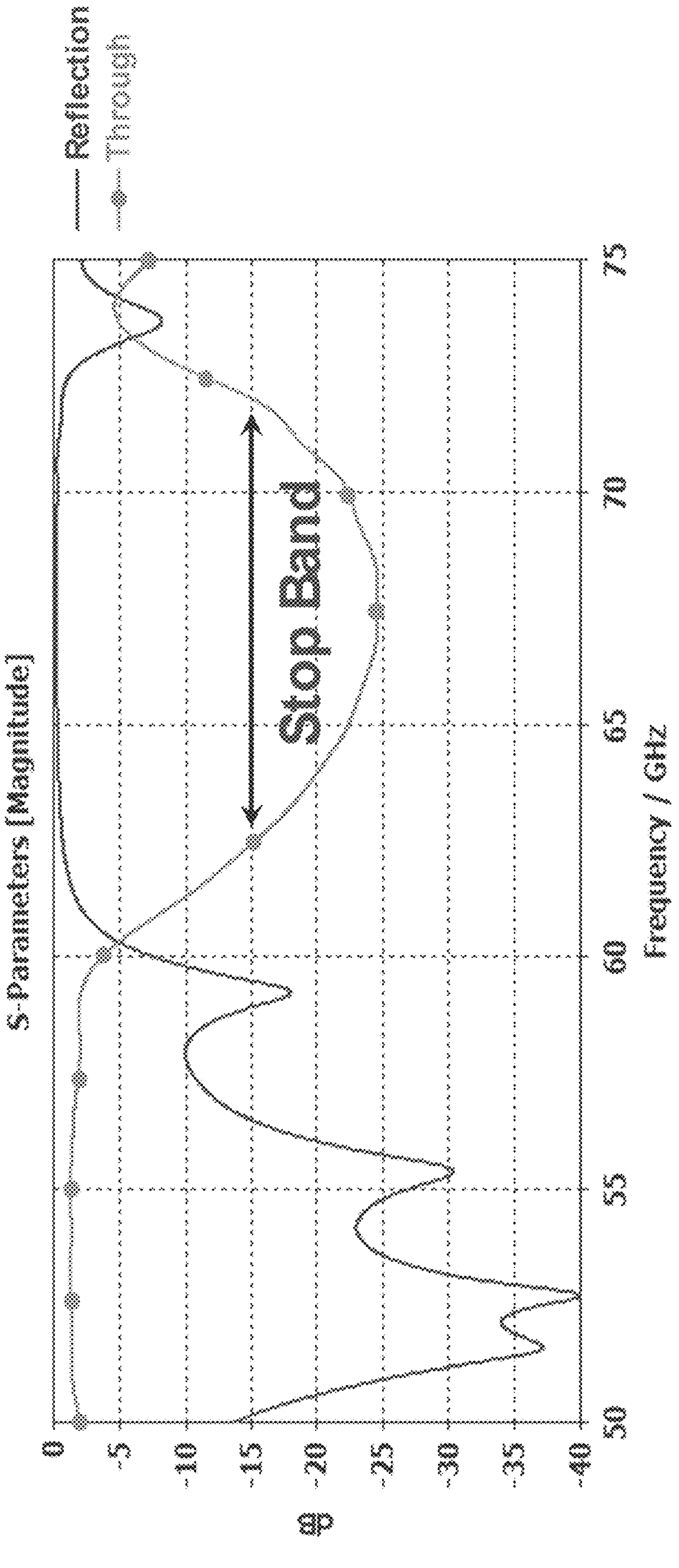
FIG. 3 illustrates simulated S-parameters for a high-order EBG structure, in accordance with the disclosure.

It is also noted that surface waves are more severe at a higher operating frequency range. Using the previous scenario of 57-71 GHz operation, the surface waves are thus more severe in the 65-71 GHz range, as the electrical height of each layer of the package substrate 102 is effectively larger, resulting in additional surface-wave generation. Thus, the EBG structure needs to be effective for such a higher operating frequency range, and the EBG structure implemented in the antenna array architecture 102 as discussed herein advantageously enables operation within these higher frequency hands. This is illustrated with respect to the graph in FIG. 3, which provides a plot of simulated S-parameters of the EBG structure as further discussed herein. The plot in FIG. 3 also shows more than a 6-GHz stopband at such a higher operational frequency range, with 20 dB of suppression with respect to the generated surface waves.

Figure 4A:
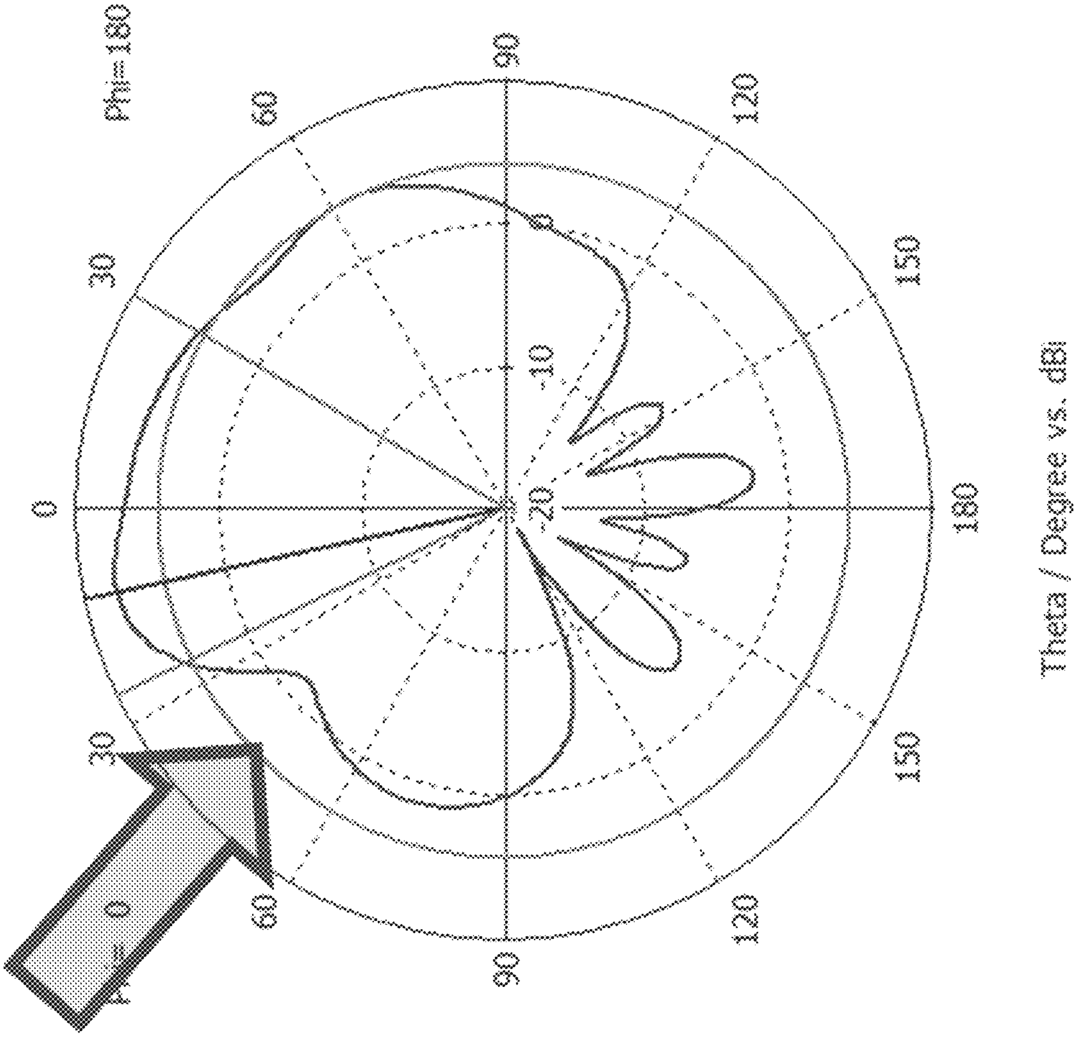
FIG. 4A illustrates a radiation pattern of an antenna element without the use of high-order EBGs, in accordance with the disclosure.
Figure 4B:
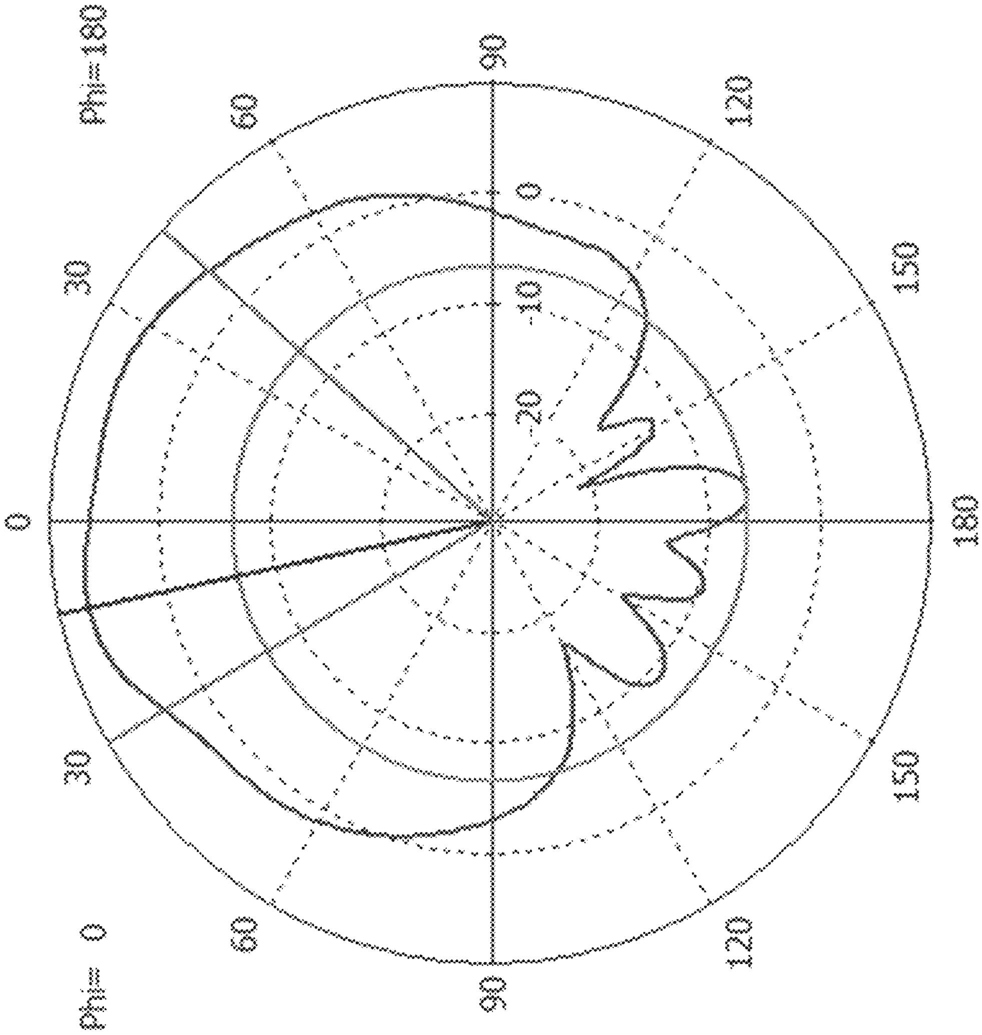
FIG. 4B illustrates a radiation pattern of an antenna element with the use of high order EBGs, in accordance with the disclosure.

Moreover, FIGS. 4A and 4B illustrate a comparison between radiation patterns of the antenna element 200 operating at 71 GHz with and without the use of an EBG unit cell, in accordance with the disclosure. As shown in FIG. 4A, a radiation pattern in the elevation plane is shown for the antenna element 200 as shown in FIGS. 2A-2C, but without the presence of the EBG unit cell. The same radiation pattern is shown in FIG. 4B with the EBG unit cell included. Thus, and as can be shown by a comparison between these radiation patterns, the radiation pattern as shown in FIG. 4B mitigates the distortion present in the radiation pattern of FIG. 4A, as indicated via the red arrow. Therefore, if the surface-wave generation at higher operational frequencies is not suppressed, the sidelobe level of the antenna array architecture 102 may be significantly large, and as a result the antenna array cannot effectively reject interferences. It is further noted that if a beam is coherently formed from each of 4 antenna elements in the antenna array architecture 100, the "dip" due to surface waves would be even deeper than that shown in FIG. 4A, and would result in the generation of large grating lobe(s).

V. The Structure and Operation of the Butler Matrix blocks

Figure 5:
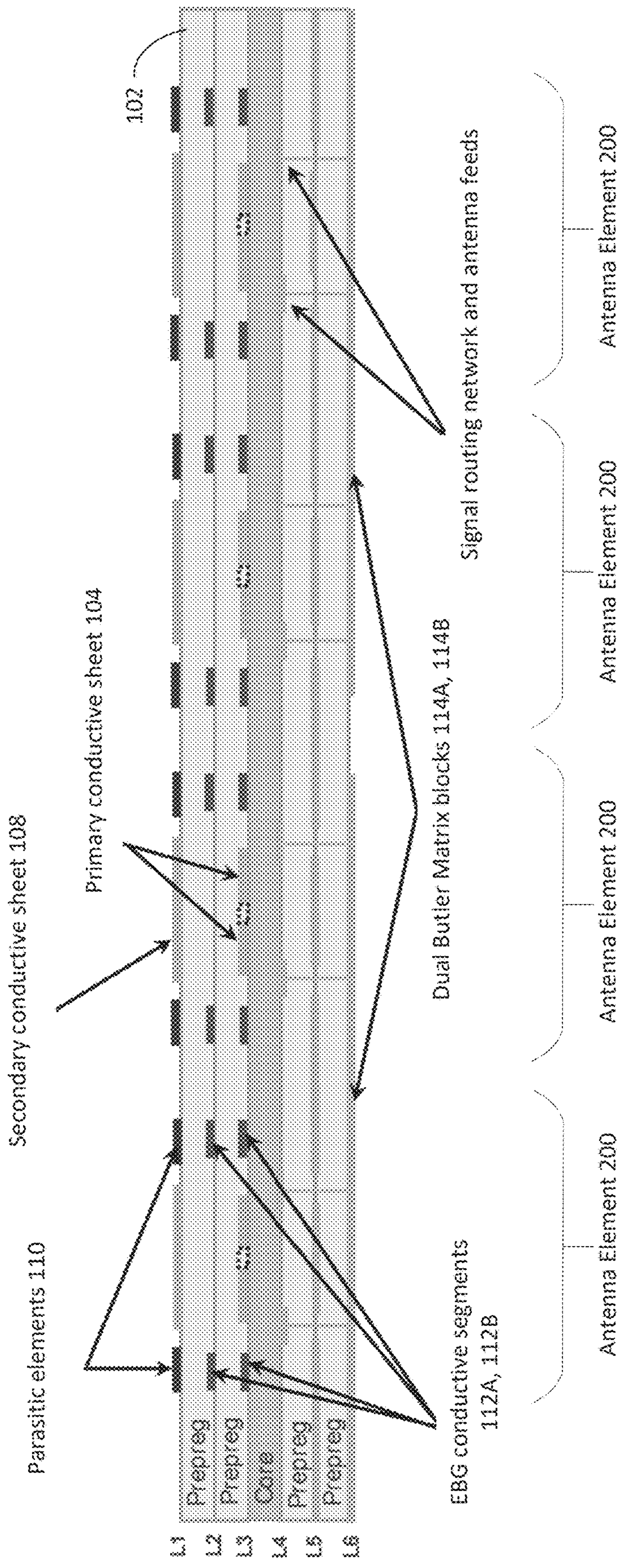
FIG. 5 illustrates a cutaway side view of an antenna array architecture, in accordance with the disclosure.

FIG. 5 illustrates a cutaway side view of an antenna array architecture, in accordance with the disclosure Thus, the antenna array architecture 500 as shown in FIG. 5 represents a side view of the antenna array architecture 100 as shown in FIG. 1, i.e. cut along the length dimension of the package substrate 102 (the 9 mm dimension). Each of the 4 antenna elements 200 is shown in FIG. 5 having a respective primary conductive sheet 104, secondary conductive sheet 108, parasitic elements 110, and EBG conductive segments 112A, 112B, as discussed above with respect to FIGS. 2A-2C. Moreover, layer 4 (L4) of the package substrate 102 includes the signal routing network and the antenna feeds for each of the 4 antenna elements 200, as discussed above with respect to FIG. 2A, which again is shown in further detail in FIG. 7D. The side view as shown in FIG. 5 also illustrates a ground plane in layer 5 (L5) of the package substrate 102, which is shown in further detail in FIG. 7E with the appropriate "keep-outs" to allow passage of the interconnections between the signal routing network and the output ports of each of the Butler matrix blocks 114A, 114B. Additional detail regarding the Butler matrix blocks 114A, 114B is provided immediately below.

The antenna array architecture 100 may include any suitable number of Butler matrix blocks 114 as discussed herein. The total number of Butler matrix blocks 114 is a function of the total number of antenna elements 200 in the antenna array as well as the number of polarizations used. That is, in the illustrative and non-liming scenario discussed herein with respect to the antenna array architecture 100, two Butler matrix blocks 114A, 114B are implemented, one per polarization. These polarizations may include horizontal and vertical polarizations in accordance with the antenna feed coupling as shown in FIG. 2A, although the disclosure is not limited to this particular implementation.

As shown in FIG. 5, the two Butler matrix blocks 114A, 114B are disposed on the bottom layer (L6) of the package substrate 102 to support dual polarization operation, and positioned parallel with one another. That is, the Butler matrix blocks 114A, 114B are disposed on a layer of the package substrate 102 at a side of the primary conductive sheet 104 that is opposite to the secondary conductive sheet 108, i.e. facing the opposite direction of the antenna array formed by the antenna elements 200. This configuration enables the Butler matrix blocks 114A, 114B to share the same ground plane (L5) with the primary and secondary conductive sheets 104, 108, as well as with the signal routing network layer (L4), allowing for a further reduction in the profile of the antenna array architecture 100.

Each one of the Butler matrix blocks 114A, 114B has its respective set of output ports (for that particular polarization) coupled to each respective antenna feed 106 identified with each antenna element 200 via a respective conductive trace of the signal routing network as shown in FIG. 7D. Thus, this signal routing makes use of the existing signal routing network layer (L4), and vias are used to connect the outputs of each Butler matrix block 114A, 114B from the bottom layer (L6) to the signal routing network on layer (L4) to feed each of the antenna elements 200, as can be seen in the side view shown in FIG. 5. This architecture advantageously reduces the required number of layers for the PCB/package.

Again, in one non-limiting and illustrative scenario of a dual-polarization configuration, each Butler matrix block 114A, 114B controls one polarization, i.e. the left Butler matrix block 114A connects to the vertical feeds of each of the antenna elements 200 in the antenna array, and the right Butler matrix block 114B connects to the horizontal feeds of each of the antenna elements 200 in the antenna array. Thus, each of the two Butler matrix blocks 114A, 114B is dedicated to a separate polarization, and has a number of input ports and a number of output ports.

Figure 6:
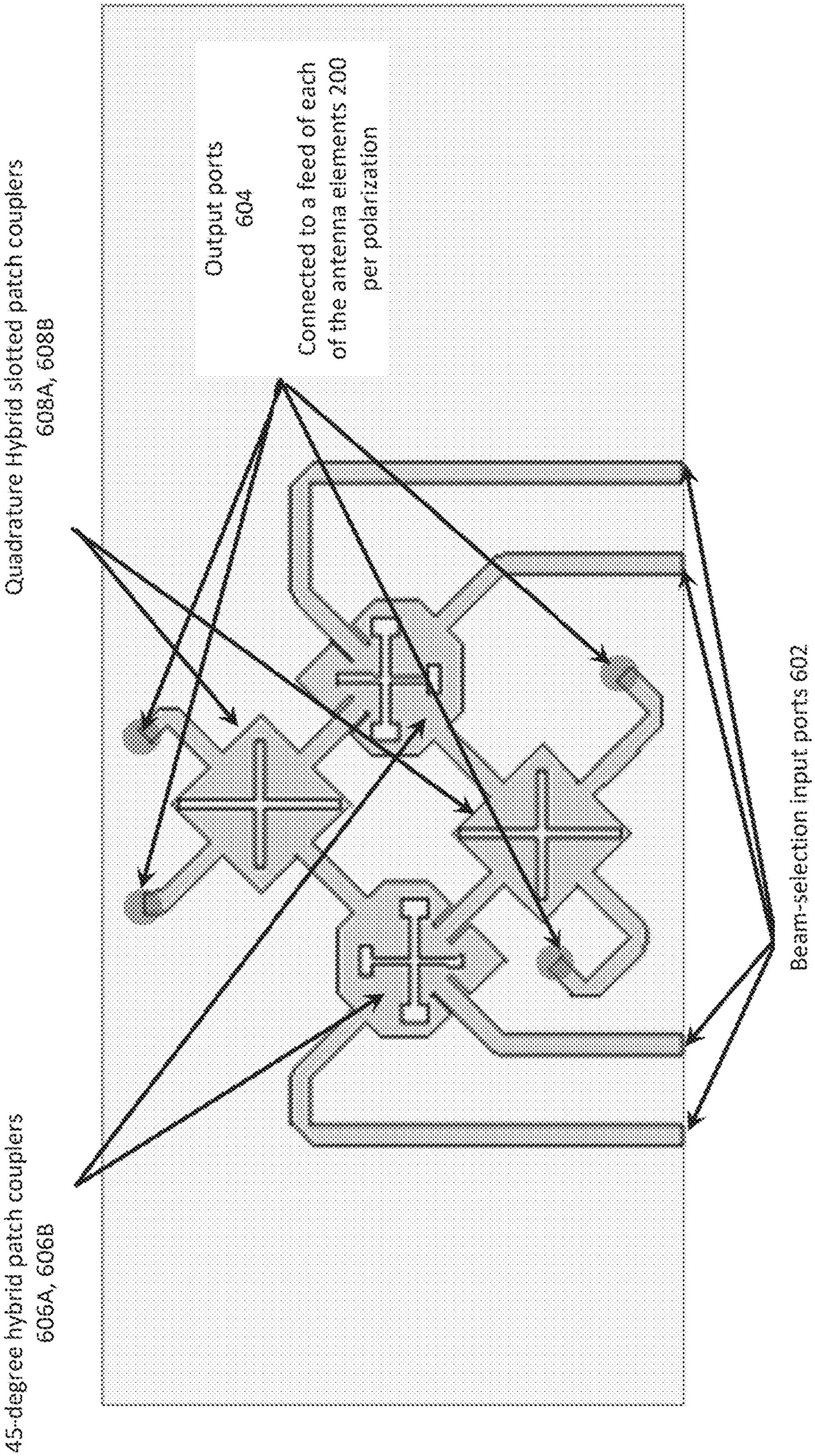
FIG. 6 illustrates a compact Butler matrix block configuration, in accordance with the disclosure.

A Butler matrix block 600 is shown in further detail in FIG. 6, and may be identified with each of the Butler matrix blocks 114A, 114B. Thus, each of the Butler matrix blocks 114A, 114B may have a similar or identical shape as one another, with the exception of slight differences between the output port configurations to ensure an equal electrical length is maintained between the antenna feeds of each of the antenna elements 200, as discussed in further detail below. That is, for each Butler matrix block 114A, 114B, the phases between each of the output ports and correspondingly coupled antenna ports are matched to one another to provide coherent beam combining. A top view of each of the Butler matrix blocks 114A, 114B is shown in further detail in FIG. 7F, with a Butler matrix block 1000 shown in FIG. 10 labeling the input ports P1-P4 and the output ports P5-P8, and which is used for the purpose of providing simulated results further discussed herein. With continued reference to FIGS. 6 and 7F, each Butler matrix 114A, 114B comprises any suitable number N of beam-selection input ports (P1-P4, P9-P12), and any suitable number N of output ports (P5-P8, P13-P16), with N being equal to the number of antenna elements 200 in the antenna array architecture 100. Thus, in the non-limiting and illustrative scenario in which the antenna array architecture 100 comprises 4 antenna elements 200, as shown in FIG. 5, each Butler matrix 114A, 114B comprises four input ports and four output ports, as shown in FIGS. 6 and 7F.

Again, a Butler matrix is a type of passive beamforming network that is used to feed an array of antenna elements. Thus, the Butler matrix blocks 114A, 114B control the direction of a beam, or beams, for a radio transmission. To do so, each Butler matrix 114A, 114B is coupled to a set of beam selection input ports 602 (input ports P1-P4 and P9-P12), which are accessed during transmission (i.e. driven) and reception (received and the signals combined, when applicable), and a set of output ports 604 (output ports P5-P8 and P13-P16), to which each of the antenna elements 200 are connected (via the antenna feeds 106 and the signal routing network) as discussed herein.

The Butler matrix blocks 114A, 114B thus function to couple signals between the antenna elements 200 during transmission and reception to provide a progressive phase difference between the antenna elements 200, such that the beam of radio transmission (or reception) is in the desired direction. The beam direction is controlled by in this way switching access to the desired beam port. Using the transmission case as one illustrative scenario, as a transmission signal is applied to one of the beam-selection input ports 602, the antenna array of antenna elements 200 transmits in accordance with a radiation pattern having a predetermined beam direction corresponding to that particular activated beam selection input port 602. Thus, by selectively coupling transmission signals to each of the beam-selection input ports 602, the beam direction of the antenna array of antenna elements 200 is changed to match one of a set of predetermined beam directions. Any combination of the beam-selection input ports 602, or all beam-selection input ports 602, may be accessed simultaneously or sequentially in this way to provide different phase tapers across the antenna elements 200 in the antenna array, resulting in various combinations of predetermined radiation patterns and/or predetermined beam directions.

With continued reference to FIG. 6, to perform such beam control, each Butler matrix block 114A, 114B comprises two 45-degree hybrid patch couplers 606A, 606B, which function to split (such as a −3 dB split) the signals at the respective beam-selection input ports 602 into two signals having a 45-degree phase offset relationship with one another. The input ports 602 are isolated from one another due to the shape of each hybrid patch coupler 606A, 606B. The output of each of the 45-degree hybrid patch couplers 606A, 606B (i.e. the non-input ports) are in turn fed into each one of two quadrature hybrid slotted patch couplers 608A, 608B. Each quadrature hybrid slotted patch coupler 608A, 608B functions to further split (such as a −3 dB split) the respectively received signals into two signals having a 90-degree phase offset relationship with one another. The input ports of each quadrature hybrid slotted patch coupler 608A, 608B (i.e. the non-output ports) are also are isolated from one another due to the shape of each quadrature hybrid slotted patch coupler 608A, 608B. Of course, the number of 45-degree hybrid patch couplers 606 and quadrature hybrid slotted patch couplers 608 is a function of the number N of input and output ports that are implemented, with the number of each being N/2.

Again, each one of the output ports 604 of each Butler matrix 114A, 114B is coupled to a respective conductive trace that is part of the signal routing network, which is disposed on layer 4 (L4) of the package substrate 102 as shown in FIG. 5. Turning now to FIG. 7D, the signal routing network is shown in further detail, with each of the output ports P5-P8, P13-P16 of each Butler matrix block 114A, 114B, respectively, being mapped to a conductive trace associated with each antenna feed. As shown in FIG. 7D, the signals are routed from the output ports of each compact Butler matrix blocks 114A, 114B from the top and bottom side of each of the antenna elements 200.1-200.4 separately (i.e. routed around the primary and secondary conductive sheets 104, 108 and parasitic elements 110), maintaining the same electrical length as one another with respect to each of the Butler matrix blocks 114A, 114B.

In other words, the electrical length between each one of the vertical polarization antenna feeds to their respective vertical polarization output ports (i.e. P5-P8 for the Butler matrix block 114A), which is represented by the set of conductive traces as shown in FIG. 7D, are equal to one another. Moreover, the electrical length between each one of the horizontal polarization antenna feeds to their respective horizontal polarization output ports (i.e. P13-P16 for the Butler matrix block 114B), which is represented by the set of conductive traces as shown in FIG. 7D, are also equal to one another.

Figure 9:
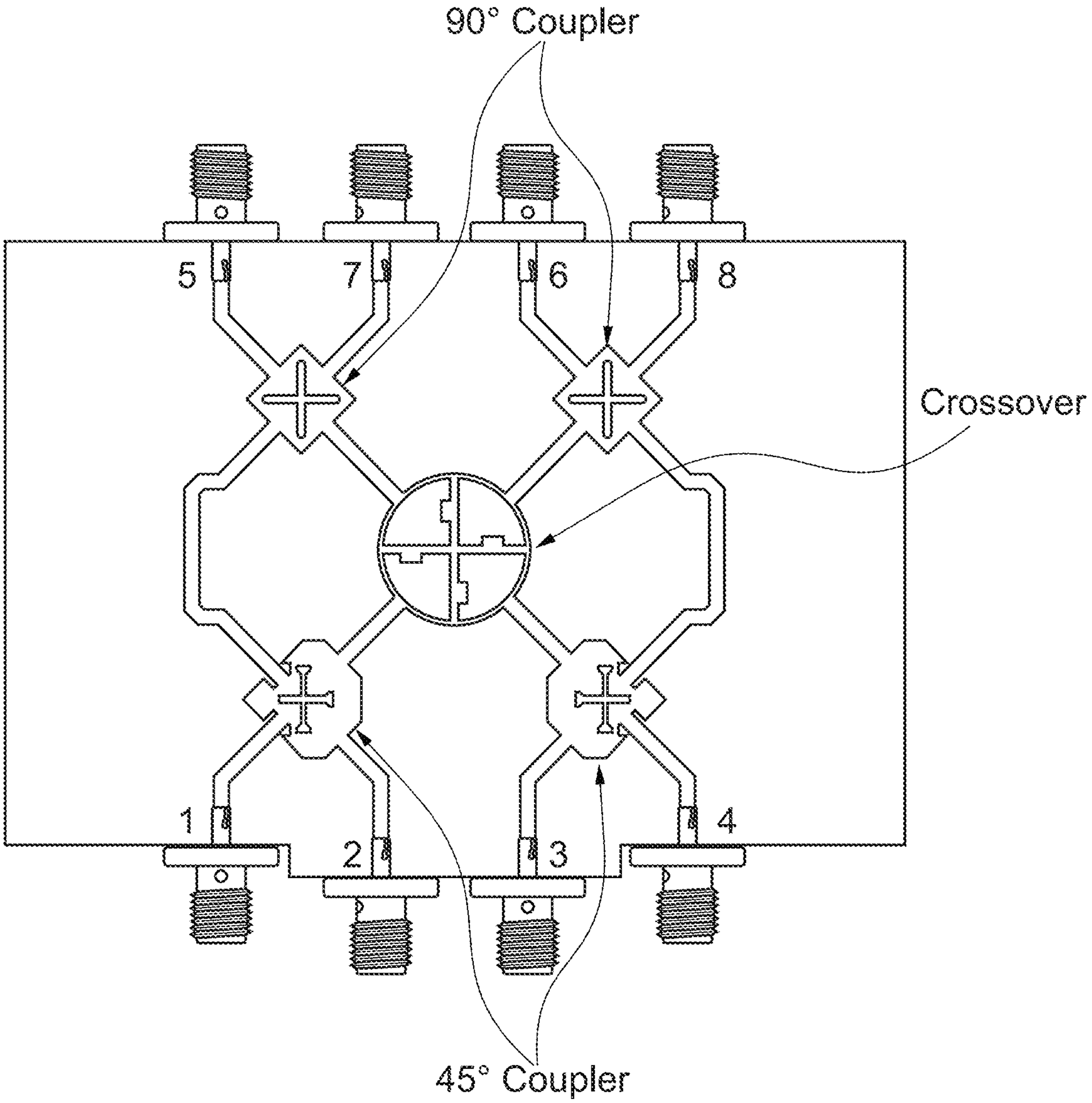
FIG. 9 Prior Art
FIG. 9 illustrates a conventional Butler matrix block design.
Figure 10:
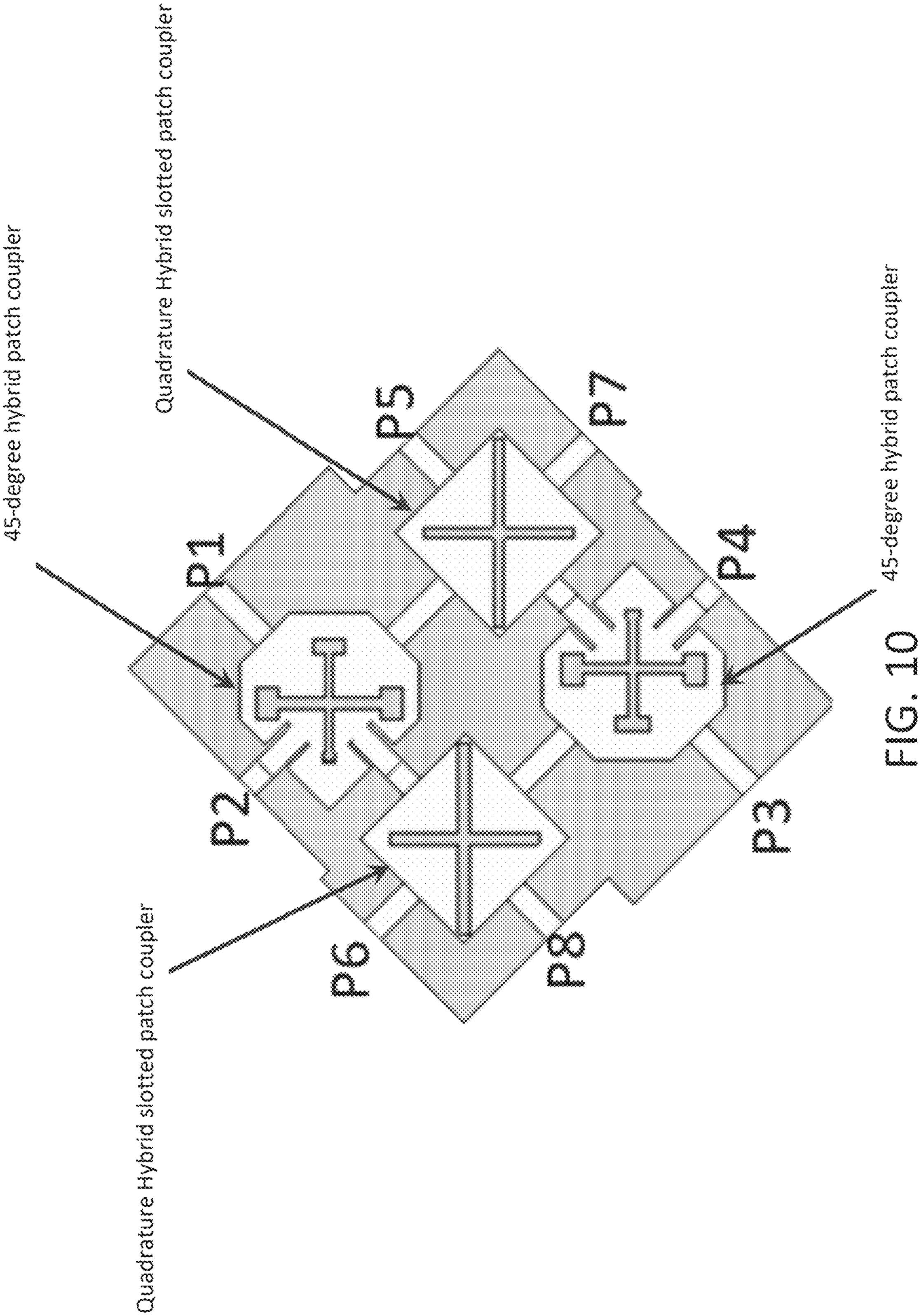
FIG. 10 illustrates a compact Butler matrix block design with port definitions, in accordance with the disclosure.

Thus, the electrical length between the antenna feed of each antenna element 200.1-200.4 and the respective output port P5-P8 of Butler matrix block 114A are equal to one another. Moreover, the electrical length between the antenna feed of each antenna element 200.1-200.4 and the respective output port P13-P16 of Butler matrix block 114B are equal to one another. This equal electrical length among the feeds of each antenna element 200 allows for a crossover architecture to be eliminated, which would otherwise be required as part of each Butler matrix block 114A, 114B. In particular, the Butler matrix blocks 114A, 114B in accordance with the disclosure implement modified 45-degree hybrid patch couplers 606A, 606B and modified quadrature hybrid slotted patch couplers 608A, 608B with respect to a conventional Butler matrix block, an example of which is shown in FIG. 9. Turning now to FIG. 10, this modification includes a re-configuration of the hybrid patch couplers 606A, 606B, 608A, 608B compared to the conventional Butler matrix block layout as shown in FIG. 9 to remove the crossover and to cluster each of the hybrid patch couplers 606A, 606B, 608A, 608B into a diamond arrangement, thereby making the Butler matrix blocks 114A, 114B more compact.

The crossover section, which is shown in FIG. 9 and is typically present in conventional Butler matrix block configurations to maintain signal purity whenever transmission lines overlap, may be removed in this configuration by exploiting the routing of the conductive segments between the Butler matrix blocks 114A, 114B and the antenna feeds of each of the antenna elements 200, as discussed above. That is, physical crossover between the signals is avoided by way of the routing of the conductive traces from the output ports of each Butler matrix block 114A, 114B around the primary and secondary conductive sheets 104, 108 and parasitic elements 110, i.e. from the top and bottom side of each of the antenna elements 200 separately. And advantageously, as each of the electrical lengths from the output ports P5-P8, P13-P16 of each Butler matrix block 114A, 114B, respectively, and each antenna feed of the antenna elements 200 are equal to one another, the phase relationship between the signals at the output port of each Butler matrix port P5-P8, P13-P16 is preserved at each coupled antenna feed. In this way, the "crossover" function is integrated as part of the routing traces (i.e. the conductive segments comprising the signal routing network) over multiple layers (L4, L5, and L6 in illustrative scenario as shown in FIG. 5). In this way, the antenna array architecture 102 functions as a wideband antenna array, and has multiple layers of signal routing that are leveraged to remove the need for a crossover in the Butler matrix blocks 114A, 114B. Not only does this configuration facilitate a more compact Butler matrix block design, as shown in FIG. 10, but the elimination of the crossover in the Butler matrix blocks 114A, 114B increases the operating frequency range of the antenna array architecture 102, as the presence of crossovers are known to limit bandwidth.

Again, the orientation of each Butler matrix block 114A, 114B is that of a diamond shape, i.e. a 45-degree rotation, as shown in FIG. 6, which enables the Butler matrix to have a particularly compact design as a result of the elimination of the crossover section. With respect to the orientation of the Butler matrix blocks 114A, 114B, it is noted that the package substrate 102 has length and width dimension that are respectively aligned with two orthogonal axes (such as the x- and y-axes as shown in FIGS. 2A-2C). Each of the 45-degree hybrid patch couplers 606A, 606B, and the quadrature hybrid slotted patch couplers 608A, 608B, are rotated 45-degrees with respect to these two orthogonal axes, thereby proving the diamond shape as shown in FIGS. 6 and 7F. In this way, the Butler matrix blocks 114A, 114B are particularly compact. Furthermore, and as a result of the diamond shape of the Butler matrix blocks 114A, 114B, the beam-selection input ports 602 can be easily extended to the edge of the PCB/package without crossing with one other, as shown in FIG. 6.

VI. A Top-Down View Layer Stack-Up

FIGS. 7A-7F illustrate a top down view of each layer of the package substrate 102 of the antenna array architecture 100 as shown in FIG. 1, providing an alternative view of the layers as shown in the side view of the package substrate 102 as shown in FIG. 5. The dimensions are provided as an illustrative and non-limiting scenario with respect to the operation of the antenna array architecture 100 in accordance with the 57-71 GHz frequency band, as discussed herein. However, it is noted that any of these labeled dimensions may be considered design parameters, and thus be adjusted based upon the desired operating specifications of the antenna array architecture 102.

FIG. 7A illustrates a first or top layer (L1) of the package substrate 102 layer stack-up, in accordance with the disclosure. As shown in FIG. 7A, the top layer includes the secondary conductive sheets 108 and the conductive parasitic elements 110 for each of the antenna elements 200.1-200.4. For brevity, only the secondary conductive sheets 108 and parasitic elements 110 are labeled for the first antenna element 200.1, although each of the antenna elements 200.1-200.4 may comprise identical components.

FIG. 7B illustrates a second layer (L2) of the package substrate 102 layer stack-up including a first portion of the EBG structure, in accordance with the disclosure. As shown in FIG. 7B, a pattern of conductive segments 112A are disposed on the second layer forming a periodic grid pattern of rectangles, with each grid or rectangular shape as shown in FIG. 7B forming part of a respective unit cell for each antenna element 200.1-200.4.

FIG. 7C illustrates a third layer (L3) of the package substrate 102 layer stack-up including a second portion of the EBG structure and the primary conductive sheets 104, in accordance with the disclosure. As shown in FIG. 7C, the third layer includes the primary conductive sheets 104 for each of the antenna elements 200.1-200.4. For brevity, only the primary conductive sheet 104 is labeled for the first antenna element 200.1, although each of the antenna elements 200.1-200.4 may comprise identical components.

Moreover, the third layer includes a second pattern of conductive segments 112B forming another periodic grid pattern of rectangles, with each grid or rectangular shape as shown in FIG. 7C forming part of a respective unit cell for each antenna element 200.1-200.4. Thus, the EBG structure comprises any suitable number of unit cells, with each unit cell comprising the set of conductive segments disposed on each of the respective layers of the package substrate 102 (i.e. layers 2 and 3 as shown in the non-limiting and illustrative scenario of FIG. 5). The first and second pattern of conductive segments 112A, 112B on the second and third layers, respectively, may be identical to one another and aligned with one another, as shown in FIG. 5. Alternatively, deviations between the shapes, sizes, and alignment of the first and second conductive pattern segments 112A, 112B is possible, and are considered design parameters of the antenna array architecture 102. In any event, the configuration of the EBG structure, which again includes both the first and the second patterns of conductive segments 112A, 112B, functions to attenuate the propagation of high order surface electromagnetic waves along the length dimension (i.e. 7.96 mm) of the package substrate 102, as illustrated in FIG. 7C.

Furthermore, and as can be seen in FIG. 7C, the size (i.e. overall dimensions in the x-y plane) of each EBG unit cell of the EBG structure is larger than the size (i.e. overall dimensions in the x-y plane) of the primary conductive sheets 104. Likewise, the size of each EBG unit cell of the EBG structure is larger than the size of the secondary conductive sheets 108 and the parasitic elements 110. That is, the rectangular grid structure of each EBG unit cell, which occupies two layers of the package substrate 102, surrounds the primary conductive sheet 104, the secondary conductive sheet 108, and the parasitic elements 110 of each antenna element 200.1-200.4. In other words, the size of each EBG unit cell structure is larger than the components of the antenna element 200 with which the EBG unit cell is identified by way of the two-dimensional extents of each unit cell being larger than the two-dimensional extents spanned by the primary conductive sheet 104, the secondary conductive sheet 108, and the parasitic elements 110 of each antenna element 200.1-200.4.

FIG. 7D illustrates a fourth layer of the package substrate 102 layer stack-up including conductive traces for the antenna feeds and signal routing network, in accordance with the disclosure. As shown in FIG. 7D, the signal routing network is comprised of a plurality of conductive traces, which function to couple the output ports P5-P8, P13-P16 of Butler matrix block 114A, 114B, respectively, to a respective antenna feed of one of the antenna elements 200.1-200.4. In the illustrative and non-limiting scenario as shown in FIG. 7D, the horizontal polarization antenna feeds 106 are labeled with the notation ('H'), whereas the vertical polarization antenna feeds 106 are labeled with the notation ('V').

Figure 7E:
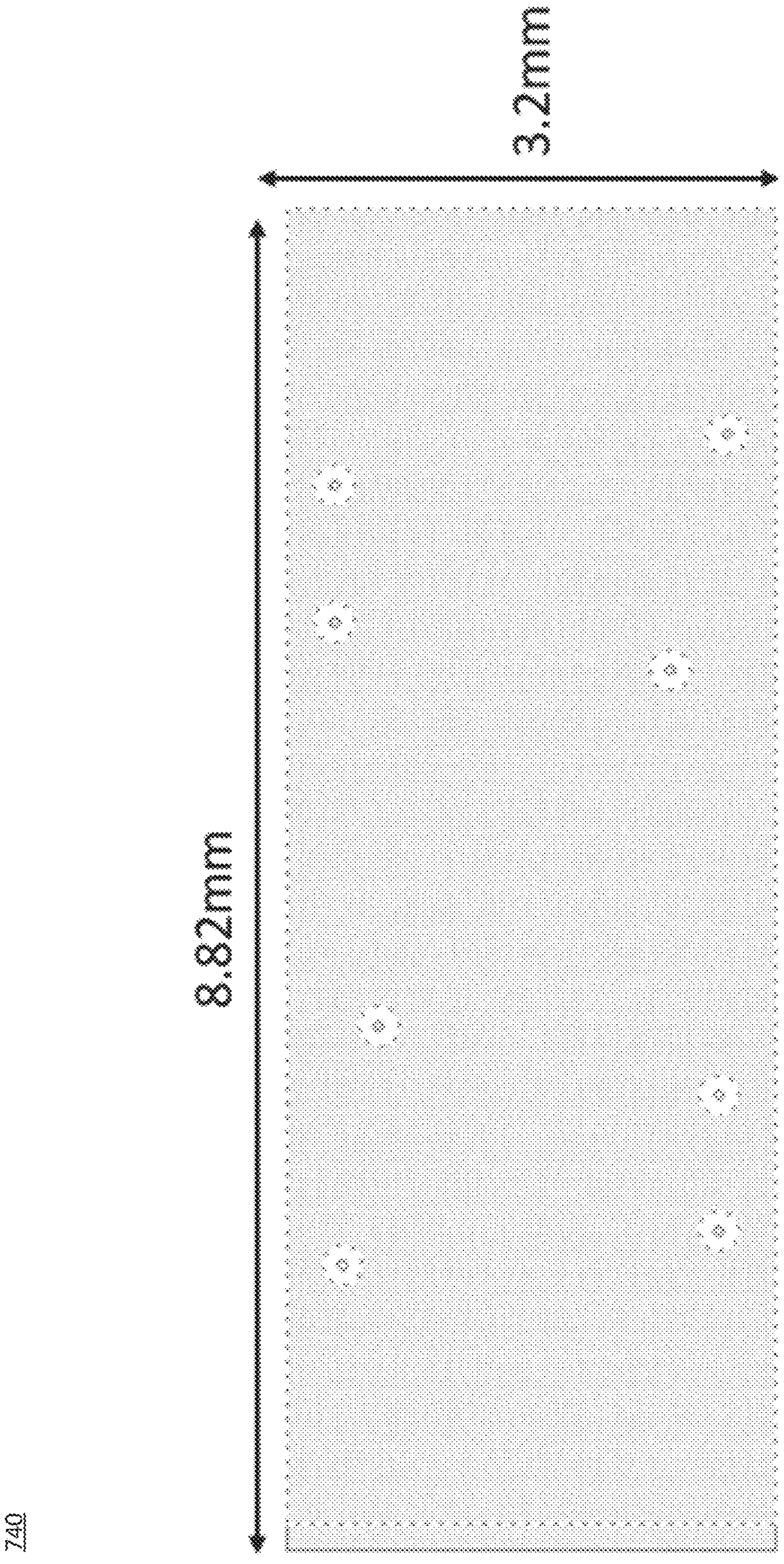
FIG. 7E illustrates a fifth layer of a substrate layer stack-up including a ground plane, in accordance with the disclosure.
Figure 7F:
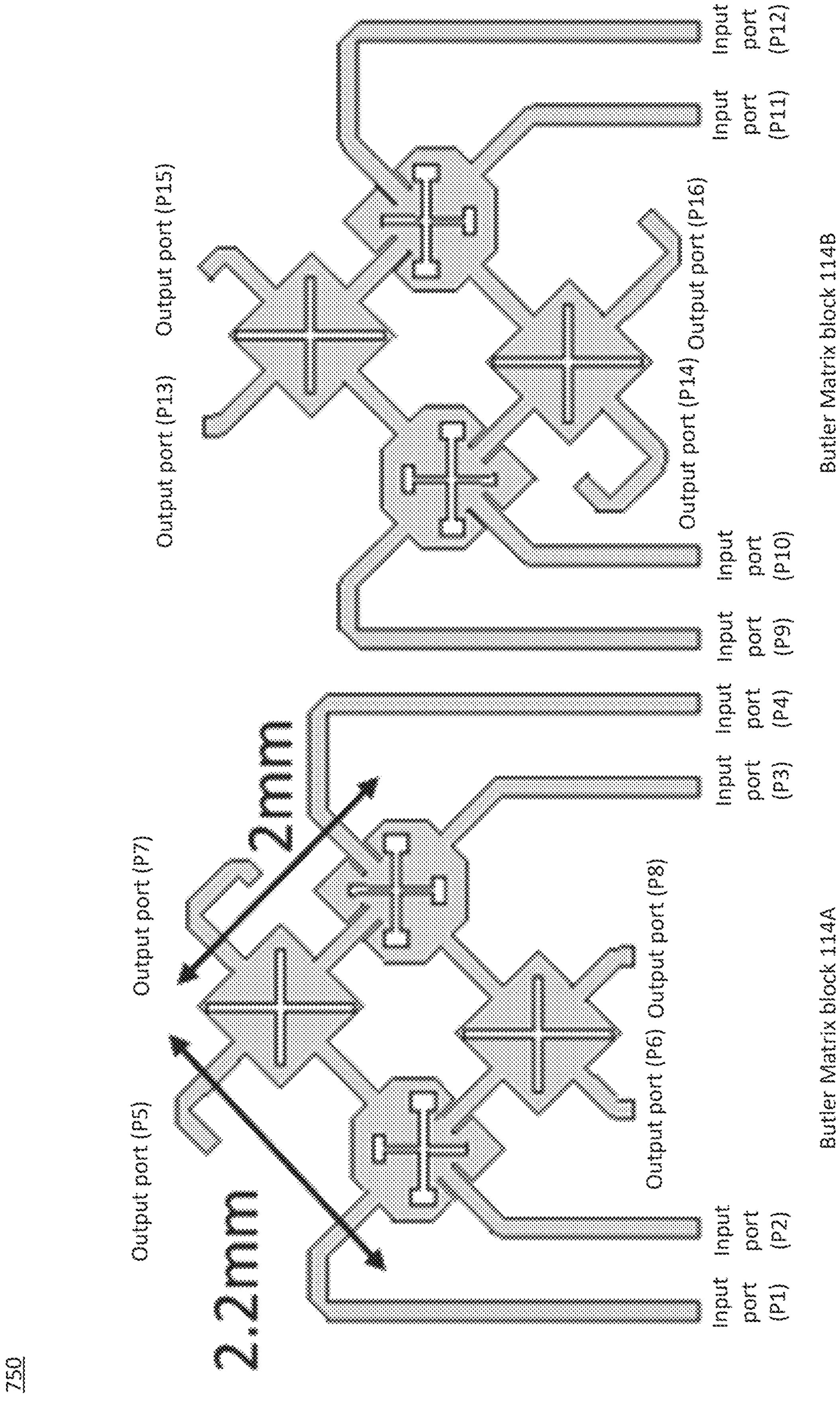
FIG. 7F illustrates a sixth layer of a substrate layer stack-up including a set of Butler matrix blocks, in accordance with the disclosure.

FIG. 7E illustrates a fifth layer of the package substrate 102 layer stack-up including a ground plane, in accordance with the disclosure. As shown in FIG. 7E, the "keep-outs" are provided to facilitate the vias coupling the Butler matrix output ports P5-P8, P13-P16 to each of the antenna feeds 106 as shown in FIG. 7D.

FIG. 7F illustrates a sixth layer of the package substrate 102 layer stack-up including a set of Butler matrix blocks, in accordance with the disclosure. Again, as shown in FIG. 7F, layer 6 comprises the two Butler matrix blocks 114A, 114B, each comprising a respective set of input ports P1-P4, P9-P12 and output ports P5-P8, P13-P16. The coupling between each of the output ports P5-P8, P13-P16 of Butler matrix blocks 114A, 114B and the antenna feeds 106 is illustrated in more detail in FIG. 7D.

VII. Simulation Results—Wideband Antenna Array Design

Again, the antenna array architecture 100 as discussed herein may be implemented in a non-limiting and illustrative scenario as a 1×4 patch antenna array with parasitic elements. Such a configuration supports operation in the 57-71 GHz frequency range, and covers the 60-GHz global ISM bands with a single-SKU array design. With the high-order EBG structures, not only is the pattern distortion due to surface-wave generation at the higher operational frequencies mitigated, but the isolation between antenna elements is also enhanced. This is illustrated by way of the simulated S-parameters as shown in FIGS. 8A-8B.

Figure 8A:
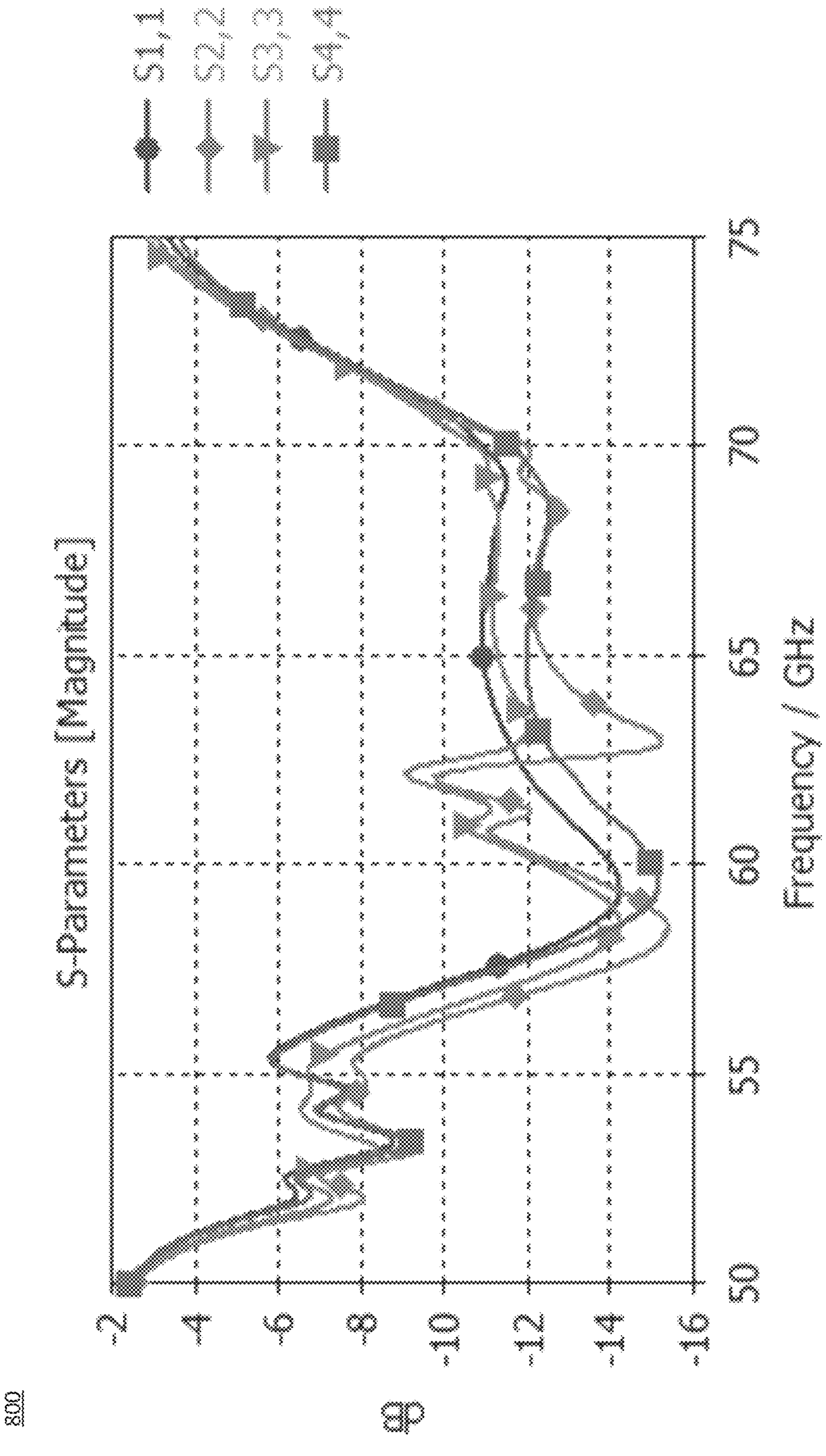
FIGS. 8A-8B illustrate simulated S-parameters of the dual-polarized antenna array architecture as shown in FIG. 1, in accordance with the disclosure.
Figure 8B:
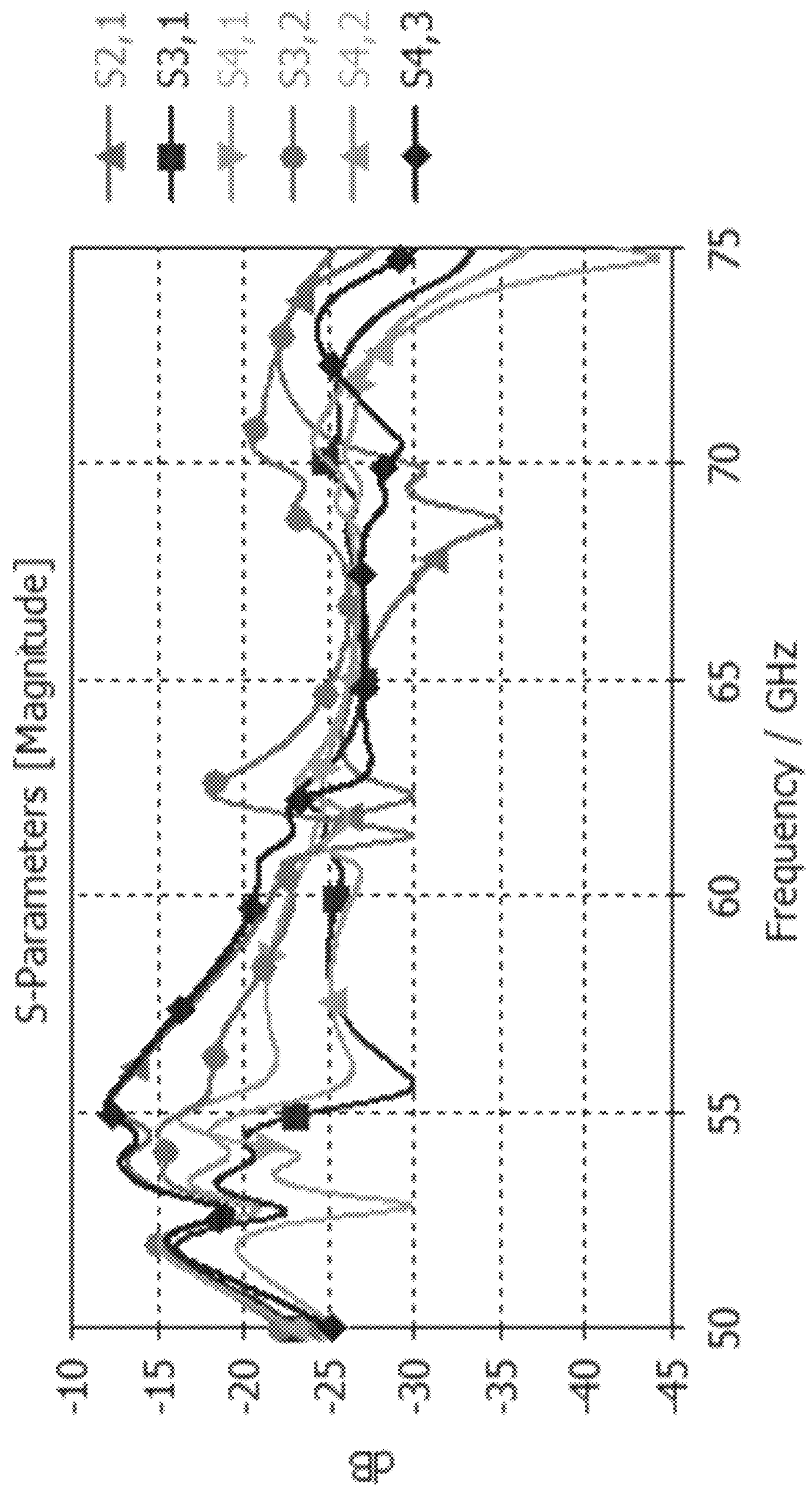

Specifically, FIGS. 8A-8B illustrate simulated S-parameters of the dual-polarized antenna array architecture 102 as shown in FIG. 1, in accordance with the disclosure. The plot in FIG. 8A illustrates the reflection at antenna element ports 106 for each of the antenna elements 200.1-200.4. For each of the plots as shown in FIGS. 8A and 8B, a single set of S-parameters are shown identified with the vertical polarization antenna feeds 106(V), although the S-parameters identified with the horizontal polarization antenna feeds 106(H) would be identical or substantially similar. The plot in FIG. 8B illustrates the isolation between antenna elements reflection at antenna element ports 106 for each of the antenna elements 200.1-200.4.

VIII. Simulation Results—Compact Beamforming Network for Dual-Polarized Array

Again, the Butler matrix block 1000 as shown in FIG. 10 illustrates a compact Butler matrix design with port definitions. The ports P1-P4 are identified with the beam selection input ports, and the ports P5-P8 are identified with the output ports, each being coupled to a respective antenna feed 106(V) of each of the antenna elements 200.1-200.4. Similarly, The ports P9-P12 are identified with the beam selection input ports, and the ports P13-P16 are identified with the output ports, each being coupled to a respective antenna feed 106(H). The same notation with respect to these port definitions are used to provide the simulation results as shown in FIGS. 11A-11D.

Figure 11A:
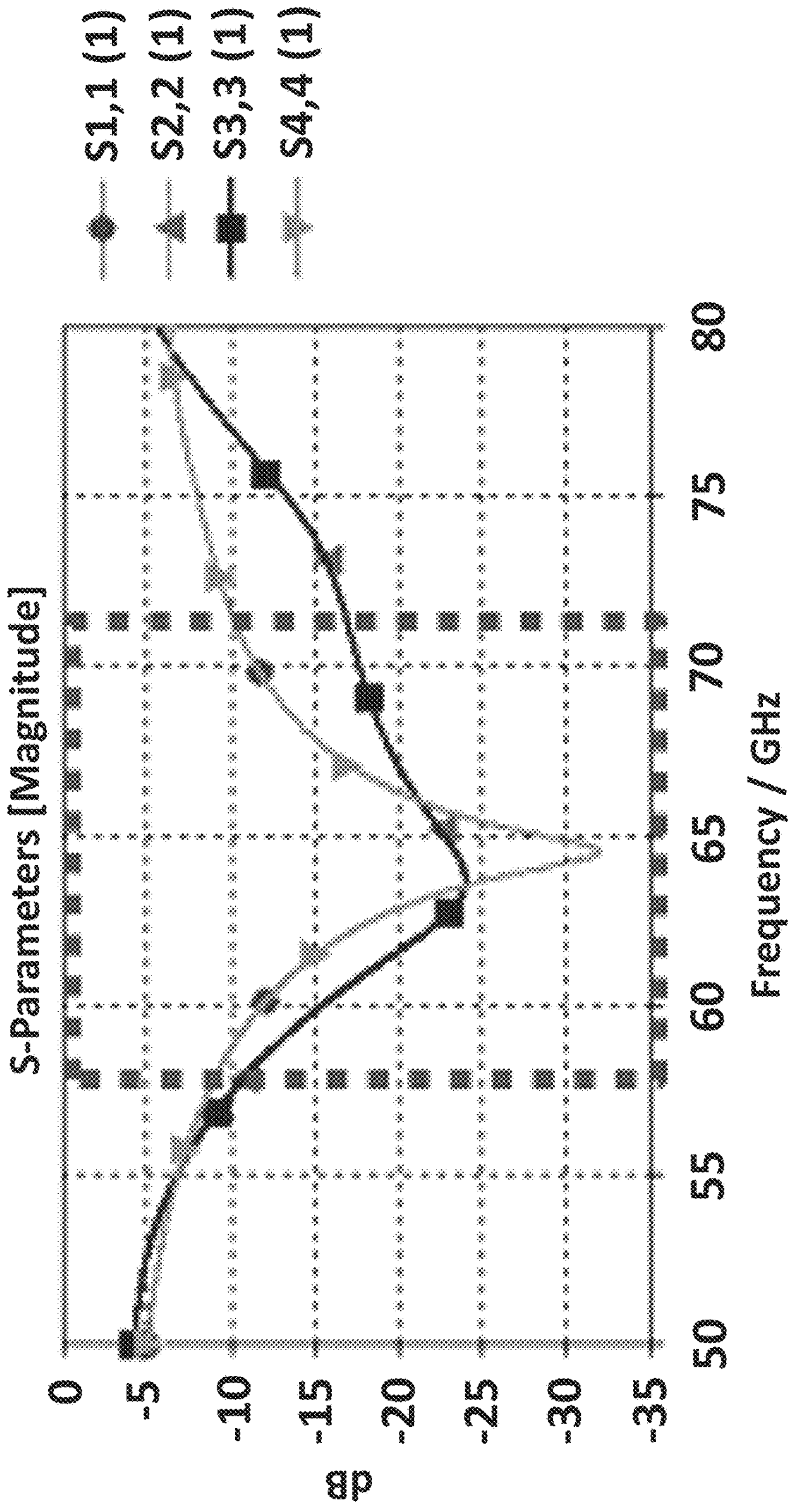
FIGS. 11A-11D illustrate simulated S-parameters for the compact Butler matrix block design as shown in FIG. 10, in accordance with the disclosure.
Figure 11B:
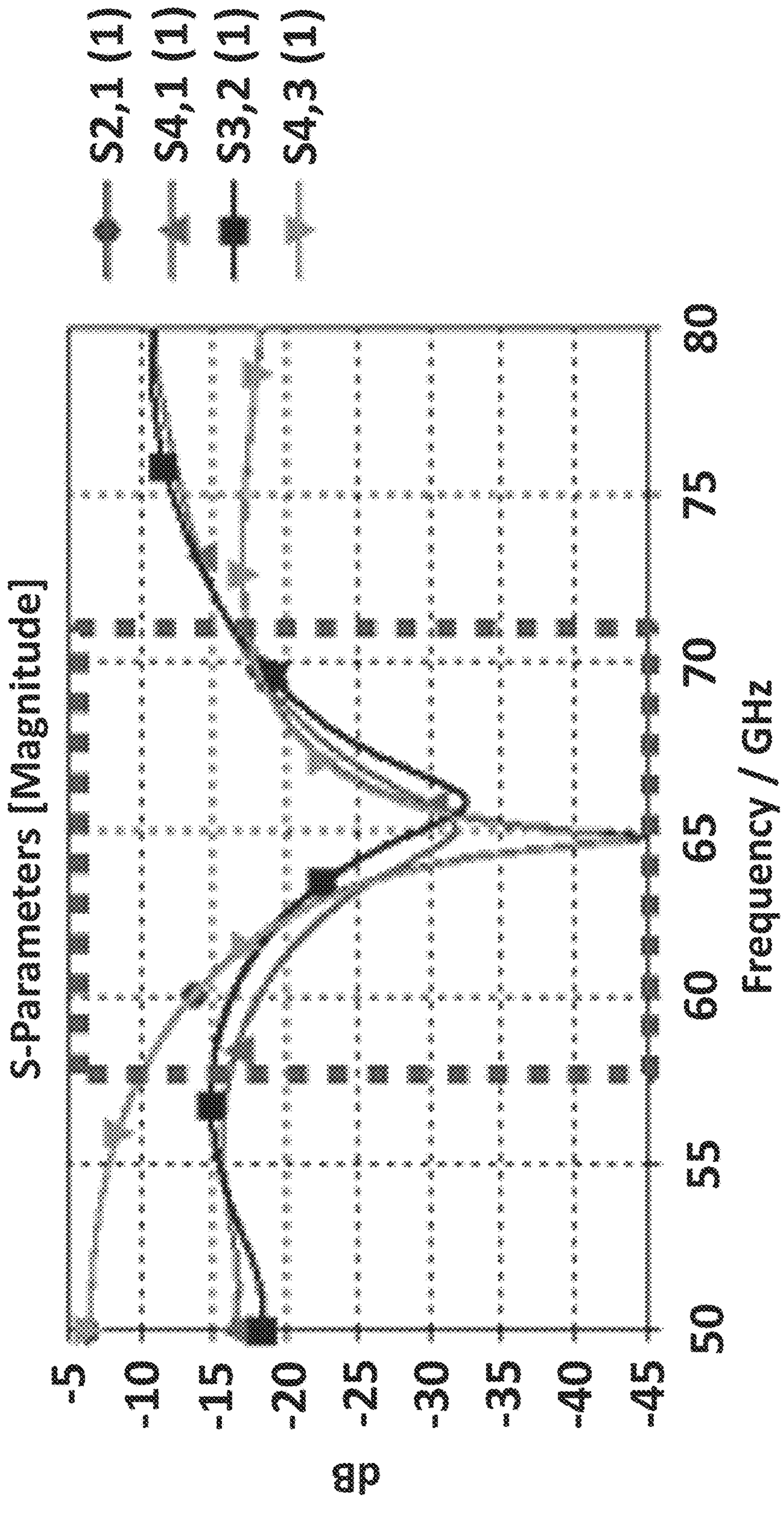
Figure 11C:
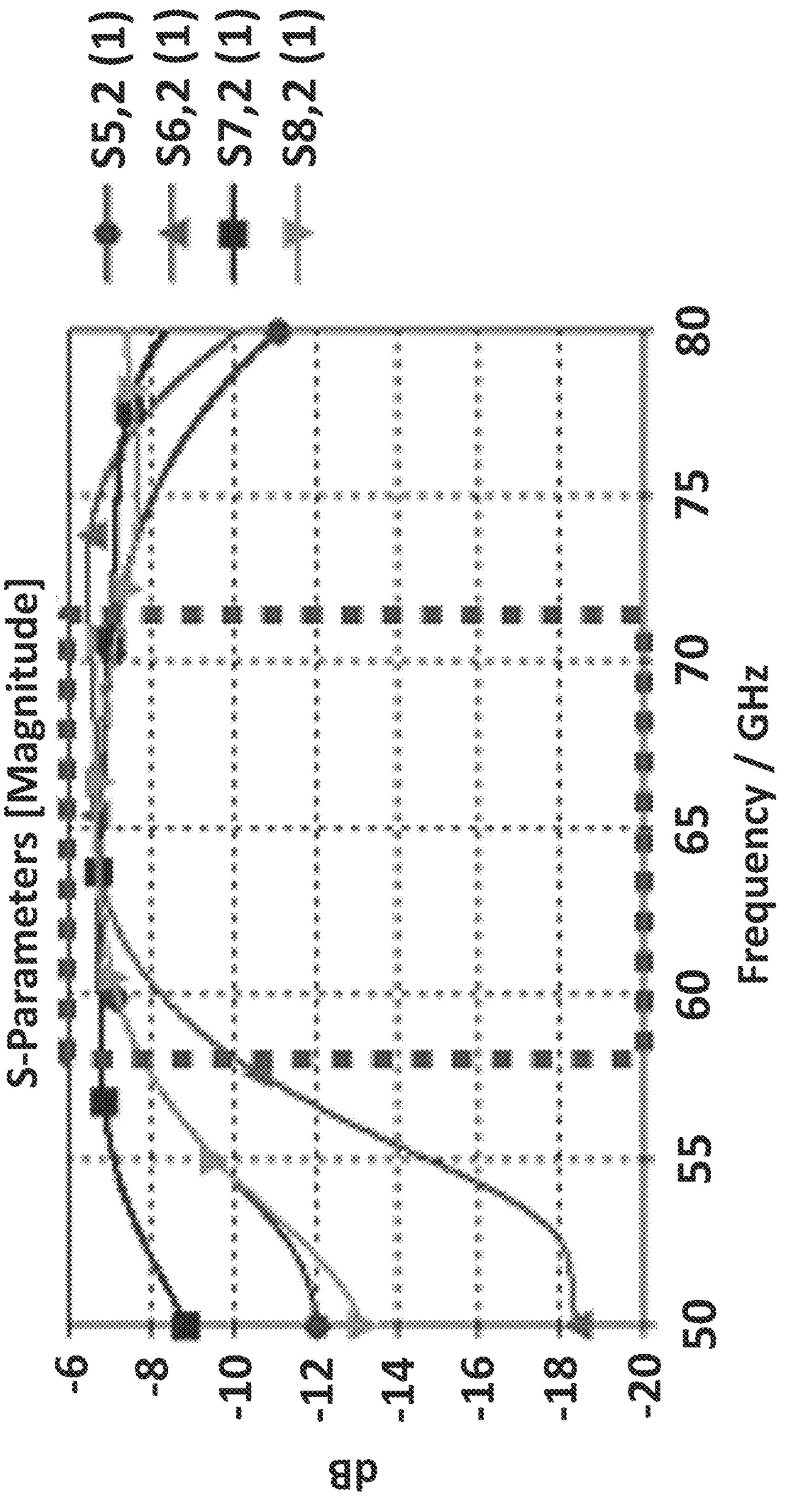
Figure 11D:
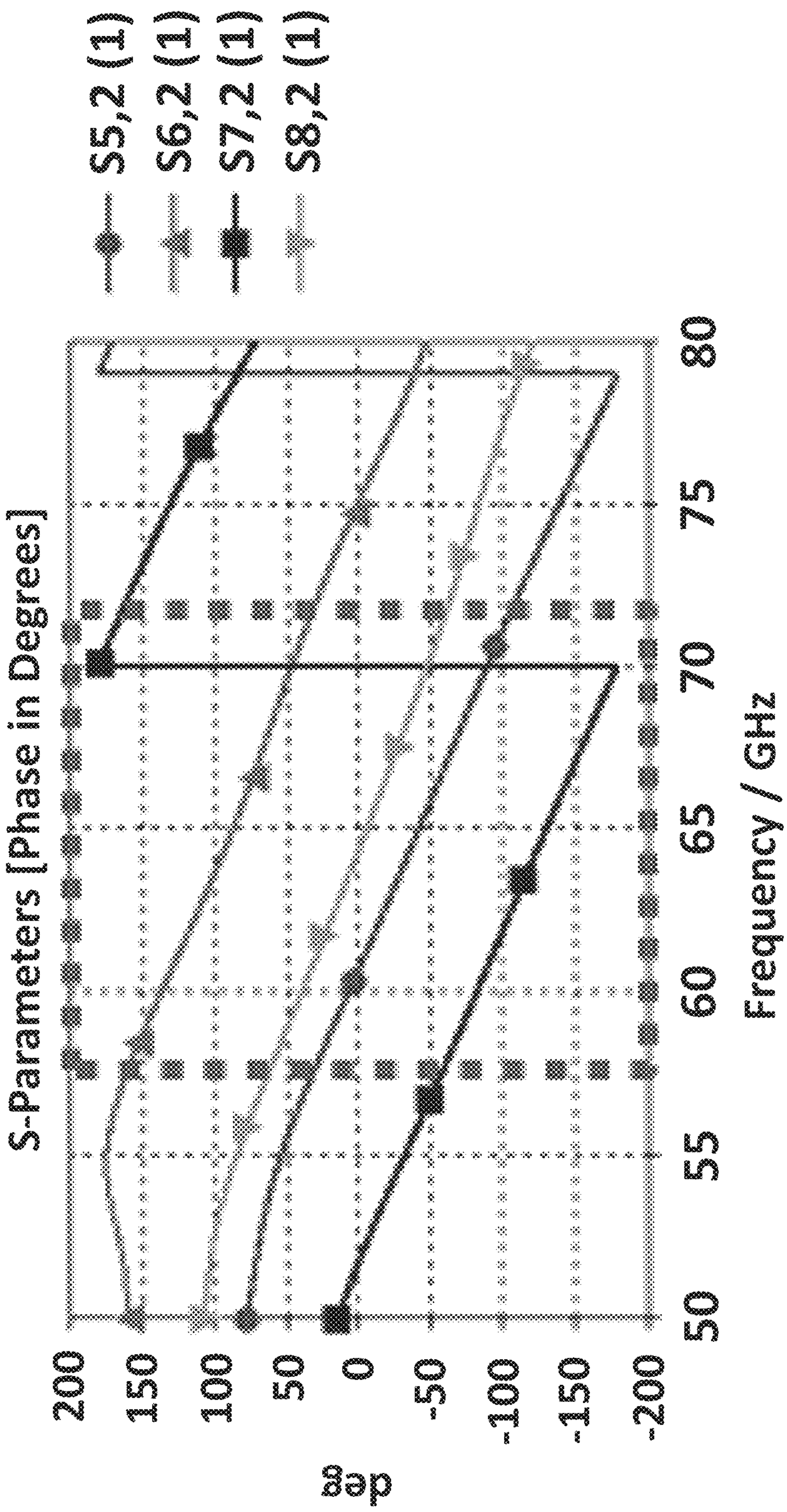

Specifically, the plot in FIG. 11A illustrates the reflection at each of the input ports P1-P4 of the Butler matrix block 1000, whereas the plot in FIG. 11B illustrates the isolation between each of the input ports P1-P4. The plot in FIG. 11C illustrates the simulated output amplitude response over an operating bandwidth of 57-71 GHz when port P2 is excited. The plot in FIG. 11D illustrates the simulated output phase response over the same operating bandwidth when port P2 is excited.

Thus, the simulation results as shown in FIGS. 11A-11D demonstrate that the single compact Butler matrix block 1000 as shown in FIG. 10, which is identical or substantially similar to the Butler matrix blocks 114A, 114B as discussed herein, can achieve a 29% 10-dB return loss bandwidth, and a 22% 15-dB isolation bandwidth, along with 6.79 dB average insertion loss and <5° phase error. It is noted that the overall effective insertion loss of the Butler matrix block 1000 is ~0.79 dB due to a 6-dB power-combing gain when all output ports P5-P8 of the Butler matrix block 1000 are coherently combined. The return-loss and isolation bandwidths can be further improved through optimization processes using any suitable algorithms, such as a Genetic algorithm, a particle swarm algorithm, a covariance matrix adaptation evolution strategy (CMA-ES), etc.

IX. Simulation Results—Beam Scanning and Radiation Performance

Figure 12A:
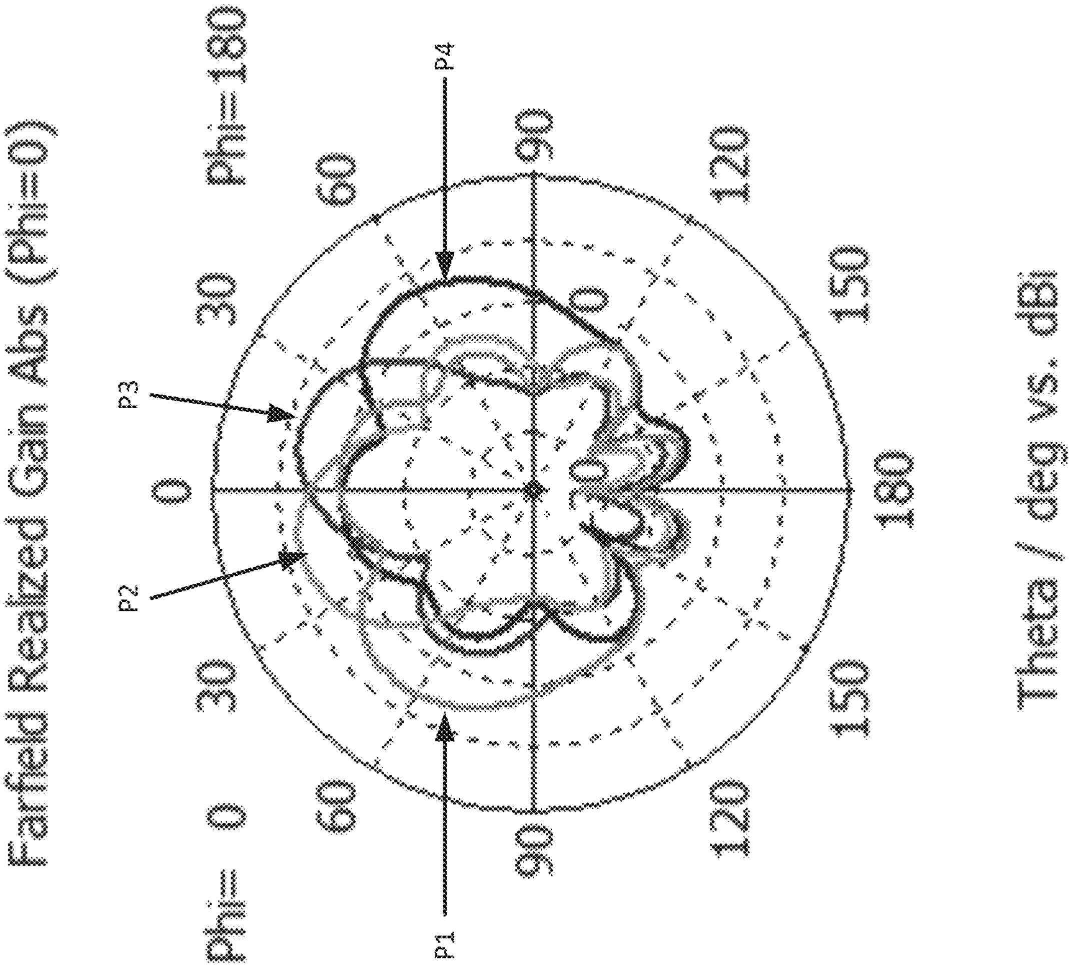
FIGS. 12A-12F illustrate simulated realized gain patterns of the dual-polarized antenna array architecture as shown in FIG. 1 at different frequencies, in accordance with the disclosure.
Figure 12B:
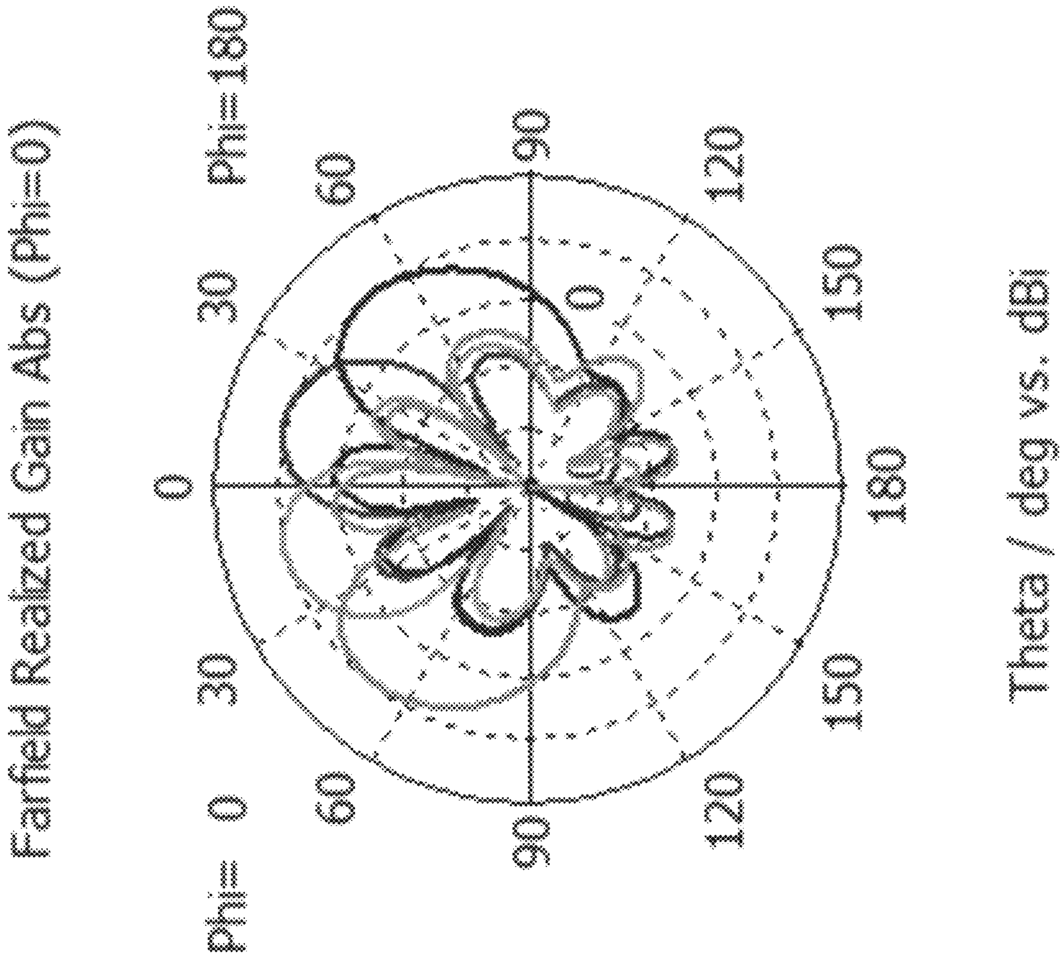
Figure 12C:
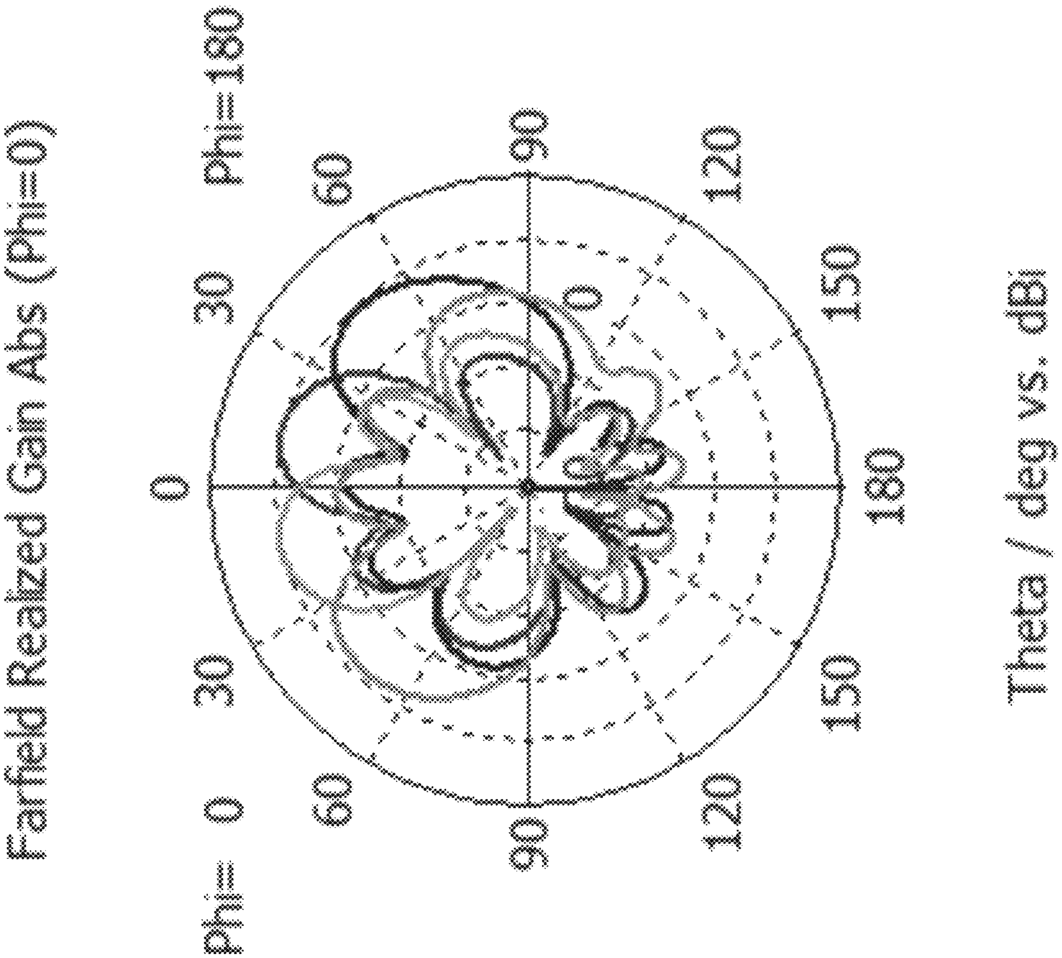
Figure 12D:
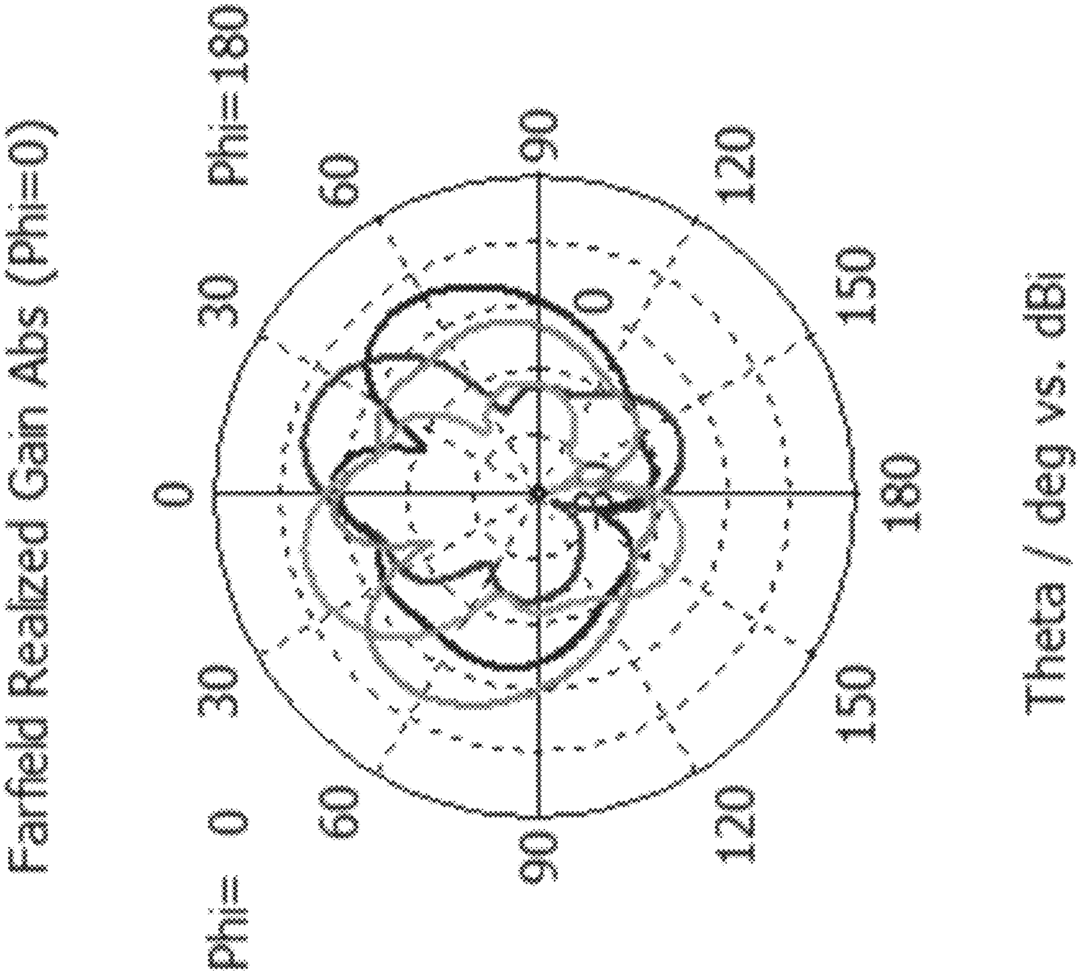
Figure 12E:
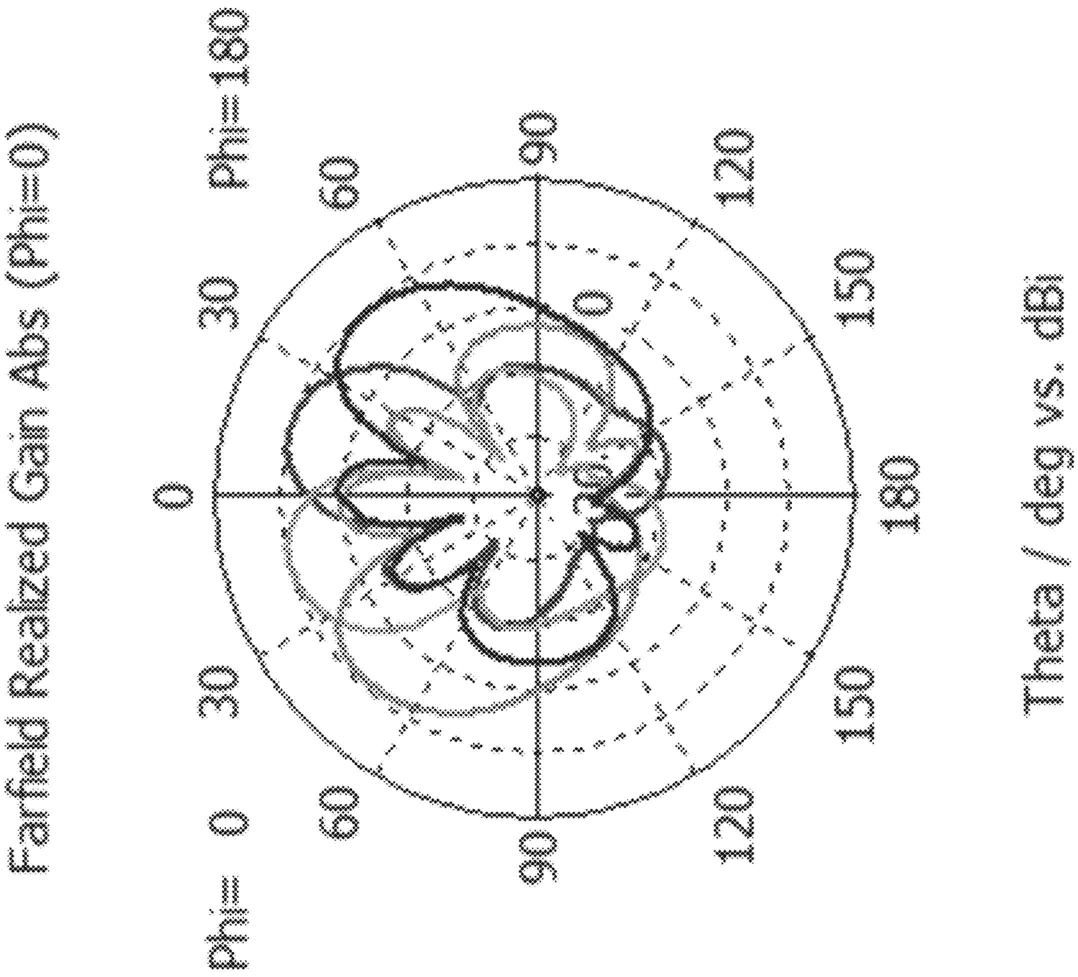
Figure 12F:
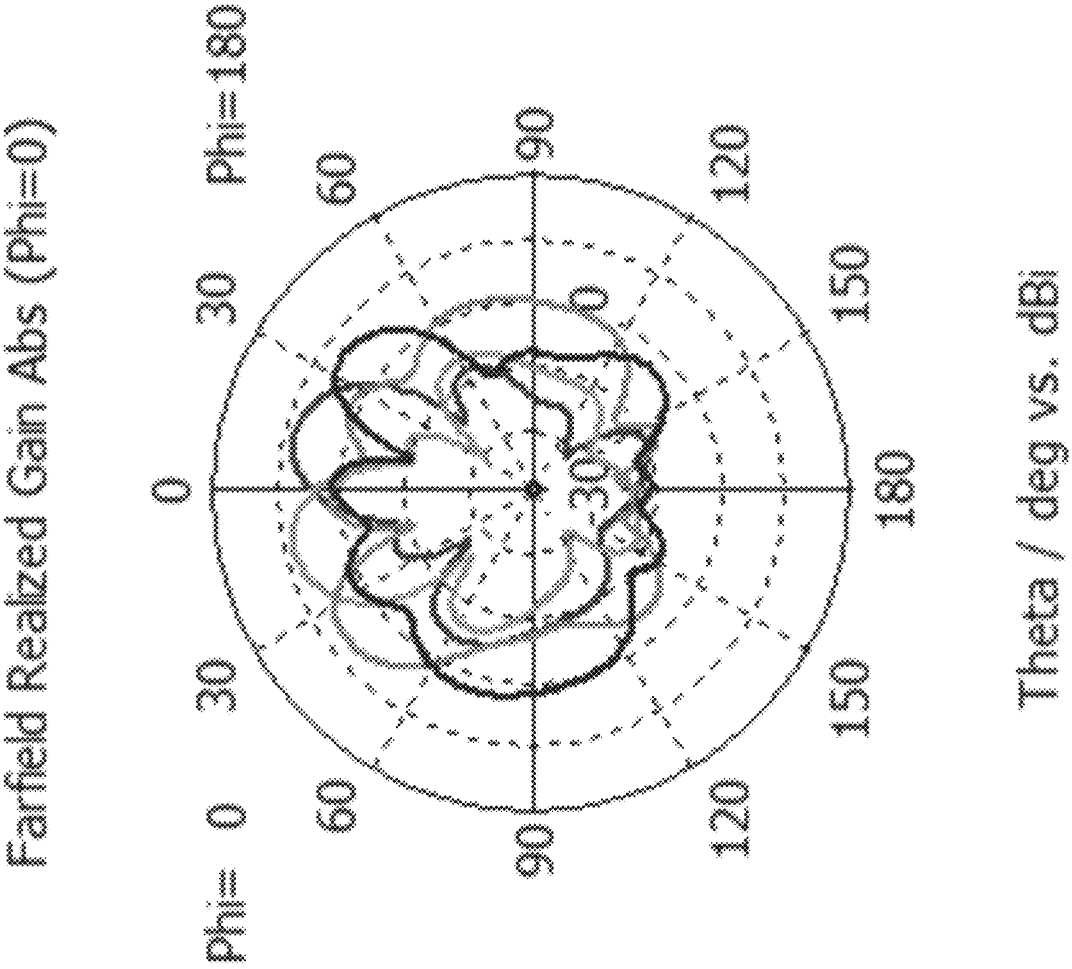

FIGS. 12A-12F illustrate simulated realized gain patterns of the dual-polarized antenna array architecture as shown in FIG. 1 at different frequencies, in accordance with the disclosure. Each of the plots as shown in FIGS. 12A-12F represents a far-field radiation pattern of the antenna array architecture 100 in the elevation plane, measured in dBi. FIGS. 12A-12C illustrate E-plane radiation pattern plots for the horizontal polarization at 57 GHz, 64 GHz, and 71 GHz, respectively. FIGS. 12D-12F illustrate H-plane radiation pattern plots for the vertical polarization at 57 GHz, 64 GHz, and 71 GHz, respectively. It is noted that the current performance of the antenna array architecture 100 may also be further improved through optimization processes.

Each different colored beam (labeled P1-P4, with a consistent representation in each of FIGS. 12A-12F) represents a beam pattern formed via the antenna array architecture 100 when a transmission signal is coupled to a different input port P1-P4 of the Butler matrix block 114A. It is also noted that all antenna elements 200.1-200.N are radiating simultaneously, even when signals are injected into a single beam-selection input port. The phase relationships between 4 outputs of the Butler matrix 114A are changed by selecting a different beam-selection input port P1-P4. Therefore, each different beam pattern as shown in FIGS. 12A-12F corresponds to an overall antenna array radiation pattern corresponding to a selection of each beam input port selection P1-P4.

X. A Comparison with Known Solutions

Table 2 and Table 3 below summarize a comparison between the conventional solutions and the solution implemented via the antenna array architecture 100 as discussed herein. Table 2 illustrates a comparison between the antenna array architecture 100 as discussed herein and conventional single Butler matrix designs. Table 3 illustrates a comparison between the antenna array architecture 100 as discussed herein and conventional dual Butler matrix designs.

TABLE 2

| Single Butler Matrix | | | | |
|---|---|---|---|---|
| Reference | Center Frequency/Bandwidth | Insertion loss/phase error | Electrical Size | Layers |
| [6] | 6 GHz/37.1% | 6 ± 3 dB/±3° | — | 2 |
| [7] | 2.56 GHz/45.3% | 6.8 ± 1 dB/±7° | 1.08λ × 1.13λ | 2 |
| [8] | 6 GHz/20.1% | 7 ± 0.4 dB/0.9° | — | 2 |

TABLE 2-continued

| Single Butler Matrix | | | | |
|---|---|---|---|---|
| Reference | Center Frequency/Bandwidth | Insertion loss/phase error | Electrical Size | Layers |
| [9] | 2.5 GHz/8% | 5.5-7.5 dB/±3° | 2.01λ × 1.13λ | 2 |
| [10] | 60 GHz/48.7% | 6.7 ± 0.6 dB/±2.5° | 5.1λ × 4.2λ | 4 |
| [11] | 2.2 GHz/— | 7.2 ± 1.3 dB/±10° | 0.86λ × 0.51λ | 3 |
| Antenna Array Architecture 100 | 65 GHz/29.8% | 6.79 ± 0.22 dB/±5° | 0.43λ × 0.47 λ | 2 |

TABLE 3

| Ref. | Center Freq. | Polarization | BW | Insertion Loss/Phase error | Electrical Size | Number of Layers | Array Conf. |
|---|---|---|---|---|---|---|---|
| [1] | 60 GHz | DCP | 16% | 10.5 dB/±29° | 5.1λ × 6.5λ | 3 | 1 by 4 patch |
| [2] | 28.7 GHz | DLP | 19% | 7.6 dB/±5° | 12λ × 7λ | 2 | 4 by 4 wideband patch |
| [3] | 3.75 GHz | DCP | 16% | 6.8 dB/— | 2.6λ × 2.6 λ | 3 | 1 × 4 patch |
| [4] | 30 GHz | DLP | 13% | 6.5 dB/5° | >2.752λ × 2.75λ | 4 | 2 × 2 |
| [5] | 3.45 GHz | DCP | 10% | — | 3.73 λ × 3.73 λ | 3 | 4 × 4 coupled patch |
| Antenna Array Architecture 100 | 65 GHz | DLP | 22% | 7.5 dB/±5° | 1.95λ × 0.82 λ | 3 | 1 × 4 coupled patch |

As can be observed from the information provided in Tables 2 and 3, the proposed dual-linearly-polarized, antenna array integrated with dual compact beamforming network (compact Butler matrix) as discussed herein may achieve beam switching in a much smaller size package and within a wider operational frequency band.

XI. Design Variations

Again, the design as shown and discussed herein with respect to the antenna array architecture 100 is provided as a non-limiting and illustrative scenario. Other variations are contemplated with respect to such a design, in accordance with the modification of the various design parameters as discussed herein. Additional design parameters are discussed in this Section with respect to FIGS. 13A-13B, 14A-14B, and 15A-15B, although the modification of the design parameters of the antenna array architecture 100 as discussed herein are not limited to these particular implementations.

Figure 13A:
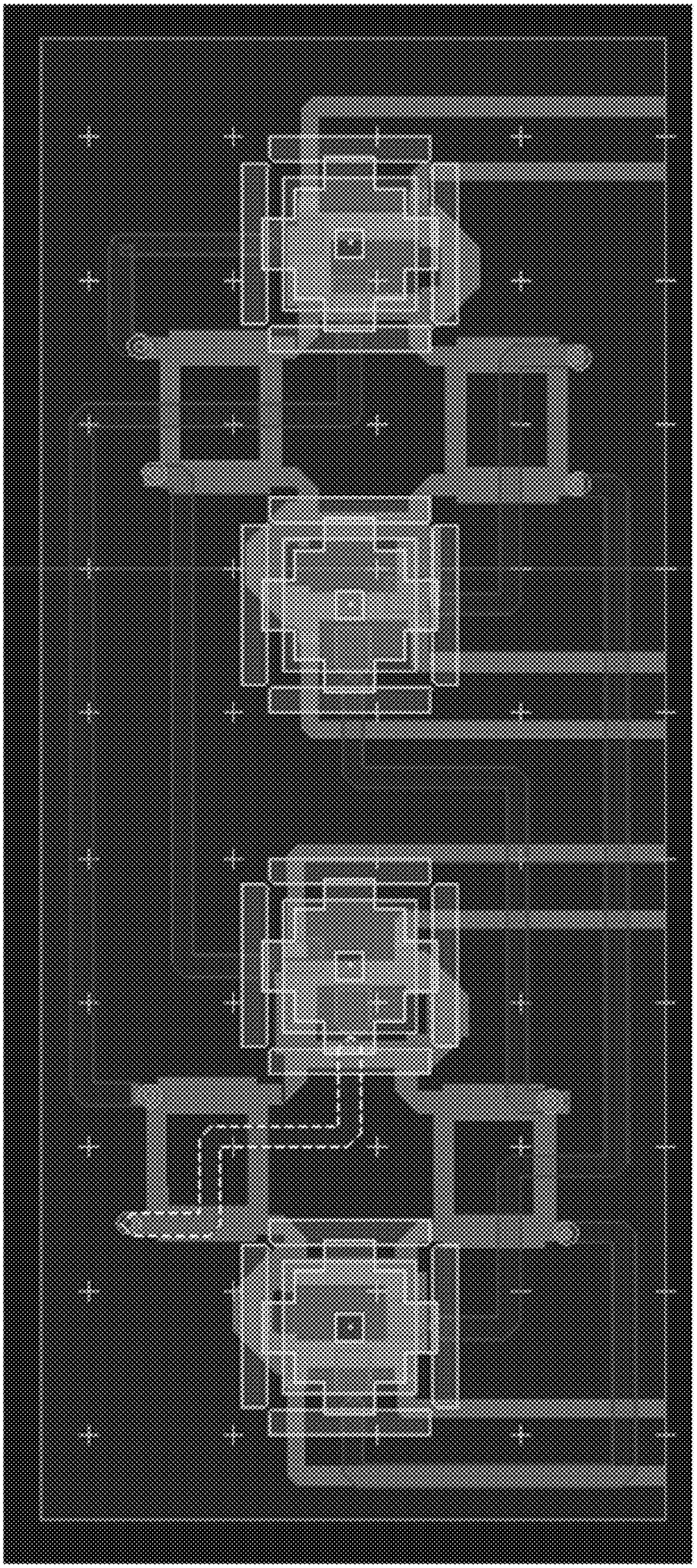
FIGS. 13A-13B illustrate a variation of the type and/or shape of couplers implemented via the Butler matrix blocks, in accordance with the disclosure.
Figure 13B:
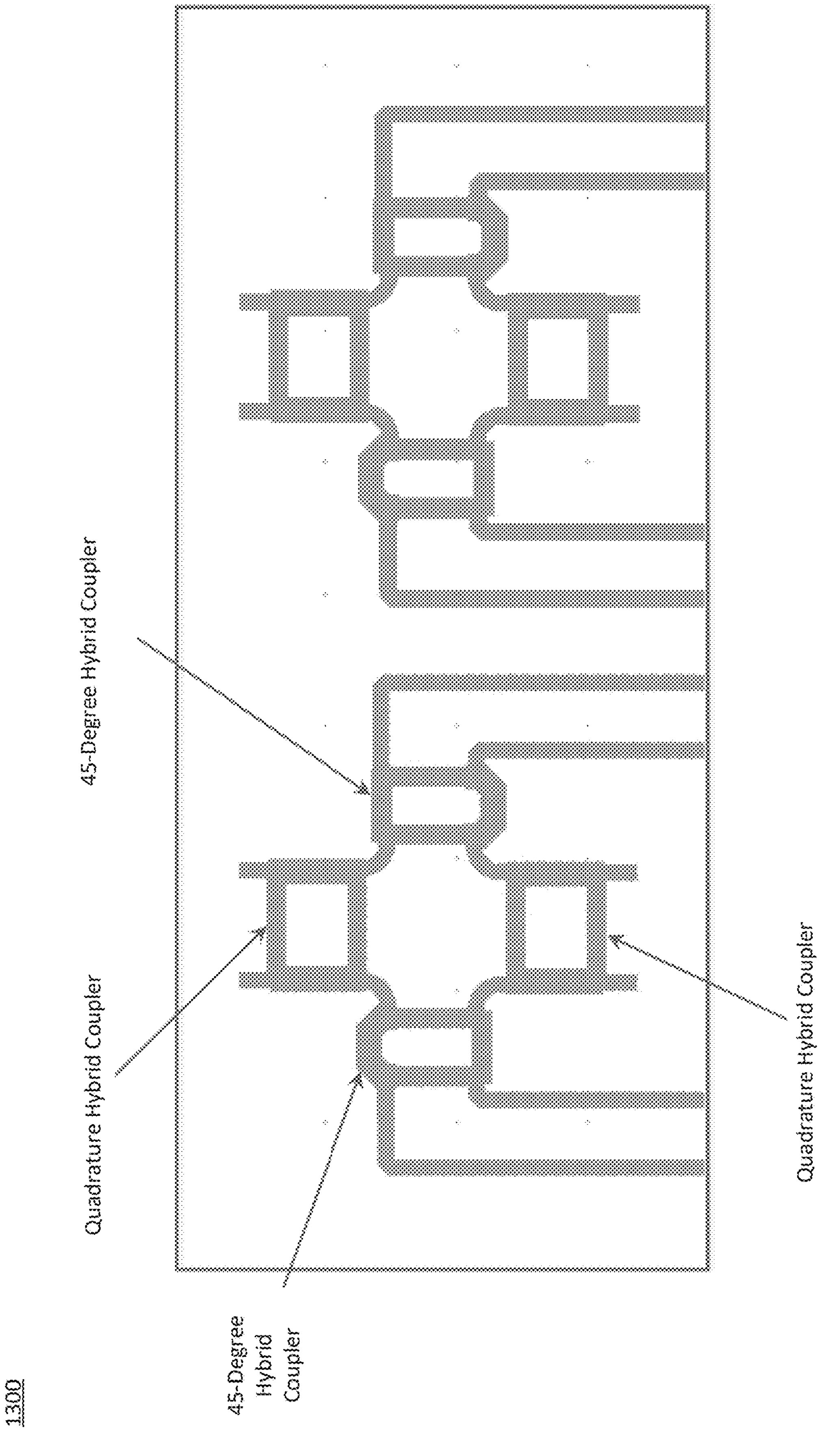

FIGS. 13A-13B illustrate a variation of the type and/or shape of couplers implemented via the Butler matrix blocks, in accordance with the disclosure. As shown in FIG. 13A, the Butler matrix blocks 114A, 114B are modified from the implementation of the 45-degree hybrid patch couplers 606A, 606B and quadrature hybrid slotted patch couplers 608A, 608B. FIG. 13A illustrates a superimposed layer stack up that includes all layers as shown in FIGS. 7A-7F, with the modified Butler matrix blocks 114A, 114B also being shown. FIG. 13B shows only the L6 layer in the illustrative and non-limiting scenario as shown in FIG. 7F, but again the Butler matrix blocks 114A, 114B may be implemented on any layer of the package substrate 102.

As shown in FIG. 13B, branch line couplers may be implemented via each Butler matrix block 114A, 114B instead of the patch couplers. The result provides two 45-degree hybrid couplers and two quadrature hybrid couplers for each Butler matrix block 114A, 114B. In other words, in this non-limiting and illustrative scenario, the 45-degree and 90-degree slotted patch couplers are replaced with conventional 45-degree and 90-degree hybrid couplers. The modification to the signal routing network in accordance with the modification of the Butler matrix blocks 114A, 114B is illustrated in FIG. 13A.

Figure 14A:
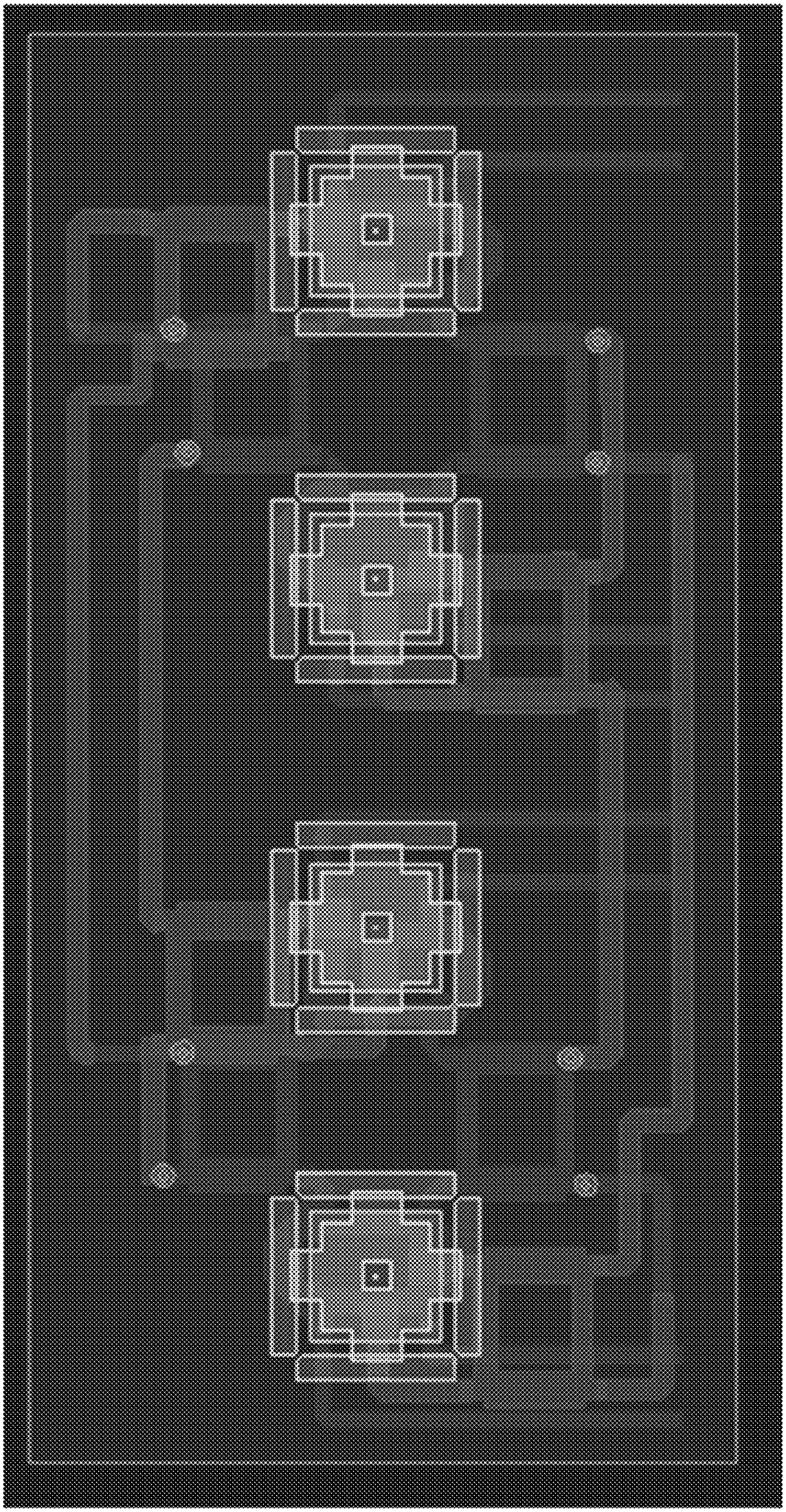
FIGS. 14A-14B illustrate a variation in which hybrid couplers are added to the signal routing network to support dual circular polarization, in accordance with the disclosure.
Figure 14B:
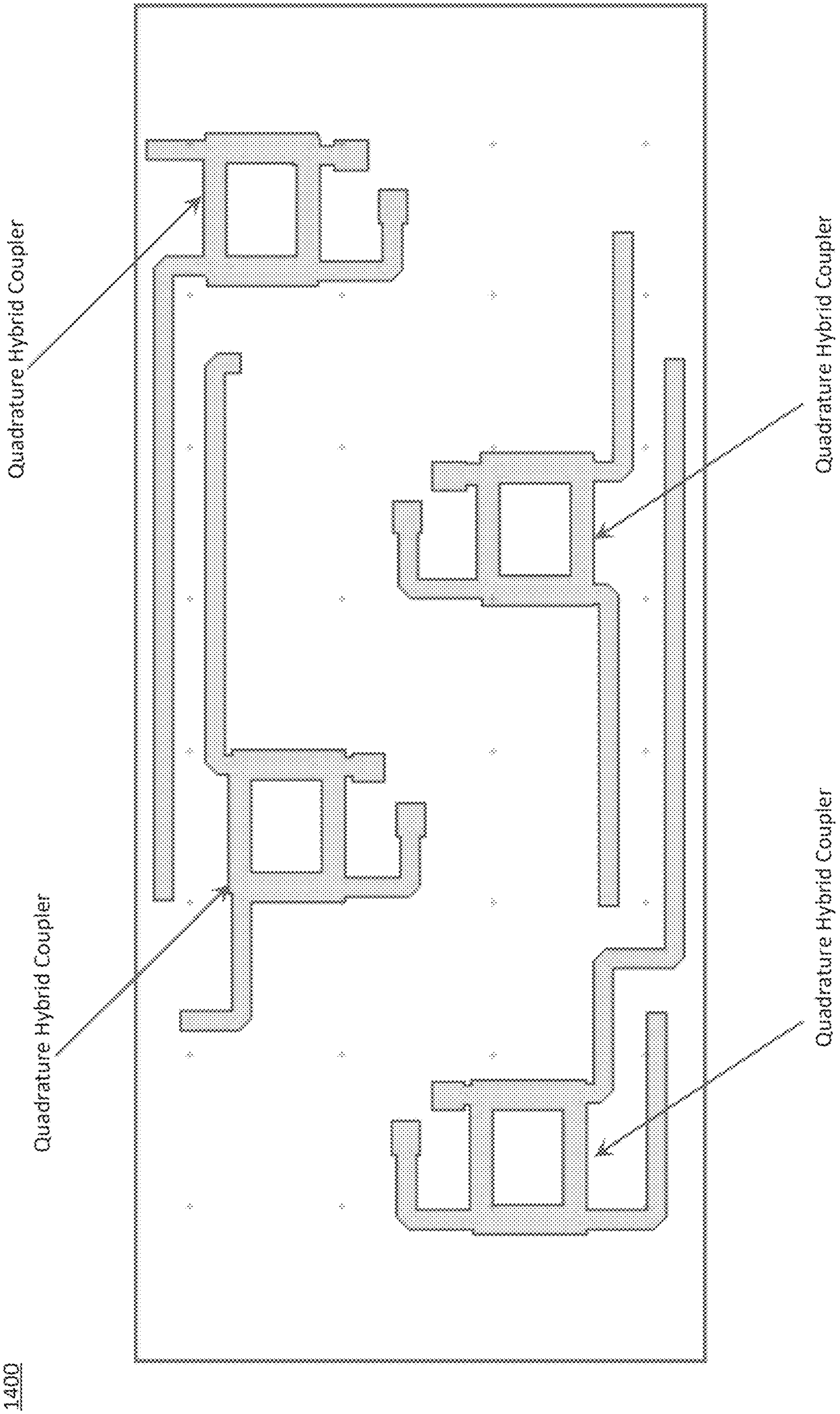

FIGS. 14A-14B illustrate a variation in which hybrid couplers are added to the signal routing network to support dual circular polarization, in accordance with the disclosure. As shown in FIG. 14A, the signal routing network is modified from the implementation as shown in FIG. 7D. FIG. 14A illustrates a superimposed layer stack up that includes all layers as shown in FIGS. 7A-7F, with the modified signal routing network also being shown. FIG. 14B shows only the L4 layer in the illustrative and non-limiting scenario as shown in FIG. 7D, but again the signal routing network may be implemented on any layer of the package substrate 102.

As shown in FIG. 14B, the signal routing network disposed on layer 4 (L4) of the package substrate 102 may be modified to introduce a quadrature hybrid coupler for the antenna feeds at each one of the antenna elements 200.1-200.4. Doing so enables support for dual circular polarization compared to the dual linear polarization provided by the dual Butler matrix blocks 114A, 114B as shown in FIG. 7F and the signal routing network as shown in FIG. 7D.

Figure 15A:
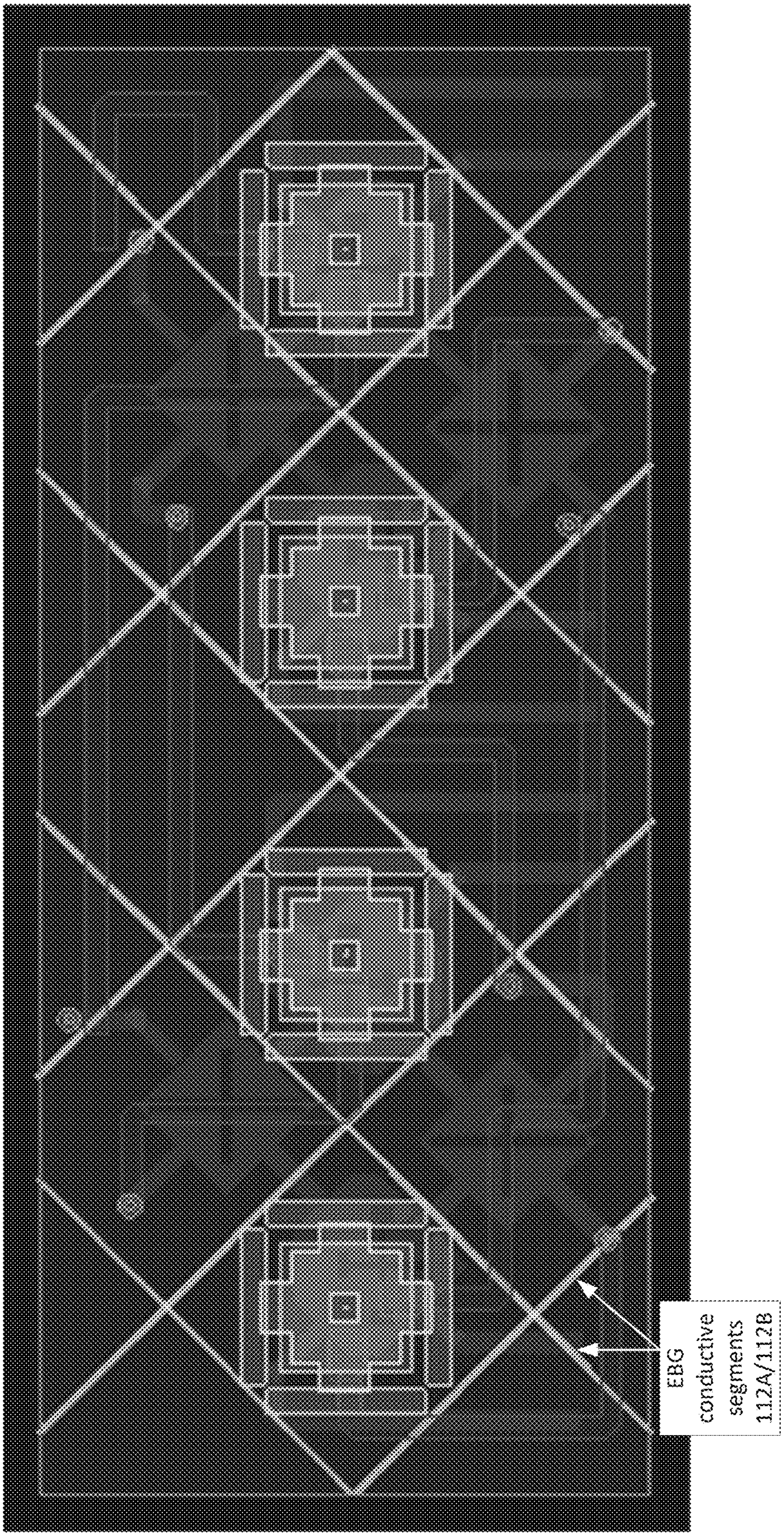
FIGS. 15A-15B illustrate a variation in which the high-order EBG structure is rotated by 45 degrees, in accordance with the disclosure.
Figure 15B:
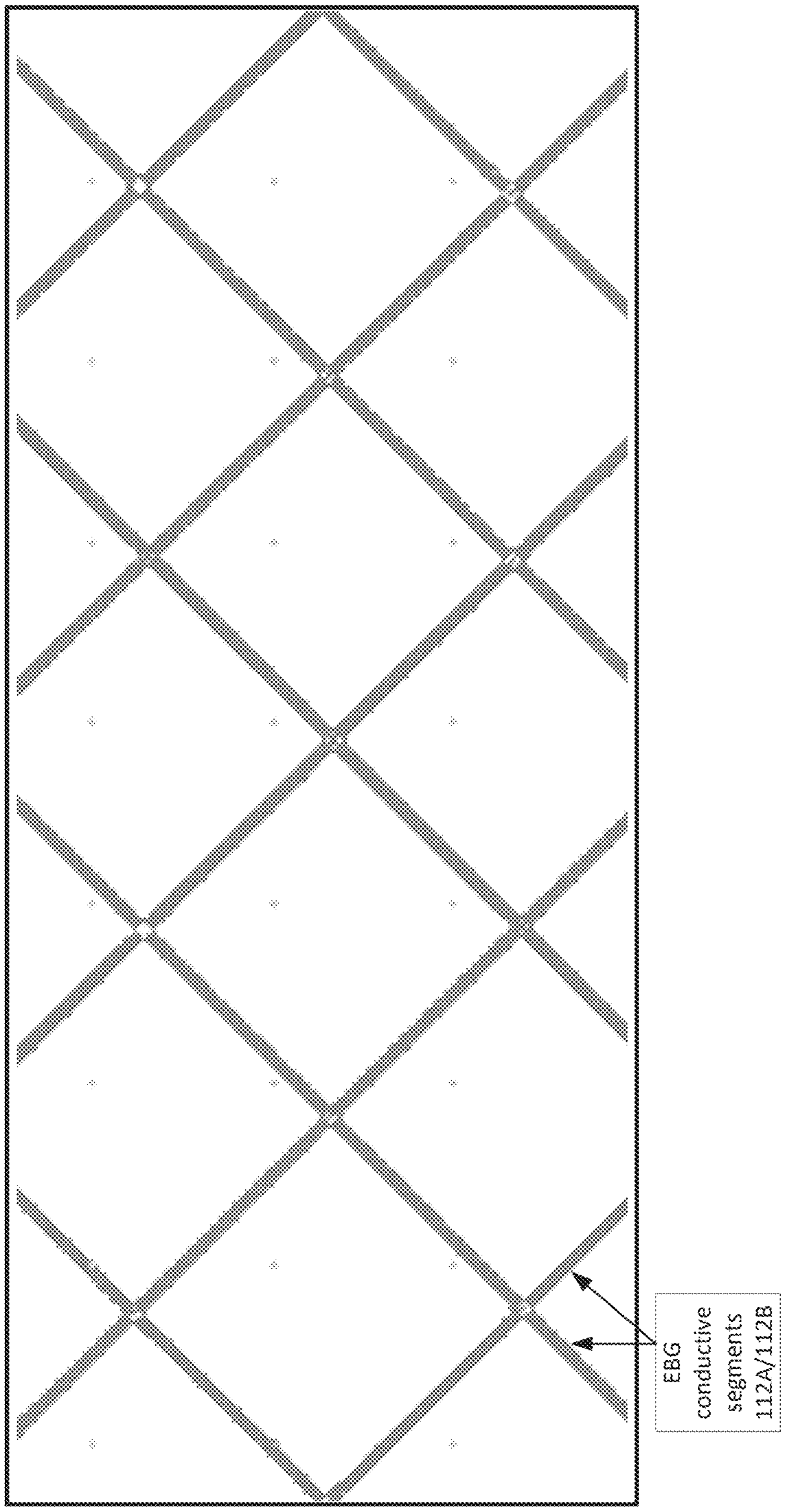

FIGS. 15A-15B illustrate a variation in which the high-order EBG structure is rotated by 45 degrees, in accordance with the disclosure. That is, and as noted above, the package substrate 102 has a length and width dimension that are respectively aligned with two orthogonal axes, as shown in FIG. 1 and FIGS. 2A-2C. FIGS. 7B and 7C illustrate the EBG structure being aligned with the two axes of the package substrate 102. That is, the length dimension of the EBG structure for each pattern of conductive segments 112A, 112B on each of the L2 and L3 layers runs parallel with the length dimension of the package substrate 102, as well as parallel with the length dimension of the antenna array of antenna elements 200.1-200.4.

However, and as shown in FIGS. 15A-15B, each pattern of conductive segments 112A, 112B may alternatively be rotated with respect to the x-y axes by any suitable angle, thereby reorienting the grid of each unit cell corresponding to each antenna element 200.1-200.4. In FIGS. 15A-15B, the EBG conductive segments 112A, 112B are modified from the implementation as shown in FIGS. 7B and 7C. FIG. 15A illustrates a superimposed layer stack up that includes all layers as shown in FIGS. 7A-7F, with the modified EBG conductive segments 112A, 112B also being shown. FIG. 15B shows only the L2 and L3 layers in the illustrative and non-limiting scenario as shown in FIGS. 7B and 7C, but again the EBG conductive segments 112A, 112B may be implemented on any layer of the package substrate 102.

Thus, in the non-limiting and illustrative scenario as shown in FIGS. 15A-15B, the EBG structure (i.e. the EBG conductive segments 112A, 112B) is rotated 45 degrees with respect to the two orthogonal axes that are aligned with the package substrate 102, which are the x-y axes in this scenario. As a result, the respective rectangular shape of each pattern of conductive segments 112A, 112B of each EBG unit cell is also rotated by 45 degrees. In this way, the high-order EBG structure 112 may be formed in a diamond shape, rather than the original rectangular shape as shown in FIGS. 7B and 7C. Additionally or alternatively, each of the antenna elements 200.1-200.4 may likewise be oriented in a different manner by rotating each of the antenna elements 200 by any suitable number of degrees, such as 45 degrees. The rotated antenna elements 200.1-200.4 may be aligned with the EBG conductive segments 112A, 112B or, as shown in FIG. 15A, rotated with respect to the EBG conductive segments 112A, 112B.

Figure 16:
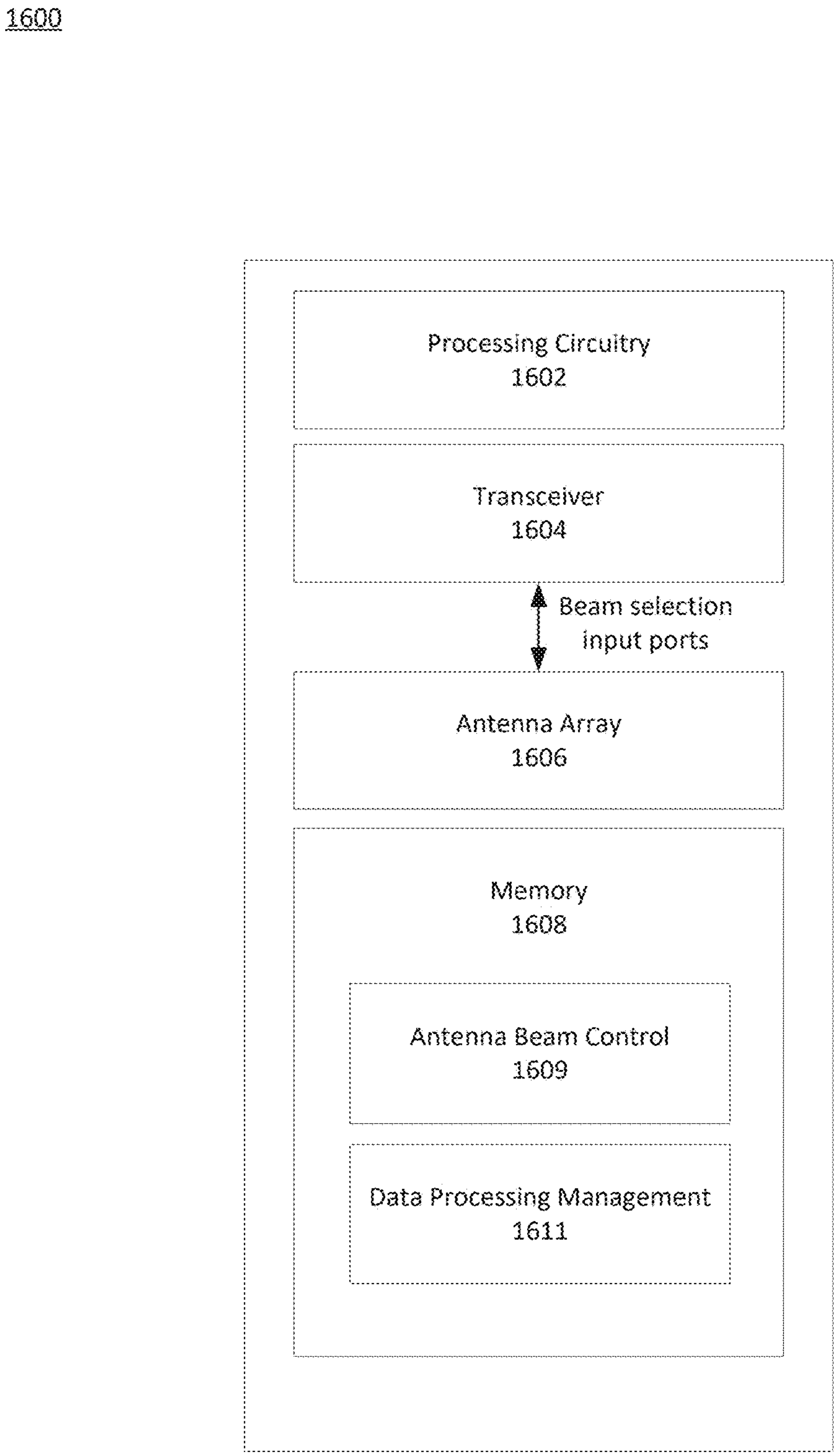
FIG. 16 illustrates a device, in accordance with the disclosure.

FIG. 16 illustrates a device, in accordance with the disclosure. The components shown in FIG. 16 are provided for ease of explanation, and the device 1600 may implement additional, less, or alternative components as those shown in FIG. 16. The device 1600 may be identified with one or more devices that implement the antenna array architecture 100 as discussed herein. The device 1600 may be implemented as the entirety of or a portion of any suitable type of system and/or platform that implements the antenna array architecture 100. In the non-limiting and illustrative scenario as shown in FIG. 16, the device 1600 may be a standalone device that implements the antenna array architecture 100, such as a wireless communications base station, wireless device, a user equipment (UE) or other suitable device configured to perform wireless communications such as a mobile phone, a laptop computer, a tablet, etc. However, in other illustrative scenarios, the device 1600 may be identified with a system on a chip (SoC) or other suitable integrated circuit, and may be coupled to and/or integrated as part of the antenna array architecture 100. In any event, and as further discussed herein, the device 1600 may include one or more components configured to transmit and receive radio signals via the antenna array architecture 100.

To do so, the device 1600 may include processing circuitry 1602, a transceiver 1604, and a memory 1608. When incorporated as part of the device 1600, which may be the case for implementations as a laptop, the device 1600 also comprises an antenna array 1606, which may be identified with the antenna array architecture 100 as discussed herein. Otherwise, the antenna array 1606 may be identified with the antenna array architecture 100 as discussed herein, but separately from the device 1600 (not shown).

The processing circuitry 1602 may be configured as any suitable number and/or type of processing circuitry and/or computer processors, which may function to control the device 1600 and/or other components of the device 1600. The processing circuitry 1602 may be identified with one or more processors (or suitable portions thereof) implemented by the device 1600 or a host system. The processing circuitry 1602 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 1602 may be configured to carry out instructions to perform arithmetical, logical, and/or input/output (I/O) operations, and/or to control the operation of one or more components of device 1600 to perform various functions as described herein. The processing circuitry 1602 may include one or more microprocessor cores, memory registers, buffers, clocks, etc., and may generate electronic control signals associated with the components of the device 1600 to control and/or modify the operation of these components. The processing circuitry 1602 may communicate with and/or control functions associated with the transceiver 1604, the antenna array 1606, and/or the memory 1608.

The transceiver 1604 may include any suitable type of components to facilitate the transmission and option reception of wireless signals, including components associated with known transceiver, transmitter, and/or receiver operation, configurations, and implementations. The transceiver 1606 may include one or more RF transceiver "chains," each comprising separate components, or alternatively the transceiver 1604 may comprise a single RF chain and/or a multiple RF chain configuration. The transceiver 1604 may comprise any suitable number of transmitters, receivers, or combinations of these that may be integrated into a single transceiver or as multiple transceivers or transceiver modules. The transceiver 1604 may include components typically identified with an RF front end and include ports, power amplifiers (PAs), RF filters, mixers, local oscillators (LOs), low noise amplifiers (LNAs), upconverters, downconverters, channel tuners, analog-to-digital converters (ADCs), digital to analog converters (DACs), intermediate frequency (IF) amplifiers and/or filters, modulators, demodulators, baseband processors, etc. Thus, the transceiver 1604 may be configured as any suitable number and/or type of components configured to facilitate receiving and/or transmitting data and/or signals in accordance with any suitable number and/or type of wireless communication protocols, and may do so in accordance with the antenna array 1606.

Again, the antenna array 1606 may be identified with the antenna array architecture 100 as discussed herein. The antenna array 1606 may have any suitable number of beam selection input ports, which may be identified with the beam selection input ports 602 of the Butler matrix blocks 114A, 114B as discussed herein. The transceiver 1604 may be coupled to the antenna array 1606 via these beam selection input ports to transmit and receive wireless signals in this manner.

The memory 1608 stores data and/or instructions such that, when the instructions are executed by the processing circuitry 1602, cause the device 1600 to perform various functions as described herein with respect to the antenna array 1606, such as the transmission and reception of wireless data signals via one or more selectable beams and/or radiation patterns. The memory 1608 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 1608 may be non-removable, removable, or a combination of both. The memory 1608 may be implemented as a non-transitory computer readable medium storing one or more executable instructions such as, for example, logic, algorithms, code, etc.

As further discussed below, the instructions, logic, code, etc., stored in the memory 1608 are represented by the various modules as shown, which may enable the functionality disclosed herein to be functionally realized. Alternatively, the modules as shown in FIG. 16 that are associated with the memory 1608 may include instructions and/or code to facilitate control and/or monitor the operation of hardware components implemented via the device 1600. In other words, the modules shown in FIG. 16 are provided for ease of explanation regarding the functional association between hardware and software components. Thus, the processing circuitry 1602 may execute the instructions stored in these respective modules in conjunction with one or more hardware components to perform the various functions as discussed herein.

The executable instructions stored in the antenna beam control module 1609 may facilitate, in conjunction with execution via the processing circuitry 1602, the device 1600 selectively coupling power to and/or receiving wireless signals from any combination of the beam section input ports. In this way, the processing circuitry 1602 may control the beam direction and beam pattern of the antenna array 1606.

The executable instructions stored in the data processing management module 1611 may facilitate, in conjunction with execution via the processing circuitry 1602, the device 1600 receiving wireless signals via the antenna array 1606, and decoding the wireless signals to extract data therefrom. Additionally or alternatively, the executable instructions stored in the data processing management module 1611 may facilitate, in conjunction with execution via the processing circuitry 1602, the device 1600 encoding (such as via modulation) data onto wireless signals to be transmitted via the antenna array 1606. The executable instructions stored in the data processing management module 1611 thus facilitate, in conjunction with execution via the processing circuitry 1602, the device 1600 transmitting and receiving wireless signals via the antenna array 1606 in accordance with any suitable type and/or number of communication protocols, as discussed herein.

Figure 17:
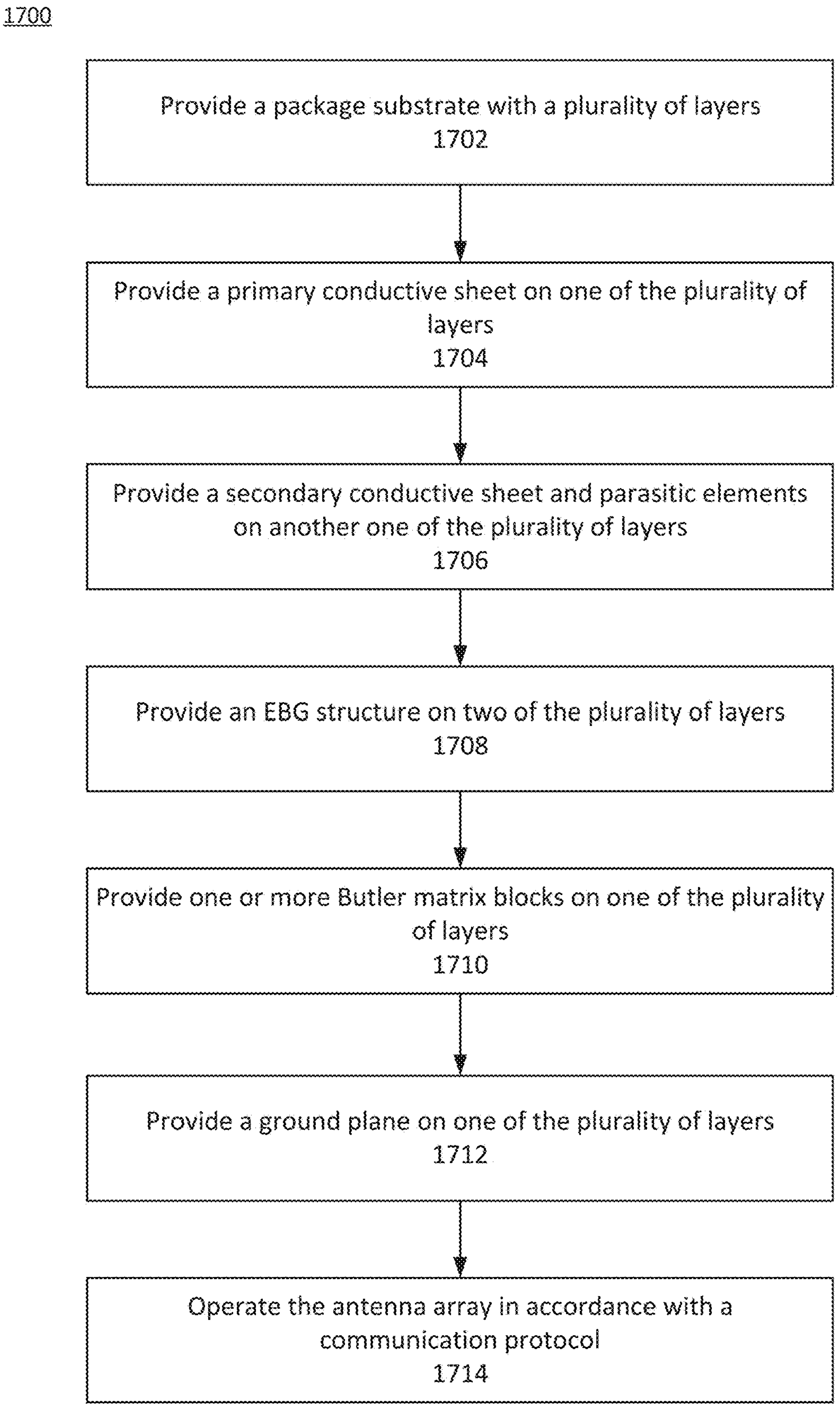
FIG. 17 illustrates a process flow, in accordance with the disclosure.

FIG. 17 illustrates a process flow. With reference to FIG. 17, the process flow 1700 may be executed in any suitable manner to fabricate and operate the antenna array architecture 100 as discussed herein. The fabrication steps 1702-1712 may be associated with one or more automated processes, and may implement known manufacturing techniques. The operation step 1714 may be executed in accordance with any suitable type of communication device that is coupled to and/or controls the operation of the antenna array architecture 100 once fabricated. The flow 1700 may include alternate or additional steps that are not shown in FIG. 17 for purposes of brevity, and may be performed in a different order than the steps shown in FIG. 17.

Flow 1700 may begin by providing (block 1702) a package substrate having a plurality of layers. This package substrate may be identified with the package substrate 102 as discussed herein, and may include any suitable number of layers implemented as any suitable type of dielectric material, which may be bonded to a respective conductive layer from which the various layered components may be etched, deposited, or otherwise formed.

Flow 1700 may include providing (block 1704) a primary conductive sheet on one of the plurality of layers. This primary conductive sheet may be identified with the primary conductive sheet 104 as discussed herein, and the provided (block 1704) layer may thus be identified with that shown in FIG. 7C as discussed herein.

Flow 1700 may include providing (block 1706) a secondary conductive sheet and parasitic elements on one of the plurality of layers. This secondary conductive sheet and parasitic elements may be identified with the secondary conductive sheet 108 and parasitic elements 110 as discussed herein, and the provided (block 1706) layer may thus be identified with that shown in FIG. 7A as discussed herein.

Flow 1700 may include providing (block 1708) an EBG structure on one of the plurality of layers. This EBG structure may be identified with the HO EBG structure 112 and the accompanying conductive segments 112A, 112B as discussed herein, and the provided (block 1708) layer may thus be identified with that shown in FIGS. 7B and 7C as discussed herein.

Flow 1700 may include providing (block 1710) one or more Butler matrix blocks on one of the plurality of layers. These Butler matrix blocks may be identified with the Butler matrix blocks 114A, 114B as discussed herein, and the provided (block 1710) layer may thus be identified with that shown in FIG. 7F as discussed herein.

Flow 1700 may include providing (block 1712) a ground plane. This ground plane may be identified with the ground plane as discussed herein, and the provided (block 1712) layer may thus be identified with that shown in FIG. 7E as discussed herein.

Flow 1700 may include operating (block 1714) the fabricated (blocks 1702-1712) in accordance with any suitable communication protocol. Although not limited to this particular implementation, this may include operating the antenna array architecture 102 in accordance with the 57-71 GHz wideband operation for the emerging 60 GHz Wi-Fi solutions.

General Operation of an Antenna Element

An antenna element of an antenna array is provided. The antenna element comprises a package substrate comprising a plurality of layers; a primary conductive sheet disposed on a first layer of the plurality of layers and being coupled to an antenna feed; a secondary conductive sheet disposed on a second layer of the plurality of layers; and an electromagnetic band gap (EBG) unit cell comprising a first and a second pattern of conductive elements respectively disposed on two different layers of the package substrate. The EBG unit cell has dimensions that are larger in size than dimensions of each one of the primary and the secondary conductive sheets. Furthermore, the antenna element comprises a plurality of parasitic elements comprising further conductive sheets disposed about the secondary conductive sheet, the EBG unit cell has dimensions that are larger in size than dimensions of the secondary conductive and the further conductive sheets. In addition or in alternative to and in any combination with the optional features previously explained in this paragraph, the first pattern of conductive elements of the EBG unit cell are disposed on a further layer of the plurality of layers that is disposed between the first and the second layers. In addition or in alternative to and in any combination with the optional features previously explained in this paragraph, the second pattern of conductive elements of the EBG unit cell are disposed on the first layer with the primary conductive sheet. In addition or in alternative to and in any combination with the optional features previously explained in this paragraph, each one of the first pattern and the second pattern of conductive elements of the EBG unit cell comprises a respective rectangular shape. In addition or in alternative to and in any combination with the optional features previously explained in this paragraph, the package substrate has a length and width dimension that are respectively aligned with two orthogonal axes, and the respective rectangular shape of each one of the first pattern and the second pattern of conductive elements of the EBG unit cell are rotated 45 degrees with respect to the two orthogonal axes. In addition or in alternative to and in any combination with the optional features previously explained in this paragraph, the antenna feed comprises a set of antenna feeds configured to enable the primary conductive sheet to operate in accordance with a dual-polarized configuration. In addition or in alternative to and in any combination with the optional features previously explained in this paragraph, the secondary conductive sheet is disposed on the second layer at a first side of the primary conductive sheet, and further comprising: a Butler matrix block disposed on a third layer of the plurality of layers at a second side of the primary conductive sheet that is opposite to the first side, the Butler matrix block comprises an output port that is coupled to the antenna feed via a portion of a feed network. In addition or in alternative to and in any combination with the optional features previously explained in this paragraph, the antenna element further comprises a first and a second Butler matrix block disposed on a third layer of the plurality of layers. In addition or in alternative to and in any combination with the optional features previously explained in this paragraph, the antenna element is from among a plurality of antenna elements constituting the antenna array, the antenna feed for each one of the plurality of antenna elements comprises a respective horizontal and vertical polarization antenna feed, the first Butler matrix block is configured to couple each one of the horizontal polarization antenna feeds for each one of the plurality of antenna elements to a respective horizontal polarization output port, and the second Butler matrix block is configured to couple each one of the vertical polarization antenna feeds for each one of the plurality of antenna elements to a respective vertical polarization output port. In addition or in alternative to and in any combination with the optional features previously explained in this paragraph, an electrical length between each one of the horizontal polarization antenna feeds to a respective horizontal polarization output port are equal to one another, and an electrical length between each one of the vertical polarization antenna feeds to a respective vertical polarization output port are equal to one another. In addition or in alternative to and in any combination with the optional features previously explained in this paragraph, each one of the horizontal polarization antenna feeds is coupled to a respective horizontal polarization output port of the first Butler matrix block via a first set of conductive traces, each one of the vertical polarization antenna feeds is coupled to a respective vertical polarization output port of the second Butler matrix block via a second set of conductive traces, and the first and the second set of conductive traces are (i) disposed on a fourth layer of the plurality of layers, and (ii) routed around the first and the second conductive sheets. In addition or in alternative to and in any combination with the optional features previously explained in this paragraph, the Butler matrix block does not include a crossover. In addition or in alternative to and in any combination with the optional features previously explained in this paragraph, the Butler matrix block comprises a plurality of quadrature hybrid slotted patch couplers, and a plurality of 45-degree hybrid patch couplers. In addition or in alternative to and in any combination with the optional features previously explained in this paragraph, the Butler matrix block forms a diamond shape.

General Operation of an Antenna Array

An antenna array is provided. The antenna array comprises a package substrate comprising a plurality of layers; a plurality of antenna elements, each one of the plurality of antenna elements comprising: a primary conductive sheet disposed on a first layer of the plurality of layers and being coupled to an antenna feed; and a secondary conductive sheet disposed on a second layer of the plurality of layers at a first side of the primary conductive sheet; and a plurality of Butler matrix blocks disposed on a third layer of the plurality of layers at a second side of the primary conductive sheet that is opposite to the first side, each one of the plurality of Butler matrix blocks comprises a plurality of beam-selection input ports and a plurality of output ports, and each one of the plurality of output ports is coupled to a respective antenna feed of each respective one of the plurality of antenna elements. Furthermore, an electrical length of conductive traces formed between each respective one of a first plurality of output ports identified with a first one of the plurality of Butler matrix blocks are equal to one another, and an electrical length of conductive traces formed between each respective one of a second plurality of output ports identified with a second one of the plurality of Butler matrix blocks are equal to one another. In addition or in alternative to and in any combination with the optional features previously explained in this paragraph, each one of the plurality of output ports identified with the plurality of Butler matrix blocks is coupled to a respective antenna feed of each respective one of the plurality of antenna elements via a set of conductive traces, and the set of conductive traces are (i) disposed on a fourth layer of the plurality of layers, and (ii) routed around the first and the second conductive sheets of each respective one of the plurality of antenna elements. In addition or in alternative to and in any combination with the optional features previously explained in this paragraph, the antenna feed of each respective one of the plurality of antenna elements comprises a set of antenna feeds configured to enable each one of the plurality of antenna elements to operate in accordance with a dual-polarized configuration. In addition or in alternative to and in any combination with the optional features previously explained in this paragraph, the antenna feed of each one of the plurality of antenna elements comprises a respective horizontal and a vertical polarization antenna feed, a first Butler matrix block of the plurality of Butler matrix blocks comprising a first set of output ports, each one of the first set of output ports being coupled to a respective one of the horizontal polarization antenna feeds of each one of the plurality of antenna elements, and a second Butler matrix block of the plurality of Butler matrix blocks comprising a second set of output ports, each one of the second set of output ports being coupled to a respective one of the vertical polarization antenna feeds of each one of the plurality of antenna elements. In addition or in alternative to and in any combination with the optional features previously explained in this paragraph, each one of the plurality of Butler matrix blocks comprises: a plurality of quadrature hybrid slotted patch couplers; and a plurality of 45-degree hybrid patch couplers, each one of the plurality of Butler matrix blocks does not include a crossover, and is formed in a diamond shape. In addition or in alternative to and in any combination with the optional features previously explained in this paragraph, the antenna array further comprises an electromagnetic band gap (EBG) structure comprising a first and a second pattern of conductive elements forming a plurality of EBG unit cells, each one of the plurality of EBG unit cells being aligned with a respective one of the plurality of antenna elements, the first pattern of conductive elements is disposed on a layer of the plurality of layers other than the second layer, and the second pattern of conductive elements is disposed on the first layer. In addition or in alternative to and in any combination with the optional features previously explained in this paragraph, a size of each one of the plurality of EBG unit cells has dimensions that are larger in size than dimensions of each one of the primary and the secondary conductive sheets with which the EBG unit cell is respectively aligned. In addition or in alternative to and in any combination with the optional features previously explained in this paragraph, the first pattern of conductive elements is disposed on a layer of the plurality of layers between the first and the second layers.

REFERENCES

The following references are cited throughout this disclosure as applicable to provide additional clarity, particularly with regards to terminology. These citations are made by way of example and ease of explanation and not by way of limitation.

Citations to the following references are made throughout the application using a matching bracketed number, e.g., [1].

[1] Park, Yuntae, Jihoon Bang, and Jaehoon Choi. 2020. "Dual-Circularly Polarized 60 GHz Beam-Steerable Antenna Array with 8×8 Butler Matrix" Applied Sciences 10, no. 7: 2413. https://doi.org/10.3390/app10072413.

[2] K. Klionovski, M. S. Sharawi and A. Shamim, "A Dual-Polarization-Switched Beam Patch Antenna Array for Millimeter-Wave Applications," in IEEE Transactions on Antennas and Propagation, vol. 67, no. 5, pp. 3510-3515, May 2019, doi: 10.1109/TAP.2019.2900438.

[3] Zahra Mousavirazi, Vahid Rafiei, Tayeb A. Denidni, Beam-Switching antenna array with dual-circular-polarized operation for WiMAX applications, AEU—International Journal of Electronics and Communications, Volume 137, 2021, 153796, ISSN 1434-8411, https://doi.org/10.1016/kaetie.2021.153796.

[4] N. Ashraf, A. A. Kishk and A.-R. Sebak, "28-32 GHz Dual-Polarized Single-Layer Microstrip Line Beamforming Network for 2×2 Beam Switching," 2019 IEEE MTT-S International Microwave Conference on Hardware and Systems for 5G and Beyond (IMC-5G), 2019, pp. 1-3, doi: 10.1109/IMC-5G47857.2019.9160357.

[5] L.-H. He, Y.-L. Ban, F.-Q. Yan and G. Wu, "Dual-Polarized Two-Dimensional Multibeam Antenna Array With Hybrid Beamforming and its Planarization," in IEEE Access, vol. 9, pp. 54951-54961, 2021, doi: 10.1109/ACCESS.2021.3071645.

[6] S. A. Babale, S. K. Abdul Rahim, 0. A. Barro, M. Himdi and M. Khalily, "Single Layered 4×4 Butler Matrix Without Phase-Shifters and Crossovers," in IEEE Access, vol. 6, pp. 77289-77298, 2018, doi: 10.1109/ACCESS.2018.2881605.

[7] J. M. Wen, C. K. Wang, W. Hong, Y. M. Pan and S. Y. Zheng, "A Wideband Switched-Beam Antenna Array Fed by Compact Single-Layer Butler Matrix," in IEEE Transactions on Antennas and Propagation, vol. 69, no. 8, pp. 5130-5135, August 2021, doi: 10.1109/TAP.2021.3060040.

[8] G. Tian, J. Yang and W. Wu, "A Novel Compact Butler Matrix Without Phase Shifter," in IEEE Microwave and Wireless Components Letters, vol. 24, no. 5, pp. 306-308, May 2014, doi: 10.1109/LMWC.2014.2306898.

[9] P. Bhowmik and T. Moyra, "Modelling and Validation of a Compact Planar Butler Matrix by Removing Crossover," Wireless Personal Communications 95, 5121-5132 (2017), doi: https://doi.org/10.1007/s11277-017-4158-7.

[10] I. M. Mohamed and A. Sebak, "60 GHz 2-D Scanning Multibeam Cavity-Backed Patch Array Fed by Compact SIW Beamforming Network for 5G Applications," in IEEE Transactions on Antennas and Propagation, vol. 67, no. 4, pp. 2320-2331, April 2019, doi: 10.1109/TAP.2019.2891450.

[11] D. Singh, M. G. Madhan, A. Kamalaveni and S. Kotapti, "A compact passive beam forming network for base station antenna," 2017 International conference on Microelectronic Devices, Circuits and Systems (ICMDCS), 2017, pp. 1-6, doi: 10.1109/ICMDCS.2017.8211574.

EXAMPLES

The following examples pertain to various techniques of the present disclosure.

An example (e.g. example 1) is directed to an antenna element of an antenna array. The antenna element comprises a package substrate comprising a plurality of layers; a primary conductive sheet disposed on a first layer of the plurality of layers and being coupled to an antenna feed; a secondary conductive sheet disposed on a second layer of the plurality of layers; and an electromagnetic band gap (EBG) unit cell comprising a first and a second pattern of conductive elements respectively disposed on two different layers of the package substrate, wherein the EBG unit cell has dimensions that are larger in size than dimensions of each one of the primary and the secondary conductive sheets.

Another example (e.g. example 2) relates to a previously-described example (e.g. example 1), further comprising: a plurality of parasitic elements comprising further conductive sheets disposed about the secondary conductive sheet, wherein the EBG unit cell has dimensions that are larger in size than dimensions of the secondary conductive and the further conductive sheets.

Another example (e.g. example 3) relates to a previously-described example (e.g. one or more of examples 1-2), wherein the first pattern of conductive elements of the EBG unit cell are disposed on a further layer of the plurality of layers that is disposed between the first and the second layers.

Another example (e.g. example 4) relates to a previously-described example (e.g. one or more of examples 1-3), wherein the second pattern of conductive elements of the EBG unit cell are disposed on the first layer with the primary conductive sheet.

Another example (e.g. example 5) relates to a previously-described example (e.g. one or more of examples 1-4), wherein each one of the first pattern and the second pattern of conductive elements of the EBG unit cell comprises a respective rectangular shape.

Another example (e.g. example 6) relates to a previously-described example (e.g. one or more of examples 1-5), wherein the package substrate has a length and width dimension that are respectively aligned with two orthogonal axes, and wherein the respective rectangular shape of each one of the first pattern and the second pattern of conductive elements of the EBG unit cell are rotated 45 degrees with respect to the two orthogonal axes.

Another example (e.g. example 7) relates to a previously-described example (e.g. one or more of examples 1-6), wherein the antenna feed comprises a set of antenna feeds configured to enable the primary conductive sheet to operate in accordance with a dual-polarized configuration.

Another example (e.g. example 8) relates to a previously-described example (e.g. one or more of examples 1-7), wherein the secondary conductive sheet is disposed on the second layer at a first side of the primary conductive sheet, and further comprising: a Butler matrix block disposed on a third layer of the plurality of layers at a second side of the primary conductive sheet that is opposite to the first side, wherein the Butler matrix block comprises an output port that is coupled to the antenna feed via a portion of a feed network.

Another example (e.g. example 9) relates to a previously-described example (e.g. one or more of examples 1-8), further comprising: a first and a second Butler matrix block disposed on a third layer of the plurality of layers.

Another example (e.g. example 10) relates to a previously-described example (e.g. one or more of examples 1-9), wherein: the antenna element is from among a plurality of antenna elements constituting the antenna array, the antenna feed for each one of the plurality of antenna elements comprises a respective horizontal and vertical polarization antenna feed, the first Butler matrix block is configured to couple each one of the horizontal polarization antenna feeds for each one of the plurality of antenna elements to a respective horizontal polarization output port, and the second Butler matrix block is configured to couple each one of the vertical polarization antenna feeds for each one of the plurality of antenna elements to a respective vertical polarization output port.

Another example (e.g. example 11) relates to a previously-described example (e.g. one or more of examples 1-10), wherein (i) an electrical length between each one of the horizontal polarization antenna feeds to a respective horizontal polarization output port are equal to one another, and (ii) an electrical length between each one of the vertical polarization antenna feeds to a respective vertical polarization output port are equal to one another.

Another example (e.g. example 12) relates to a previously-described example (e.g. one or more of examples 1-11), wherein: each one of the horizontal polarization antenna feeds is coupled to a respective horizontal polarization output port of the first Butler matrix block via a first set of conductive traces, each one of the vertical polarization antenna feeds is coupled to a respective vertical polarization output port of the second Butler matrix block via a second set of conductive traces, and the first and the second set of conductive traces are (i) disposed on a fourth layer of the plurality of layers, and (ii) routed around the first and the second conductive sheets.

Another example (e.g. example 13) relates to a previously-described example (e.g. one or more of examples 1-12), wherein the Butler matrix block does not include a crossover.

Another example (e.g. example 14) relates to a previously-described example (e.g. one or more of examples 1-13), wherein the Butler matrix block comprises (i) a plurality of quadrature hybrid slotted patch couplers, and (ii) a plurality of 45-degree hybrid patch couplers.

Another example (e.g. example 15) relates to a previously-described example (e.g. one or more of examples 1-14), wherein the Butler matrix block forms a diamond shape.

An example (e.g. example 16) is directed to an antenna array. The antenna array comprises a package substrate comprising a plurality of layers; a plurality of antenna elements, each one of the plurality of antenna elements comprising: a primary conductive sheet disposed on a first layer of the plurality of layers and being coupled to an antenna feed; and a secondary conductive sheet disposed on a second layer of the plurality of layers at a first side of the primary conductive sheet; and a plurality of Butler matrix blocks disposed on a third layer of the plurality of layers at a second side of the primary conductive sheet that is opposite to the first side, wherein each one of the plurality of Butler matrix blocks comprises a plurality of beam-selection input ports and a plurality of output ports, and wherein each one of the plurality of output ports is coupled to a respective antenna feed of each respective one of the plurality of antenna elements.

Another example (e.g. example 17) relates to a previously-described example (e.g. example 16), wherein (i) an electrical length of conductive traces formed between each respective one of a first plurality of output ports identified with a first one of the plurality of Butler matrix blocks are equal to one another, and (ii) an electrical length of conductive traces formed between each respective one of a second plurality of output ports identified with a second one of the plurality of Butler matrix blocks are equal to one another.

Another example (e.g. example 18) relates to a previously-described example (e.g. one or more of examples 16-17), wherein each one of the plurality of output ports identified with the plurality of Butler matrix blocks is coupled to a respective antenna feed of each respective one of the plurality of antenna elements via a set of conductive traces, and wherein the set of conductive traces are (i) disposed on a fourth layer of the plurality of layers, and (ii) routed around the first and the second conductive sheets of each respective one of the plurality of antenna elements.

Another example (e.g. example 19) relates to a previously-described example (e.g. one or more of examples 16-18), wherein the antenna feed of each respective one of the plurality of antenna elements comprises a set of antenna feeds configured to enable each one of the plurality of antenna elements to operate in accordance with a dual-polarized configuration.

Another example (e.g. example 20) relates to a previously-described example (e.g. one or more of examples 16-19), wherein: the antenna feed of each one of the plurality of antenna elements comprises a respective horizontal and a vertical polarization antenna feed, a first Butler matrix block of the plurality of Butler matrix blocks comprising a first set of output ports, each one of the first set of output ports being coupled to a respective one of the horizontal polarization antenna feeds of each one of the plurality of antenna elements, and a second Butler matrix block of the plurality of Butler matrix blocks comprising a second set of output ports, each one of the second set of output ports being coupled to a respective one of the vertical polarization antenna feeds of each one of the plurality of antenna elements.

Another example (e.g. example 21) relates to a previously-described example (e.g. one or more of examples 16-20), wherein each one of the plurality of Butler matrix blocks comprises: a plurality of quadrature hybrid slotted patch couplers; and a plurality of 45-degree hybrid patch couplers, wherein each one of the plurality of Butler matrix blocks (i) does not include a crossover, and (ii) is formed in a diamond shape.

Another example (e.g. example 22) relates to a previously-described example (e.g. one or more of examples 16-21), further comprising: an electromagnetic band gap (EBG) structure comprising a first and a second pattern of conductive elements forming a plurality of EBG unit cells, each one of the plurality of EBG unit cells being aligned with a respective one of the plurality of antenna elements, wherein the first pattern of conductive elements is disposed on a layer of the plurality of layers other than the second layer, and wherein the second pattern of conductive elements is disposed on the first layer.

Another example (e.g. example 23) relates to a previously-described example (e.g. one or more of examples 16-22), wherein a size of each one of the plurality of EBG unit cells has dimensions that are larger in size than dimensions of each one of the primary and the secondary conductive sheets with which the EBG unit cell is respectively aligned.

Another example (e.g. example 24) relates to a previously-described example (e.g. one or more of examples 16-23), wherein the first pattern of conductive elements is disposed on a layer of the plurality of layers between the first and the second layers.

An example (e.g. example 25) is directed to an antenna element of an antenna array. The antenna element comprises a package substrate comprising a plurality of layers; a primary conductive sheet disposed on a first layer of the plurality of layers and being coupled to an antenna feeding means; a secondary conductive sheet disposed on a second layer of the plurality of layers; and an electromagnetic band gap (EBG) means comprising a first and a second pattern of conductive elements respectively disposed on two different layers of the package substrate, wherein the EBG means has dimensions that are larger in size than dimensions of each one of the primary and the secondary conductive sheets.

Another example (e.g. example 26) relates to a previously-described example (e.g. example 25), further comprising: a plurality of parasitic elements comprising further conductive sheets disposed about the secondary conductive sheet, wherein the EBG means has dimensions that are larger in size than dimensions of the secondary conductive and the further conductive sheets.

Another example (e.g. example 27) relates to a previously-described example (e.g. one or more of examples 25-26), wherein the first pattern of conductive elements of the EBG means are disposed on a further layer of the plurality of layers that is disposed between the first and the second layers.

Another example (e.g. example 28) relates to a previously-described example (e.g. one or more of examples 25-27), wherein the second pattern of conductive elements of the EBG means are disposed on the first layer with the primary conductive sheet.

Another example (e.g. example 29) relates to a previously-described example (e.g. one or more of examples 25-28), wherein each one of the first pattern and the second pattern of conductive elements of the EBG means comprises a respective rectangular shape.

Another example (e.g. example 30) relates to a previously-described example (e.g. one or more of examples 25-29), wherein the package substrate has a length and width dimension that are respectively aligned with two orthogonal axes, and wherein the respective rectangular shape of each one of the first pattern and the second pattern of conductive elements of the EBG means are rotated 45 degrees with respect to the two orthogonal axes.

Another example (e.g. example 31) relates to a previously-described example (e.g. one or more of examples 25-30), wherein the antenna feeding means comprises a set of antenna feeds configured to enable the primary conductive sheet to operate in accordance with a dual-polarized configuration.

Another example (e.g. example 32) relates to a previously-described example (e.g. one or more of examples 25-31), wherein the secondary conductive sheet is disposed on the second layer at a first side of the primary conductive sheet, and further comprising: a Butler matrix means disposed on a third layer of the plurality of layers at a second side of the primary conductive sheet that is opposite to the first side, wherein the Butler matrix means comprises an output port that is coupled to the antenna feed via a portion of a feed network.

Another example (e.g. example 33) relates to a previously-described example (e.g. one or more of examples 25-32), further comprising: a first and a second Butler matrix means disposed on a third layer of the plurality of layers.

Another example (e.g. example 34) relates to a previously-described example (e.g. one or more of examples 25-33), wherein: the antenna element is from among a plurality of antenna elements constituting the antenna array, the antenna feeding means for each one of the plurality of antenna elements comprises a respective horizontal and vertical polarization antenna feed, the first Butler matrix means couples each one of the horizontal polarization antenna feeds for each one of the plurality of antenna elements to a respective horizontal polarization output port, and the second Butler matrix means couples each one of the vertical polarization antenna feeds for each one of the plurality of antenna elements to a respective vertical polarization output port.

Another example (e.g. example 35) relates to a previously-described example (e.g. one or more of examples 25-34), wherein (i) an electrical length between each one of the horizontal polarization antenna feeds to a respective horizontal polarization output port are equal to one another, and (ii) an electrical length between each one of the vertical polarization antenna feeds to a respective vertical polarization output port are equal to one another.

Another example (e.g. example 36) relates to a previously-described example (e.g. one or more of examples 25-35), wherein: each one of the horizontal polarization antenna feeds is coupled to a respective horizontal polarization output port of the first Butler matrix means via a first set of conductive traces, each one of the vertical polarization antenna feeds is coupled to a respective vertical polarization output port of the second Butler matrix means via a second set of conductive traces, and the first and the second set of conductive traces are (i) disposed on a fourth layer of the plurality of layers, and (ii) routed around the first and the second conductive sheets.

Another example (e.g. example 37) relates to a previously-described example (e.g. one or more of examples 25-36), wherein the Butler matrix means does not include a crossover.

Another example (e.g. example 38) relates to a previously-described example (e.g. one or more of examples 25-37), wherein the Butler matrix means comprises (i) a plurality of quadrature hybrid slotted patch couplers, and (ii) a plurality of 45-degree hybrid patch couplers.

Another example (e.g. example 39) relates to a previously-described example (e.g. one or more of examples 25-38), wherein the Butler matrix means forms a diamond shape.

An example (e.g. example 40) is directed to an antenna array. The antenna array comprises a package substrate comprising a plurality of layers; a plurality of antenna elements, each one of the plurality of antenna elements comprising: a primary conductive sheet disposed on a first layer of the plurality of layers and being coupled to an antenna feeding means; and a secondary conductive sheet disposed on a second layer of the plurality of layers at a first side of the primary conductive sheet; and a plurality of Butler matrix means disposed on a third layer of the plurality of layers at a second side of the primary conductive sheet that is opposite to the first side, wherein each one of the plurality of Butler matrix means comprises a plurality of beam-selection input ports and a plurality of output ports, and wherein each one of the plurality of output ports is coupled to a respective antenna feeding means of each respective one of the plurality of antenna elements.

Another example (e.g. example 41) relates to a previously-described example (e.g. example 40), wherein (i) an electrical length of conductive traces formed between each respective one of a first plurality of output ports identified with a first one of the plurality of Butler matrix means are equal to one another, and (ii) an electrical length of conductive traces formed between each respective one of a second plurality of output ports identified with a second one of the plurality of Butler matrix means are equal to one another.

Another example (e.g. example 42) relates to a previously-described example (e.g. one or more of examples 40-41), wherein each one of the plurality of output ports identified with the plurality of Butler matrix means is coupled to a respective antenna feeding means of each respective one of the plurality of antenna elements via a set of conductive traces, and wherein the set of conductive traces are (i) disposed on a fourth layer of the plurality of layers, and (ii) routed around the first and the second conductive sheets of each respective one of the plurality of antenna elements.

Another example (e.g. example 43) relates to a previously-described example (e.g. one or more of examples 40-42), wherein the antenna feeding means of each respective one of the plurality of antenna elements comprises a set of antenna feeding means configured to enable each one of the plurality of antenna elements to operate in accordance with a dual-polarized configuration.

Another example (e.g. example 44) relates to a previously-described example (e.g. one or more of examples 40-43), wherein: the antenna feeding means of each one of the plurality of antenna elements comprises a respective horizontal and a vertical polarization antenna feed, a first Butler matrix means of the plurality of Butler matrix means comprising a first set of output ports, each one of the first set of output ports being coupled to a respective one of the horizontal polarization antenna feeds of each one of the plurality of antenna elements, and a second Butler matrix means of the plurality of Butler matrix means comprising a second set of output ports, each one of the second set of output ports being coupled to a respective one of the vertical polarization antenna feeds of each one of the plurality of antenna elements.

Another example (e.g. example 45) relates to a previously-described example (e.g. one or more of examples 40-44), wherein each one of the plurality of Butler matrix means comprises: a plurality of quadrature hybrid slotted patch couplers; and a plurality of 45-degree hybrid patch couplers, wherein each one of the plurality of Butler matrix blocks (i) does not include a crossover, and (ii) is formed in a diamond shape.

Another example (e.g. example 46) relates to a previously-described example (e.g. one or more of examples 40-45), further comprising: an electromagnetic band gap (EBG) means comprising a first and a second pattern of conductive elements forming a plurality of EBG unit cells, each one of the plurality of EBG unit cells being aligned with a respective one of the plurality of antenna elements, wherein the first pattern of conductive elements is disposed on a layer of the plurality of layers other than the second layer, and wherein the second pattern of conductive elements is disposed on the first layer.

Another example (e.g. example 47) relates to a previously-described example (e.g. one or more of examples 40-46), wherein a size of each one of the plurality of EBG unit cells has dimensions that are larger in size than dimensions of each one of the primary and the secondary conductive sheets with which the EBG unit cell is respectively aligned.

Another example (e.g. example 48) relates to a previously-described example (e.g. one or more of examples 40-47), wherein the first pattern of conductive elements is disposed on a layer of the plurality of layers between the first and the second layers.

An apparatus as shown and described.

A method as shown and described.

CONCLUSION

The term "segments," "elements," and "traces" are used herein interchangeably with one another, and may refer to any suitable geometric arrangement of conductive sheets, as well as portions and/or patterns thereof. That is, the parasitic elements 110 may alternatively be referred to as conductive segments, and the patterns of conductive segments 112A, 112B may alternatively be referred to herein as conductive elements. Moreover, the conductive traces identified with the signal routing network may alternatively be referred to as conductive segments or conductive elements.

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementations described herein are provided for illustrative purposes, and are not limiting. Other implementations are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. An antenna element, comprising:

a package substrate comprising a plurality of layers;

a primary conductive sheet disposed on a first layer of the plurality of layers and being coupled to an antenna feed;

a secondary conductive sheet disposed on a second layer of the plurality of layers; and an electromagnetic band gap (EBG) unit cell comprising a first and a second pattern of conductive elements respectively disposed on two different layers of the package substrate, wherein the first pattern of conductive elements are coupled to one another within one of the two different layers and form a portion of a first continuous conductive pattern, wherein the second pattern of conductive elements are coupled to one another within the other one of the two different layers and form a portion of a second continuous conductive pattern, wherein the primary conductive sheet and the secondary conductive sheet are aligned with a first set of two orthogonal axes, and the first continuous conductive pattern and the second continuous conductive pattern are aligned with a second set of two orthogonal axes that are rotated 45 degrees with respect to the first set of two orthogonal axes, and wherein the EBG unit cell has dimensions that are larger in size than dimensions of each one of the primary and the secondary conductive sheets.

2. The antenna element of claim 1, further comprising:

a plurality of parasitic elements comprising further conductive sheets surrounding the secondary conductive sheet, wherein the EBG unit cell has dimensions that are larger in size than dimensions of the secondary conductive and the further conductive sheets.

3. The antenna element of claim 1, wherein the first pattern of conductive elements of the EBG unit cell are disposed on a further layer of the plurality of layers that is disposed between the first and the second layers.

4. The antenna element of claim 1, wherein the second pattern of conductive elements of the EBG unit cell are disposed on the first layer with the primary conductive sheet.

5. The antenna element of claim 1, wherein each one of the first pattern and the second pattern of conductive elements of the EBG unit cell comprises a respective rectangular shape.

6. The antenna element of claim 1, wherein the package substrate has a length and width dimension that are respectively aligned with the first set of two orthogonal axes.

7. The antenna element of claim 1, wherein the antenna feed comprises a set of antenna feeds configured to enable the primary conductive sheet to operate in accordance with a dual-polarized configuration.

8. The antenna element of claim 1, wherein:

the secondary conductive sheet is disposed on the second layer at a first side of the primary conductive sheet, the antenna element is from among a plurality of antenna elements forming an antenna array comprising a Butler matrix block disposed on a third layer of the plurality of layers at a second side of the primary conductive sheet that is opposite to the first side, and the Butler matrix block comprises an output port that is coupled to the antenna feed via a portion of a feed network.

9. The antenna element of claim 1, wherein the antenna element is from among a plurality of antenna elements forming an antenna array comprising a first and a second Butler matrix block disposed on a third layer of the plurality of layers.

10. The antenna element of claim 9, wherein:

the antenna feed for each one of the plurality of antenna elements comprises a respective horizontal and vertical polarization antenna feed, the first Butler matrix block is configured to couple each one of the horizontal polarization antenna feeds for each one of the plurality of antenna elements to a respective horizontal polarization output port, and the second Butler matrix block is configured to couple each one of the vertical polarization antenna feeds for each one of the plurality of antenna elements to a respective vertical polarization output port.

11. The antenna element of claim 10, wherein (i) an electrical length between each one of the horizontal polarization antenna feeds to a respective horizontal polarization output port are equal to one another, and (ii) an electrical length between each one of the vertical polarization antenna feeds to a respective vertical polarization output port are equal to one another.

12. The antenna element of claim 11, wherein:

each one of the horizontal polarization antenna feeds is coupled to a respective horizontal polarization output port of the first Butler matrix block via a first set of conductive traces, each one of the vertical polarization antenna feeds is coupled to a respective vertical polarization output port of the second Butler matrix block via a second set of conductive traces, and the first and the second set of conductive traces are (i) disposed on a fourth layer of the plurality of layers, and (ii) routed around the first and the second conductive sheets.

13. The antenna element of claim 8, wherein the Butler matrix block does not include a crossover.

14. The antenna element of claim 8, wherein the Butler matrix block comprises (i) a plurality of quadrature hybrid slotted patch couplers, and (ii) a plurality of 45-degree hybrid patch couplers.

15. The antenna element of claim 8, wherein the Butler matrix block forms a diamond shape.

16. The antenna element of claim 1, wherein the first continuous conductive pattern and the second continuous conductive pattern each comprise a grid pattern.

17. The antenna element of claim 1, wherein the first continuous conductive pattern and the second continuous conductive pattern are identical to one another.

18. The antenna element of claim 1, wherein the first continuous conductive pattern and the second continuous conductive pattern are aligned with one another in a thickness direction of the package substrate.

19. The antenna element of claim 1, wherein the portion of the first continuous conductive pattern and the portion of the second continuous conductive pattern overlap with one another in a thickness direction of the package substrate.

20. An electronic device, comprising:

a transceiver; and an antenna element coupled to the transceiver, the antenna element comprising:

a package substrate comprising a plurality of layers;

a primary conductive sheet disposed on a first layer of the plurality of layers and being coupled to an antenna feed;

a secondary conductive sheet disposed on a second layer of the plurality of layers; and an electromagnetic band gap (EBG) unit cell comprising a first and a second pattern of conductive elements respectively disposed on two different layers of the package substrate, wherein the first pattern of conductive elements are coupled to one another within one of the two different layers and form a portion of a first continuous conductive pattern, wherein the second pattern of conductive elements are coupled to one another within the other one of the two different layers and form a portion of a second continuous conductive pattern, wherein the primary conductive sheet and the secondary conductive sheet are aligned with a first set of two orthogonal axes, and the first continuous conductive pattern and the second continuous conductive pattern are aligned with a second set of two orthogonal axes that are rotated 45 degrees with respect to the first set of two orthogonal axes, and wherein the EBG unit cell has dimensions that are larger in size than dimensions of each one of the primary and the secondary conductive sheets and wherein the transceiver is configured to transmit and/or receive wireless signals via the antenna element.

21. The electronic device of claim 20, wherein the antenna element further comprises:

a plurality of parasitic elements comprising further conductive sheets surrounding the secondary conductive sheet, wherein the EBG unit cell has dimensions that are larger in size than dimensions of the secondary conductive and the further conductive sheets.

22. The electronic device of claim 20, wherein the first pattern of conductive elements of the EBG unit cell are disposed on a further layer of the plurality of layers that is disposed between the first and the second layers.

23. The electronic device of claim 20, wherein the second pattern of conductive elements of the EBG unit cell are disposed on the first layer with the primary conductive sheet.

24. The electronic device of claim 20, wherein the portion of the first continuous conductive pattern and the portion of the second continuous conductive pattern overlap with one another in a thickness direction of the package substrate.

* * * * *